US010194424B2

(12) United States Patent
Chen et al.

(10) Patent No.: US 10,194,424 B2
(45) Date of Patent: Jan. 29, 2019

(54) TECHNIQUES FOR MANAGING RESOURCES FOR UPLINK TRANSMISSIONS IN A SHARED RADIO FREQUENCY SPECTRUM BAND

(71) Applicant: QUALCOMM Incorporated, San Diego, CA (US)

(72) Inventors: Wanshi Chen, San Diego, CA (US); Aleksandar Damnjanovic, Del Mar, CA (US); Durga Prasad Malladi, San Diego, CA (US); Hao Xu, San Diego, CA (US); Peter Gaal, San Diego, CA (US); Yongbin Wei, La Jolla, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 14/618,738

(22) Filed: Feb. 10, 2015

(65) Prior Publication Data

US 2015/0341921 A1 Nov. 26, 2015

Related U.S. Application Data

(60) Provisional application No. 62/000,957, filed on May 20, 2014.

(51) Int. Cl.
*H04W 72/04* (2009.01)
*H04W 76/28* (2018.01)
(Continued)

(52) U.S. Cl.
CPC ... *H04W 72/0413* (2013.01); *H04W 72/1268* (2013.01); *H04W 74/004* (2013.01); *H04W 16/14* (2013.01); *H04W 72/044* (2013.01)

(58) Field of Classification Search
CPC ............................ H04W 16/14; H04W 72/044
See application file for complete search history.

(56) References Cited

U.S. PATENT DOCUMENTS

| 2008/0159419 | A1* | 7/2008 | Smith | H04B 7/18534 |
| | | | | 375/260 |
| 2008/0285523 | A1* | 11/2008 | Bjorken | H04W 72/1268 |
| | | | | 370/336 |

(Continued)

FOREIGN PATENT DOCUMENTS

WO WO-2012078565 A1 6/2012

OTHER PUBLICATIONS

IPEA/EPO, Second Written Opinion of the International Preliminary Examining Authority, Int'l Appl. No. PCT/US2015/026872, dated Mar. 30, 2016, European Patent Office, Rijswijk, NL, 4 pgs.
(Continued)

*Primary Examiner* — Brian S Roberts
*Assistant Examiner* — Abusayeed M Haque
(74) *Attorney, Agent, or Firm* — Dalei Dong; Holland & Hart

(57) ABSTRACT

Techniques are described for wireless communication. A first method includes identifying a first interval for an uplink transmission in a shared radio frequency spectrum band; identifying a second interval for the uplink transmission; comparing the first interval with the second interval; and determining uplink resources to use for the uplink transmission based at least in part on the comparison of the first interval with the second interval. A second method includes transmitting one or more assignments of uplink resources to use for an uplink transmission in a shared radio frequency spectrum band; detecting a duration of the uplink transmission; and identifying uplink resources used for the uplink transmission based at least in part on the detecting.

22 Claims, 23 Drawing Sheets

(51) Int. Cl.
  *H04W 16/14* (2009.01)
  *H04W 74/00* (2009.01)
  *H04W 72/12* (2009.01)

(56) References Cited

U.S. PATENT DOCUMENTS

| | | | | |
|---|---|---|---|---|
| 2011/0128895 | A1* | 6/2011 | Sadek | H04W 16/14 370/280 |
| 2011/0151793 | A1* | 6/2011 | Lee | H04W 72/085 455/63.1 |
| 2011/0292891 | A1* | 12/2011 | Hsieh | H04L 5/001 370/329 |
| 2012/0300712 | A1* | 11/2012 | Hakola | H04W 74/008 370/329 |
| 2014/0029573 | A1 | 1/2014 | Lee et al. | |
| 2014/0036853 | A1 | 2/2014 | Kim et al. | |
| 2014/0056188 | A1* | 2/2014 | Yang | H04L 5/0053 370/280 |
| 2014/0071918 | A1* | 3/2014 | Park | H04W 72/14 370/329 |

OTHER PUBLICATIONS

ISA/EPO, International Search Report and Written Opinion of the International Searching Authority, Int'l Appl. No. PCT/US2015/026872, dated Jul. 9, 2015, European Patent Office, Rijswijk, NL, 10 pgs.

\* cited by examiner

TECHNIQUES FOR MANAGING RESOURCES FOR UPLINK TRANSMISSIONS IN A SHARED RADIO FREQUENCY SPECTRUM BAND

CROSS REFERENCES

The present Application for Patent claims priority to U.S. Provisional Patent Application No. 62/000,957 by Chen et al., entitled "Techniques For Managing Resources For Uplink Transmissions In A Shared Radio Frequency Spectrum Band," filed May 20, 2014, assigned to the assignee hereof, and which is incorporated by reference in its entirety.

FIELD OF THE DISCLOSURE

The present disclosure, for example, relates to wireless communication systems, and more particularly to techniques for managing resources for uplink transmissions in a shared radio frequency spectrum band.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple user equipments (UEs). A base station may communicate with UEs on downlink channels (e.g., for transmissions from the base station to the UE) and uplink channels (e.g., for transmissions from the UEs to the base station).

Some modes of communication may enable communications with a UE over different radio frequency spectrum bands (e.g., a licensed radio frequency spectrum band and/or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. Prior to gaining access to, and communicating over, the unlicensed radio frequency spectrum band, a transmitting apparatus may, in some examples, perform a listen before talk (LBT) procedure to contend for access to the unlicensed radio frequency spectrum band. An LBT procedure may include performing a clear channel assessment (CCA) to determine whether a channel of the unlicensed radio frequency spectrum band is available. When it is determined that the channel of the unlicensed radio frequency spectrum band is not available (e.g., because another device is already using the channel of the unlicensed radio frequency spectrum band), a CCA may be performed for the channel again at a later time.

In some cases, transmissions by one or more nodes over an unlicensed radio frequency spectrum band (e.g., Wi-Fi nodes or nodes of other operators) may prevent a base station or UE from gaining access to the unlicensed radio frequency spectrum, resulting in the base station or UE being "starved" of use of the unlicensed radio frequency spectrum band. In some cases, this starvation problem may be mitigated by using an LBT protocol configured for load based equipment (LBT-LBE) instead of an LBT protocol configured for frame based equipment (LBT-FBE). In an LBT-LBE protocol, an extended CCA procedure including a plurality of N CCA procedures may be performed. The extended CCA procedure performed in conjunction with an LBT-LBE protocol may provide a base station or UE a better chance to gain access to an unlicensed radio frequency spectrum band (e.g., compared to a single CCA procedure performed in conjunction with an LBT-FBE protocol).

SUMMARY

The present disclosure, for example, relates to one or more techniques for managing resources for uplink transmissions in a shared radio frequency spectrum band. When a UE uses an LBT-LBE protocol to contend for access to a shared radio frequency spectrum band, there is uncertainty regarding if and when the UE will successfully contend for access to the shared radio frequency spectrum band. For example, the UE may successfully contend for access to the shared radio frequency spectrum band for a portion of an assigned or intended interval for the uplink transmission. The techniques disclosed herein enable a UE and base station to determine what uplink resources to use when an actual interval for an uplink transmission is shorter than an assigned or intended interval for the uplink transmission.

In an example, a method for wireless communication is described. In one example, the method may include identifying a first interval for an uplink transmission in a shared radio frequency spectrum band, identifying a second interval for the uplink transmission, comparing the first interval with the second interval; and determining uplink resources to use for the uplink transmission based at least in part on the comparison of the first interval with the second interval.

In some examples of the method, the shared radio frequency spectrum band may include an unlicensed radio frequency spectrum band. In some examples of the method, the shared radio frequency spectrum band may include a licensed radio frequency spectrum band shared by two or more operators.

In some examples, the method may include receiving one or more assignments of uplink resources to use for the uplink transmission. In some examples, the method may further include performing a CCA to identify the second interval, and transmitting the uplink transmission using the determined uplink resources. In some examples, the CCA may include an extended CCA. In some examples, the determining uplink resources may include receiving a plurality of assignments of uplink resources to use for the uplink transmission; and selecting an assignment of uplink resources to use for the uplink transmission. In some examples, the determining uplink resources may include applying, to the uplink transmission, a subset of an assignment of uplink resources associated with a duration of the uplink transmission. In some examples, the determining uplink resources may include adjusting one or more parameters of the uplink resources to use for the uplink transmission based at least in part on the comparison of the first interval with the second interval. In some examples, the method may include signaling, to a base station, an indicator that indicates a value of at least one of the adjusted one or more parameters of the uplink resources. In some examples, the determining uplink resources may include applying at least one assignment of uplink resources corresponding to a portion of the first interval. In some examples, the determining uplink resources may include applying at least one assignment of uplink resources based at least in part on a subframe index associated with the first interval.

In some examples of the method, the first interval may include a first duration for the uplink transmission and the second interval may include a second duration for the uplink transmission, the second duration being different from the first duration. In these examples, the first interval may include a plurality of subframes.

In an example, an apparatus for wireless communication is described. In one example, the apparatus may include means for identifying a first interval for an uplink transmission in a shared radio frequency spectrum band, means for identifying a second interval for the uplink transmission, means for comparing the first interval with the second interval, and means for determining uplink resources to use for the uplink transmission based at least in part on the comparison of the first interval with the second interval. In some examples, the apparatus may further include means for implementing one or more aspects of the method for wireless communication described above with respect to the first set of illustrative examples.

In an example, another apparatus for wireless communication is described. In one example, the apparatus may include a processor, memory in electronic communication with the processor, and instructions stored in the memory. The instructions may be executable by the processor to identify a first interval for an uplink transmission in a shared radio frequency spectrum band, identify a second interval for the uplink transmission, compare the first interval with the second interval, and determine uplink resources to use for the uplink transmission based at least in part on the comparison of the first interval with the second interval. In some examples, the instructions may also be executable by the processor to implement one or more aspects of the method for wireless communication described above with respect to the first set of illustrative examples.

In an example, a computer program product for communication by a wireless communication apparatus in a wireless communication system is described. In one example, the computer program product may include a non-transitory computer-readable medium storing instructions executable by a processor to cause the wireless communication apparatus to identify a first interval for an uplink transmission in a shared radio frequency spectrum band, identify a second interval for the uplink transmission, compare the first interval with the second interval, and determine uplink resources to use for the uplink transmission based at least in part on the comparison of the first interval with the second interval. In some examples, the instructions may also be executable by the processor to cause the wireless communication apparatus to implement one or more aspects of the method for wireless communication described above with respect to the first set of illustrative examples.

In an example, a method for wireless communication is described. In one example, the method may include transmitting one or more assignments of uplink resources to use for an uplink transmission in a shared radio frequency spectrum band, detecting a duration of the uplink transmission, and identifying uplink resources used for the uplink transmission based at least in part on the detecting.

In some examples of the method, the identifying uplink resources may include performing blind detection to identify the uplink resources used for the uplink transmission. In some examples of the method, the identifying uplink resources may include receiving a signal indicating the uplink resources used for the uplink transmission. In some examples of the method, the identifying uplink resources may include mapping the detected duration of the uplink transmission to the uplink resources used for the uplink transmission.

In some examples of the method, the transmitting one or more assignments of uplink resources may include transmitting a first assignment of uplink resources associated with a first interval comprising a first duration, and transmitting a second assignment of uplink resources associated with a second interval comprising a second duration. The second duration may be different from the first duration.

In an example, an apparatus for wireless communication is described. In one example, the apparatus may include means for transmitting one or more assignments of uplink resources to use for an uplink transmission in a shared radio frequency spectrum band, means for detecting a duration of the uplink transmission, and means for identifying uplink resources used for the uplink transmission based at least in part on the detecting. In some examples, the apparatus may further include means for implementing one or more aspects of the method for wireless communication described above with respect to the fifth set of illustrative examples.

In an example, another apparatus for wireless communication is described. In one example, the apparatus may include a processor, memory in electronic communication with the processor, and instructions stored in the memory. The instructions may being executable by the processor to transmit one or more assignments of uplink resources to use for an uplink transmission in a shared radio frequency spectrum band, detect a duration of the uplink transmission, and identify uplink resources used for the uplink transmission based at least in part on the detecting. In some examples, the instructions may also be executable by the processor to implement one or more aspects of the method for wireless communication described above with respect to the fifth set of illustrative examples.

In an example, a computer program product for communication by a wireless communication apparatus in a wireless communication system is described. In one example, the computer program product may include a non-transitory computer-readable medium storing instructions executable by a processor to cause the wireless communication apparatus to transmit one or more assignments of uplink resources to use for an uplink transmission in a shared radio frequency spectrum band, detect a duration of the uplink transmission, and identify uplink resources used for the uplink transmission based at least in part on the detecting. In some examples, the instructions may also be executable by the processor to cause the wireless communication apparatus to implement one or more aspects of the method for wireless communication described above with respect to the fifth set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
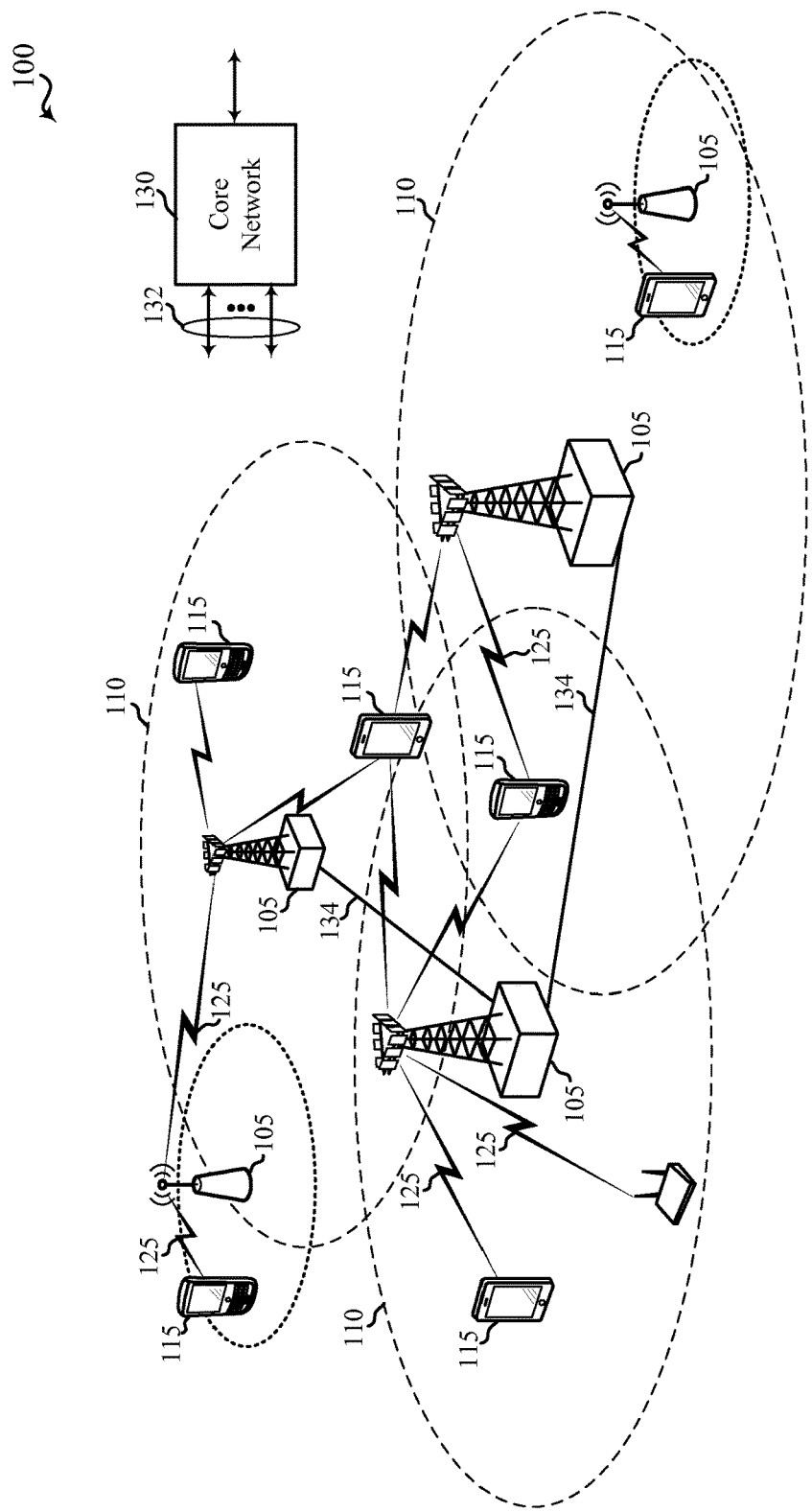
FIG. 1 shows a block diagram of a wireless communication system, in accordance with various aspects of the present disclosure.

Techniques are described in which resources for uplink transmissions in a shared radio frequency spectrum band are managed. In some examples, the shared radio frequency spectrum band may include an unlicensed radio frequency spectrum band for which apparatuses may need to contend for access because the radio frequency spectrum band is available for unlicensed use, such as Wi-Fi use. In other examples, the shared radio frequency spectrum band may include a licensed radio frequency spectrum band for which apparatuses may need to contend for access because the radio frequency spectrum band is available for use by two or more operators on a contention basis. In some examples, the shared radio frequency spectrum band may be used for cellular communications (e.g., Long Term Evolution (LTE) communications or LTE-Advanced (LTE-A) communications).

With increasing data traffic in cellular networks that use a licensed radio frequency spectrum band, offloading of at least some data traffic to a shared radio frequency spectrum band may provide a cellular operator (e.g., an operator of a public land mobile network (PLMN) or a coordinated set of base stations defining a cellular network, such as an LTE/

LTE-A network) with opportunities for enhanced data transmission capacity. Prior to gaining access to, and communicating over, the shared radio frequency spectrum band, a transmitting apparatus may, in some examples, perform an LBT procedure to gain access to the shared radio frequency spectrum band. Such an LBT procedure may include performing a CCA procedure (or extended CCA procedure) to determine whether a channel of the shared radio frequency spectrum band is available. When it is determined that a channel is not available, a CCA procedure (or extended CCA procedure) may be performed for the channel again at a later time.

When a UE uses an LBT-LBE protocol to contend for access to a shared radio frequency spectrum band, there is uncertainty regarding if and when the UE will successfully contend for access to the shared radio frequency spectrum band. For example, the UE may successfully contend for access to the shared radio frequency spectrum band for a portion of an assigned or intended interval for the uplink transmission. The techniques disclosed herein enable a UE and base station to determine what uplink resources to use when an actual interval for an uplink transmission is shorter than an assigned or intended interval for the uplink transmission.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or examples set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 shows a block diagram of a wireless communication system 100, in accordance with various aspects of the present disclosure. The wireless communication system 100 may include a plurality of base stations 105 (e.g., base stations forming parts or all of one or more eNBs), a number of UEs 115, and a core network 130. Some of the base stations 105 may communicate with the UEs 115 under the control of a base station controller (not shown), which may be part of the core network 130 or certain ones of the base stations 105 in various examples. Some of the base stations 105 may communicate control information or user data with the core network 130 through backhaul 132. In some examples, some of the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a Wi-Fi node or some other suitable terminology. The coverage area 110 for a base station 105 may be divided into sectors making up only a portion of the coverage area. The wireless communication system 100 may include base stations 105 of different types (e.g., macro, micro, or pico base stations). The base stations 105 may also utilize different radio technologies, such as cellular or WLAN radio access technologies. The base stations 105 may be associated with the same or different access networks or operator deployments (e.g., collectively referred to herein as "operators"). The coverage areas of different base stations 105, including the coverage areas of the same or different types of base stations 105, utilizing the same or different radio technologies, or belonging to the same or different access networks, may overlap.

In some examples, the wireless communication system 100 may include an LTE/LTE-A communication system (or network), which LTE/LTE-A communication system may support one or more modes of operation or deployment in a first radio frequency spectrum band (e.g., a radio frequency spectrum band for which apparatuses do not contend for access because the radio frequency spectrum band is licensed to certain users for certain uses, such as a licensed radio frequency spectrum band usable for LTE/LTE-A communications) or a second radio frequency spectrum band (e.g., a shared radio frequency spectrum band such as an unlicensed radio frequency spectrum band for which apparatuses may need to contend for access because the radio frequency spectrum band is available for unlicensed use, such as Wi-Fi use, or a licensed radio frequency spectrum band for which apparatuses may need to contend for access because the radio frequency spectrum band is available for use by two or more operators on a contention basis). In other examples, the wireless communication system 100 may support wireless communication using one or more access technologies different from LTE/LTE-A. In LTE/LTE-A communication systems, the term evolved NodeB or eNB may be, for example, used to describe ones or groups of the base stations 105.

The wireless communication system 100 may be or include a Heterogeneous LTE/LTE-A network in which different types of base stations 105 provide coverage for various geographical regions. For example, each base station 105 may provide communication coverage for a macro cell, a pico cell, a femto cell, or other type of cell. Small cells such as pico cells, femto cells, or other types of cells may include low power nodes or LPNs. A macro cell, for example, covers a relatively large geographic area (e.g., several kilometers in radius) and may allow unrestricted access by UEs with service subscriptions with the network provider. A pico cell would, for example, cover a relatively smaller geographic area and may allow unrestricted access by UEs with service subscriptions with the network provider. A femto cell would also, for example, cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1 application protocol, etc.). The base stations 105 may also communicate with one another, e.g., directly or indirectly via backhaul links 134 (e.g., X2 application protocol, etc.) or via backhaul 132 (e.g., through core network 130). The wireless communication system 100 may support synchronous or asynchronous operation. For synchronous operation, the eNBs may have similar frame or gating timing, and transmissions from different eNBs may be approximately aligned in time. For asynchronous operation, the eNBs may have different frame or gating timing, and transmissions from different eNBs may not be aligned in time.

The UEs 115 may be dispersed throughout the wireless communication system 100. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, etc. A UE 115 may be able to communicate with macro eNBs, pico eNBs, femto eNBs, relays, and the like. A UE 115 may also be able to communicate over different types of access networks, such as cellular or other wireless wide area network (WWAN) access networks, or wireless local area network (WLAN) access networks. In some modes of communication with a UE 115, communication may be conducted over a plurality of communication links 125 or channels (i.e., component carriers), with each channel using a component carrier between the UE 115 and one of a number of cells (e.g., serving cells, which cells may in some cases be operated by the same or different base stations 105).

Each component carrier may be provided over the first radio frequency spectrum band or the second (e.g., shared) radio frequency spectrum band, and a set of component carriers used in one mode of communication may all be received (e.g., at a UE 115) over the first radio frequency spectrum band, all be received (e.g., at a UE 115) over the second (e.g., shared) radio frequency spectrum band, or be received (e.g., at a UE 115) over a combination of the first radio frequency spectrum band and the second (e.g., shared) radio frequency spectrum band.

The communication links 125 shown in wireless communication system 100 may include uplink channels (using component carriers) for carrying uplink (UL) communications (e.g., transmissions from a UE 115 to a base station 105) or downlink channels (using component carriers) for carrying downlink (DL) communications (e.g., transmissions from a base station 105 to a UE 115). The UL communications or transmissions may also be called reverse link communications or transmissions, while the DL communications or transmissions may also be called forward link communications or transmissions. The downlink communications or uplink communications may be made using the first radio frequency spectrum band, the second (e.g., shared) radio frequency spectrum band, or both.

In some examples of the wireless communication system 100, LTE/LTE-A may be deployed under different scenarios using the second (e.g., shared) radio frequency spectrum band. The deployment scenarios may include a supplemental downlink mode in which LTE/LTE-A downlink communications in the first radio frequency spectrum band may be offloaded to the second (e.g., shared) radio frequency spectrum band, a carrier aggregation mode in which both LTE/LTE-A downlink and uplink communications may be offloaded from the first radio frequency spectrum band to the second (e.g., shared) radio frequency spectrum band, or a standalone mode in which LTE/LTE-A downlink and uplink communications between a base station 105 and a UE 115 may take place in the second (e.g., shared) radio frequency spectrum band. Base stations 105 as well as UEs 115 may in some examples support one or more of these or similar modes of operation. OFDMA waveforms may be used in the communication links 125 for LTE/LTE-A downlink communications in the first radio frequency spectrum band or the second (e.g., shared) radio frequency spectrum band, while OFDMA, SC-FDMA or resource block interleaved FDMA waveforms may be used in the communication links 125 for LTE/LTE-A uplink communications in the first radio frequency spectrum band or the second (e.g., shared) radio frequency spectrum band.

Figure 2:
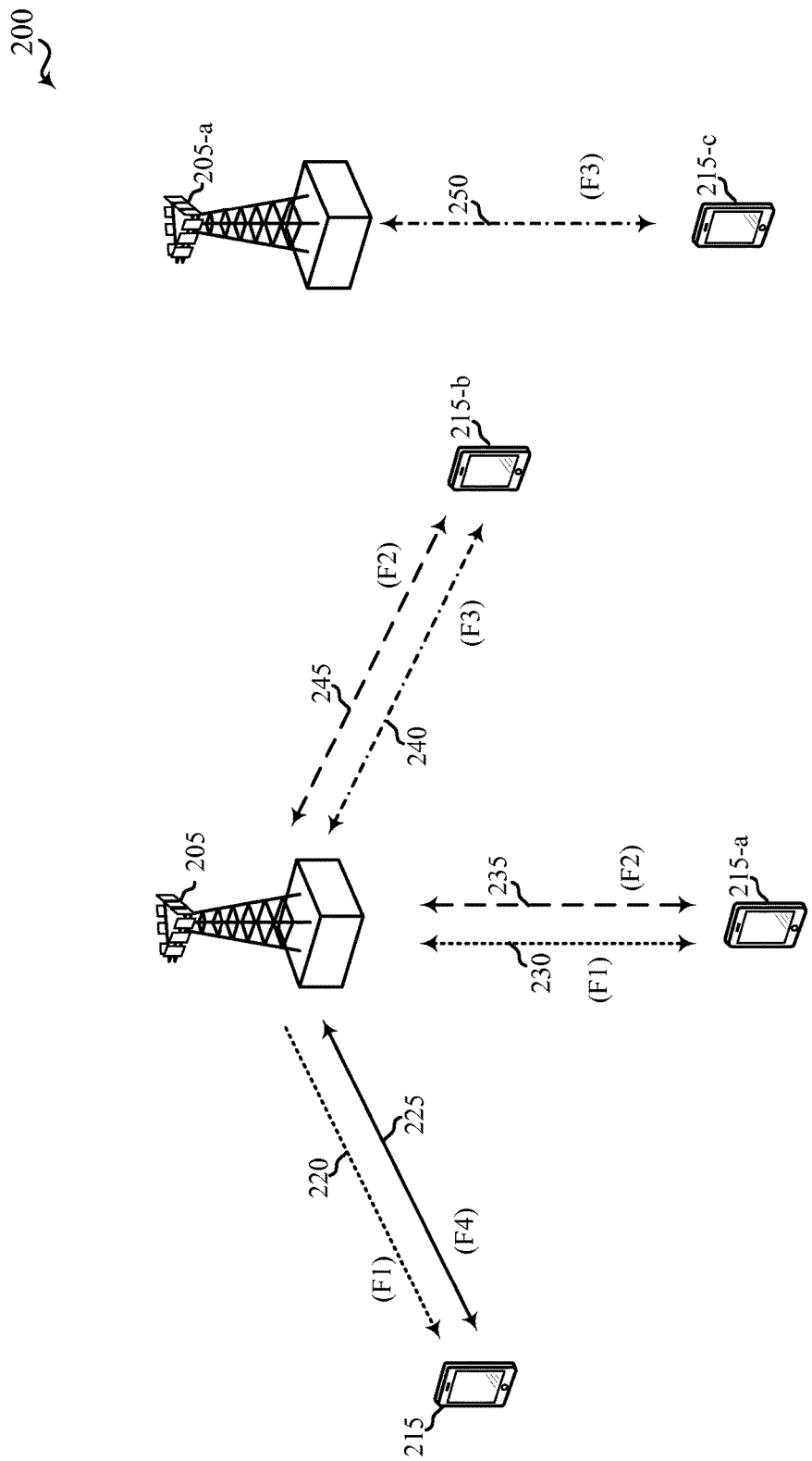
FIG. 2 shows a wireless communication system in which LTE/LTE-A is deployed under different scenarios using a shared radio frequency spectrum band (e.g., an unlicensed radio frequency spectrum band), in accordance with various aspects of the present disclosure.

FIG. 2 shows a wireless communication system 200 in which LTE/LTE-A is deployed under different scenarios using a shared radio frequency spectrum band (e.g., an unlicensed radio frequency spectrum band), in accordance with various aspects of the present disclosure. More specifically, FIG. 2 illustrates examples of a supplemental downlink mode, a carrier aggregation mode, and a standalone mode in which LTE/LTE-A is deployed using a shared radio frequency spectrum band. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first UE 215, a second UE 215-*a*, a third UE 215-*b*, and a fourth UE 215-*c* may be examples of aspects of one or more of the UEs 115 described with reference to FIG. 1.

In the example of a supplemental downlink mode in the wireless communication system 200, the first base station 205 may transmit OFDMA waveforms to the first UE 215 using a downlink channel 220. The downlink channel 220 may be associated with a frequency F1 in a shared radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a licensed radio frequency spectrum band. The downlink channel 220 in the shared radio frequency spectrum band and the first bidirectional link 225 in the licensed radio frequency spectrum band may operate concurrently. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a licensed radio frequency spectrum and needs to relieve some of the traffic or signaling congestion.

In one example of a carrier aggregation mode in the wireless communication system 200, the first base station 205 may transmit OFDMA waveforms to the second UE 215-*a* using a second bidirectional link 230 and may receive OFDMA waveforms, SC-FDMA waveforms, or resource block interleaved FDMA waveforms from the second UE 215-*a* using the second bidirectional link 230. The second bidirectional link 230 may be associated with the frequency F1 in the shared radio frequency spectrum band. The first base station 205 may also transmit OFDMA waveforms to the second UE 215-*a* using a third bidirectional link 235 and may receive SC-FDMA waveforms from the second UE 215-*a* using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum and needs to relieve some of the traffic or signaling congestion.

In another example of a carrier aggregation mode in the wireless communication system 200, the first base station 205 may transmit OFDMA waveforms to the third UE 215-*b* using a fourth bidirectional link 240 and may receive OFDMA waveforms, SC-FDMA waveforms, or resource block interleaved waveforms from the third UE 215-*b* using the fourth bidirectional link 240. The fourth bidirectional link 240 may be associated with a frequency F3 in the shared radio frequency spectrum band. The first base station 205 may also transmit OFDMA waveforms to the third UE 215-*b* using a fifth bidirectional link 245 and may receive SC-FDMA waveforms from the third UE 215-*b* using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in licensed radio frequency spectrum and shared access radio frequency spectrum for capacity offload.

As described above, one type of service provider that may benefit from the capacity offload offered by using LTE/LTE-A in shared access radio frequency spectrum is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the shared radio frequency spectrum band.

In the carrier aggregation mode, data and control may, for example, be communicated in the licensed radio frequency spectrum (e.g., via first bidirectional link 225, third bidirectional link 235, and fifth bidirectional link 245) while data may, for example, be communicated in the shared radio frequency spectrum band (e.g., via second bidirectional link 230 and fourth bidirectional link 240). The carrier aggregation mechanisms supported when using shared access radio frequency spectrum may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-*a* may transmit OFDMA waveforms to the fourth UE 215-*c* using a bidirectional link 250 and may receive OFDMA waveforms, SC-FDMA waveforms, or resource block interleaved FDMA waveforms from the fourth UE 215-*c* using the bidirectional link 250. The bidirectional link 250 may be associated with the frequency F3 in the shared radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting apparatus such as one of the base stations 105, 205, or 205-*a* described with reference to FIG. 1 or 2, or one of the UEs 115, 215, 215-*a*, 215-*b*, or 215-*c* described with reference to FIG. 1 or 2, may use a gating interval to gain access to a channel of a shared radio frequency spectrum band (e.g., to a physical channel of the shared radio frequency spectrum band). The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure, such as a clear channel assessment (CCA) procedure. The outcome of the CCA procedure may indicate to the transmitting device whether a channel of a shared radio frequency spectrum band is available or in use for the gating interval (also referred to as an LBT radio frame or a CCA frame). When a CCA procedure indicates that the channel is available (e.g., "clear" for use) for a corresponding LBT radio frame, the transmitting apparatus may reserve or use the channel of the shared radio frequency spectrum band during part or all of the LBT radio frame. When the CCA procedure indicates that the channel is not available (e.g., that the channel is in use or reserved by another apparatus), the transmitting apparatus may be prevented from using the channel during the LBT radio frame.

In some cases, it may be useful for a transmitting apparatus to generate a gating interval on a periodic basis and synchronize at least one boundary of the gating interval with at least one boundary of a periodic interval. For example, it may be useful to generate a periodic gating interval for a cellular downlink in a shared radio frequency spectrum band, and to synchronize at least one boundary of the periodic gating interval with at least one boundary of a periodic interval (e.g., a periodic LTE/LTE-A radio interval) associated with the cellular downlink. Examples of such synchronization are shown in FIG. 3.

Figure 3:
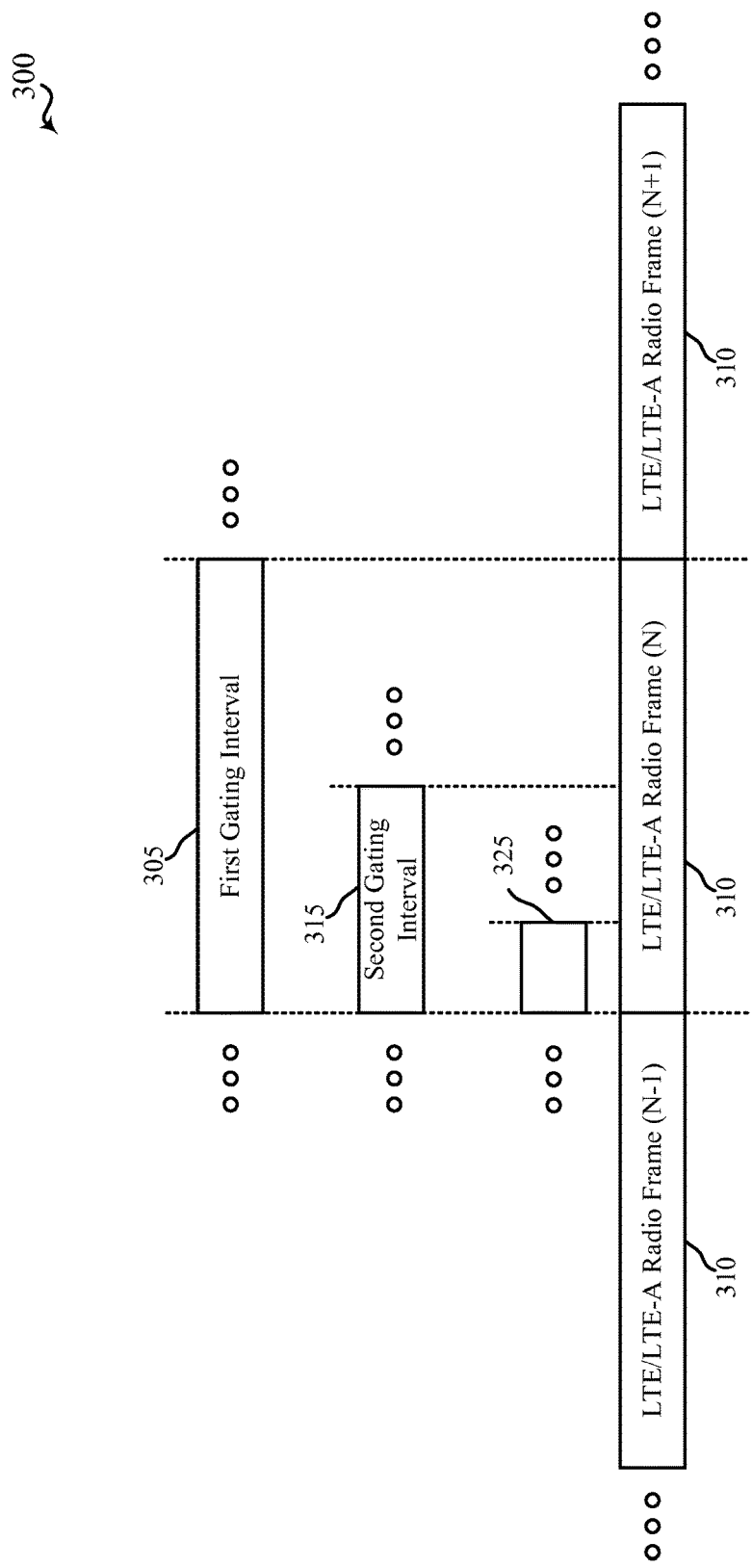
FIG. 3 shows examples of a gating interval (or LBT radio frame) for a cellular downlink in a shared radio frequency spectrum band (e.g., an unlicensed radio frequency spectrum band), in accordance with various aspects of the present disclosure.

FIG. 3 shows examples 300 of a gating interval (or LBT radio frame) for a cellular downlink in a shared radio frequency spectrum band (e.g., an unlicensed radio frequency spectrum band), in accordance with various aspects of the present disclosure. A first gating interval 305, a second gating interval 315, or a third gating interval 325 may be used as a periodic gating interval by an eNB or UE that supports transmissions over the shared radio frequency spectrum band. Examples of such an eNB may include the base stations 105, 205, or 205-a described with reference to FIG. 1 or 2, and examples of such a UE may include the UEs 115, 215, 215-a, 215-b, or 215-c described with reference to FIG. 1 or 2. The first gating interval 305, the second gating interval 315, or the third gating interval 325 may in some examples be used with the wireless communication system 100 or 200 described with reference to FIG. 1 or 2.

By way of example, the duration of the first gating interval 305 is shown to be equal to (or approximately equal to) a duration of an LTE/LTE-A radio frame 310 of a periodic interval associated with a cellular downlink. In some examples, "approximately equal" means the duration of the first gating interval 305 is within a cyclic prefix (CP) duration of the duration of the periodic interval.

At least one boundary of the first gating interval 305 may be synchronized with at least one boundary of the periodic interval that includes the LTE/LTE-A radio frames N−1 to N+1. In some cases, the first gating interval 305 may have boundaries that are aligned with the frame boundaries of the periodic interval. In other cases, the first gating interval 305 may have boundaries that are synchronized with, but offset from, the frame boundaries of the periodic interval. For example, the boundaries of the first gating interval 305 may be aligned with subframe boundaries of the periodic interval, or with subframe midpoint boundaries (e.g., the midpoints of certain subframes) of the periodic interval.

In some cases, the periodic interval may include LTE/LTE-A radio frames N−1 to N+1. Each LTE/LTE-A radio frame 310 may have a duration of ten milliseconds, for example, and the first gating interval 305 may also have a duration of ten milliseconds. In these cases, the boundaries of the first gating interval 305 may be synchronized with the boundaries (e.g., frame boundaries, subframe boundaries, or subframe midpoint boundaries) of one of the LTE/LTE-A radio frames (e.g., the LTE/LTE-A radio frame (N)).

By way of example, the durations of the second gating interval 315 and the third gating interval 325 are shown to be sub-multiples of (or approximate sub-multiples of) the duration of the periodic interval associated with the cellular downlink. In some examples, an "approximate sub-multiple of" means the duration of the second gating interval 315 or the third gating interval 325 is within a cyclic prefix (CP) duration of the duration of a sub-multiple of (e.g., half or one-fifth) the periodic interval. For example, the second gating interval 315 may have a duration of five milliseconds and the third gating interval 325 may have a duration of two milliseconds. The second gating interval 315 or the third gating interval 325 may be advantageous over the first gating interval 305 because its shorter duration may facilitate more frequent sharing of a shared radio frequency spectrum band.

Figure 4:
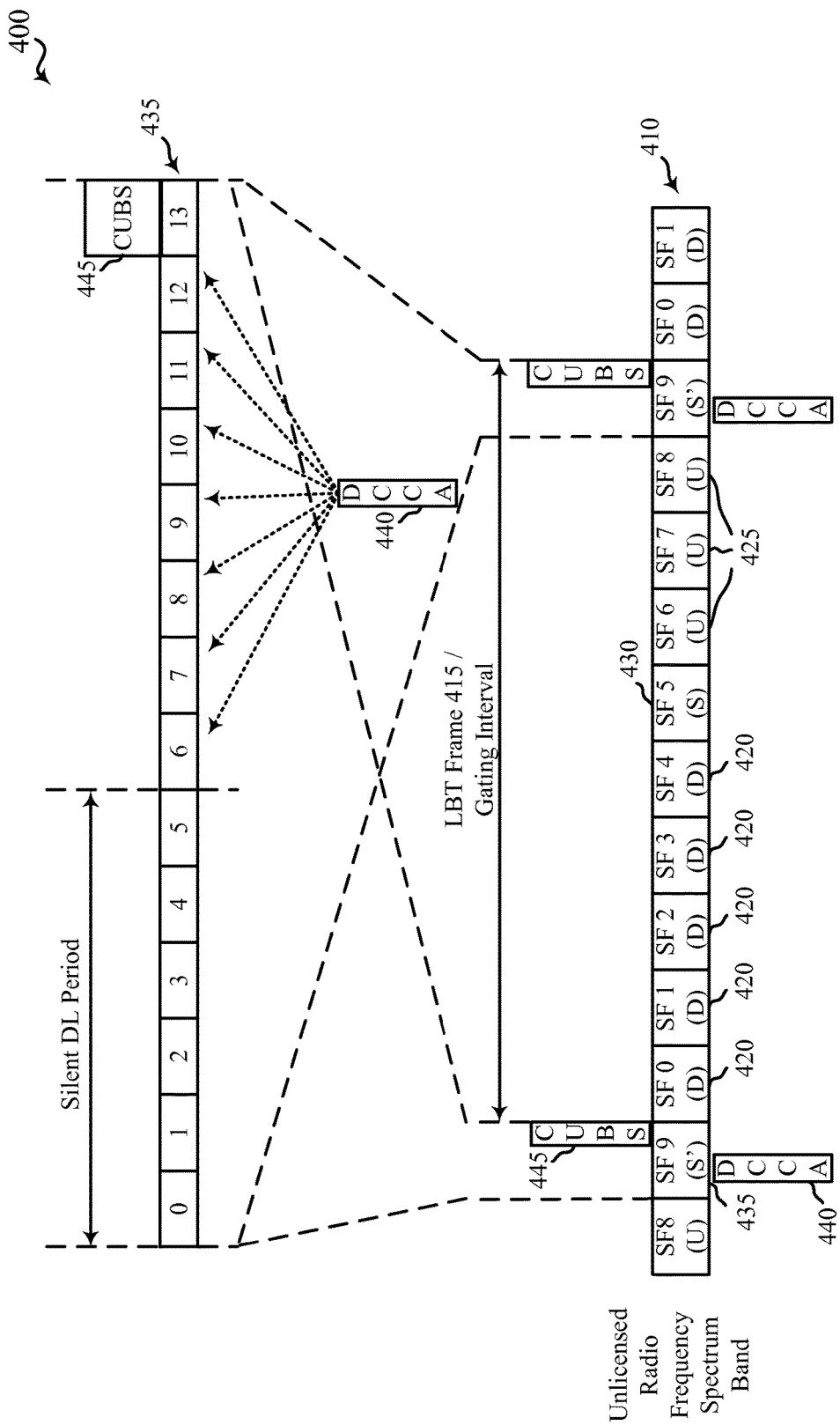
FIG. 4 shows an example of a wireless communication over unlicensed shared radio frequency spectrum band (e.g., an unlicensed radio frequency spectrum band), in accordance with various aspects of the present disclosure.

FIG. 4 shows an example 400 of a wireless communication 410 over unlicensed shared radio frequency spectrum band (e.g., an unlicensed radio frequency spectrum band), in accordance with various aspects of the present disclosure. An LBT radio frame 415, which may correspond to a gating interval such as the first gating interval 305 described with reference to FIG. 3, may have a duration of ten milliseconds and include a number of downlink subframes 420, a number of uplink subframes 425, and two types of special subframes, an S subframe 430 and an S' subframe 435. The S subframe 430 may provide a transition between downlink subframes 420 and uplink subframes 425, while the S' subframe 535 may provide a transition between uplink subframes 425 and downlink subframes 420. During the S' subframe 435, a downlink clear channel assessment (DCCA) procedure 440 may be performed by one or more base stations, such as one or more of the base stations 105, 205, or 205-a described with reference to FIG. 1 or 2, to reserve, for a period of time, the channel over which the wireless communication 410 occurs. Following a successful DCCA procedure 440 by a base station, the base station may transmit a channel usage beacon signal (CUBS) 445 to provide an indication to other base stations or apparatuses (e.g., UEs, Wi-Fi access points, etc.) that the base station has reserved the channel. In some examples, a CUBS 445 may be transmitted using a plurality of interleaved resource blocks. Transmitting a CUBS 445 in this manner may enable the CUBS 445 to occupy at least a certain percentage of the available frequency bandwidth in the shared radio frequency spectrum band and satisfy one or more regulatory requirements (e.g., a requirement that the CUBS 445 occupy at least 80% of the available frequency bandwidth). The CUBS 445 may in some examples take a form similar to that of an LTE/LTE-A cell-specific reference signal (CRS) or channel state information reference signal (CSI-RS). When the DCCA procedure 440 fails, the CUBS 445 is not transmitted.

The S' subframe 435 may include 14 OFDM symbols, numbered 0 through 13 in FIG. 4. A first portion of the S' subframe 435, symbols 0 through 5 in this example, may be used by base stations as a silent DL period, which may be required for compatibility with LTE/LTE-A communication standards. Thus, a base station may not transmit data during the silent DL period, although a UE may transmit some amount of uplink data during the silent DL period. A second portion of the S' subframe 435 may be used for the DCCA procedure 440. In the example 400, the S' subframe 435 includes seven DCCA slots, included in symbols 6 through 12. Use of the DCCA slots by different network operators may be coordinated to provide more efficient system operation. In some examples, in order to determine which of the seven possible DCCA slots to use to perform a DCCA procedure 440, a base station 105 may evaluate a mapping-function of the form:

$$F_D(\text{GroupID}, t) \in \{1, 2, 3, 4, 5, 6, 7\}$$

where GroupID is a "deployment group-id" assigned to the base station 105, and t is the LBT radio frame number corresponding to a gating interval or frame for which the DCCA procedure 440 is performed.

Figure 5:
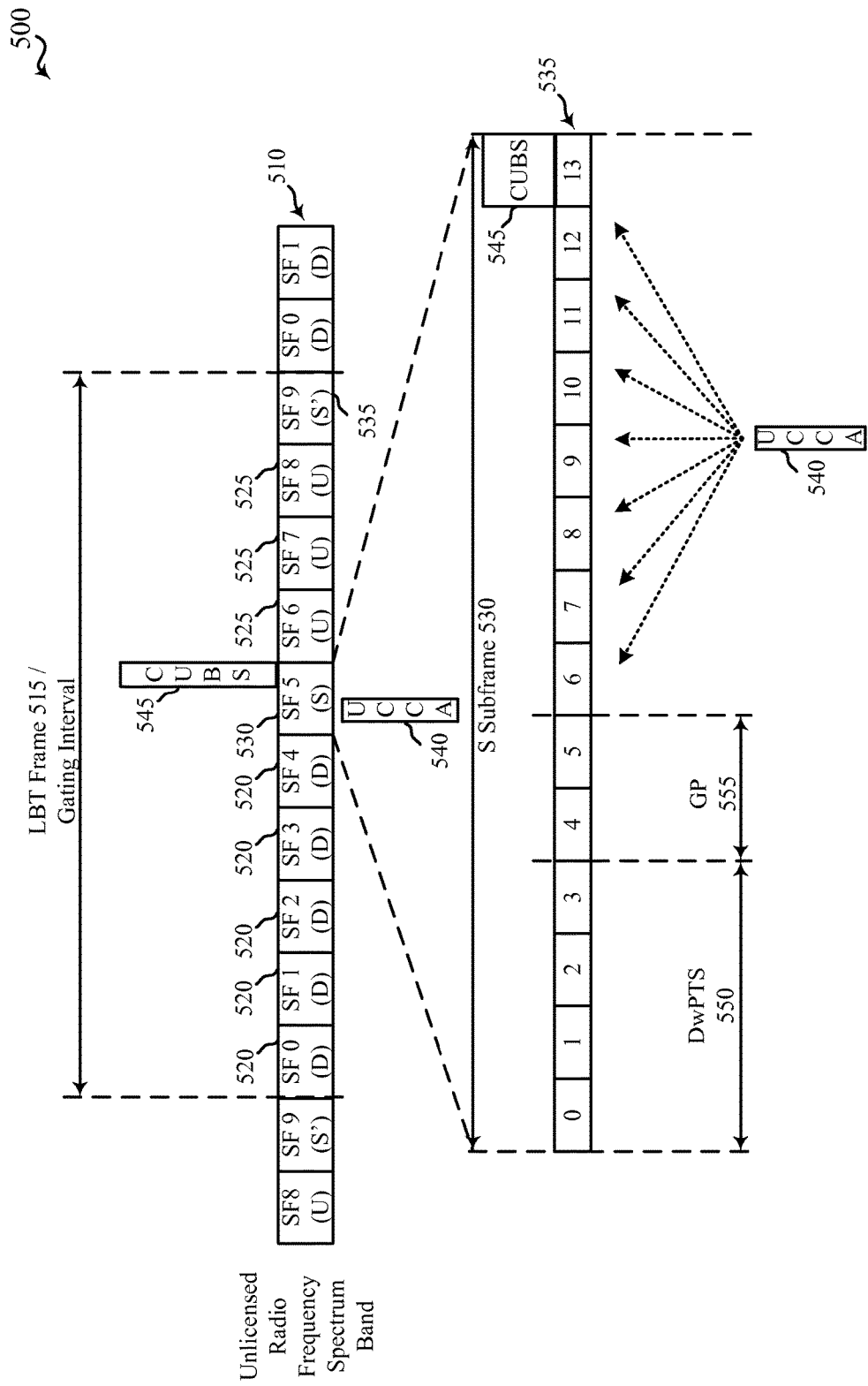
FIG. 5 shows an example of a wireless communication over a shared radio frequency spectrum band (e.g., an unlicensed radio frequency spectrum band), in accordance with various aspects of the present disclosure.

FIG. 5 shows an example 500 of a wireless communication 510 over a shared radio frequency spectrum band (e.g., an unlicensed radio frequency spectrum band), in accordance with various aspects of the present disclosure. An LBT radio frame 515, which may correspond to a gating interval such as the first gating interval 305 described with reference to FIG. 3 or the LBT radio frame 415 described with reference to FIG. 4, may have a duration of ten milliseconds and include a number of downlink subframes 520, a number of uplink subframes 525, and two types of special subframes (e.g., an S subframe 530 and an S' subframe 535. The S subframe 530 may provide a transition between downlink subframes 520 and uplink subframes 525, while the S' subframe 535 may provide a transition between uplink subframes 525 and downlink subframes 520. During the S subframe 530, an uplink CCA (UCCA) procedure 540 may be performed by one or more UEs, such as one or more of the UEs 115, 215, 215-a, 215-b, or 215-c described above with reference to FIG. 1 or 2, to reserve, for a period of time, the channel over which the wireless communication 510 occurs. Following a successful UCCA procedure 540 by a UE, the UE may transmit a CUBS 545 to provide an indication to other UEs or apparatuses (e.g., base stations, Wi-Fi access points, etc.) that the UE has reserved the channel. In some examples, a CUBS 545 may be transmitted using a plurality of interleaved resource blocks. Transmitting a CUBS 545 in this manner may enable the CUBS 545 to occupy at least a certain percentage of the available frequency bandwidth in the shared radio frequency spectrum band and satisfy one or more regulatory requirements (e.g., a requirement that the CUBS 545 occupy at least 80% of the available frequency bandwidth). The CUBS 545 may in some examples take a form similar to that of an LTE/LTE-A cell-specific reference signal (CRS) or channel state information reference signal (CSI-RS). When the UCCA procedure 540 fails, the CUBS 545 is not transmitted.

The S subframe 530 may include 14 OFDM symbols, numbered 0 through 13 in FIG. 5. A first portion of the S subframe 530, symbols 0 through 3 in this example, may be used as a downlink pilot time slot (DwPTS) 550, and a second portion of the S subframe 530 may be used as a guard period (GP) 555. A third portion of the S subframe 530 may be used for UCCA procedure 540. In the example 500, the S subframe 530 includes seven UCCA slots, included in symbols 6 through 12. Use of the UCCA slots by different UEs may be coordinated to provide more efficient system operation. In some examples, in order to determine which of the seven possible UCCA slots to use to perform a UCCA procedure 540, a UE may evaluate a mapping-function of the form:

$$F_u(GroupID, t) \in \{1,2,3,4,5,6,7\}$$

where GroupID is a "deployment group-id" assigned to the UE, and t is the LBT radio frame number corresponding to a frame for which a UCCA procedure 540 is performed.

The mapping function for a DCCA procedure 440 or a UCCA procedure 540 may be constructed based on different criteria, depending on whether the mapping function will have an orthogonalization or a non-orthogonalization property. In examples with orthogonal LBT access, the mapping function may have an orthogonalization property according to:

$$F_{D/U}(x,t) \neq F_{D/U}(y,t)$$

$$GroupID\ x,y \in \{1,2,3,4,5,6,7\}$$

for all time t, whenever x≠y represent different group-ids. In this case, base stations or UEs with different group-ids may perform CCA procedures (e.g., DCCA procedures 440 or UCCA procedures 540) during non-overlapping CCA slots. In the absence of interference, the base station or UE with the group-id which maps to an earlier CCA slot may secure the channel for a period of time. According to various deployments, the mapping-function is fair, in the sense that across different time indices t, the mapping $\{F_{D/U}(x,t), t=1, 2, 3, \ldots\}$ varies such that different group-ids have an equal chance of mapping to an earlier CCA slot (and hence secure the channel in the absence of other interference) over a suitably long interval of time.

All base stations and UEs deployed by the same network operator/service-provider may be assigned the same group-id, so that they do not preempt each other in the contention process. This allows full frequency reuse among base stations and UEs of the same deployment, leading to enhanced system throughput. Base stations or UEs of different deployments may be assigned different group-ids, so that with orthogonal CCA slot mapping, access to the channel is mutually exclusive.

In examples with non-orthogonal, or overlapping, CCA slot access, the mapping function may allow more than seven group ids. In some situations, for example, it may be useful to support more than seven deployment group-ids, in which case it is not possible to maintain the orthogonality property of CCA slot mapping functions. In such cases, it may be desirable to reduce the frequency of collision between any two group-ids. In some examples, non-orthogonal CCA slot mapping sequences may also be used to provide fair channel access among deployments without tight coordination on LBT opportunities. One example of a non-orthogonal CCA slot mapping sequence is given by:

$$F_{D/U}(x,t) = R_{1,7}(x,t)$$

$$GroupID\ x \in \{1,2, \ldots 2^{16}\}$$

where $R_{1,7}(x,t)$ is a pseudo-random number generator between 1 and 7 chosen independently for GroupID x. In this case, there could be potential collisions between base stations or UEs of different GroupID's in the same LBT radio frame t.

Thus, CCA slots may be selected according to the noted mapping functions and used for a DCCA procedure 440 or a UCCA procedure 540.

In each of FIGS. 4 and 5, the period between successful performance of a DCCA procedure 440 and the start of a transmission period for which the DCCA procedure 440 was performed (see, e.g., FIG. 4), or the period between successful performance of a UCCA procedure 540 and the start of a transmission period for which the UCCA procedure 540 was performed (see, e.g., FIG. 5), may be referred to as a preamble. Because of variability in when a DCCA procedure 440 or UCCA procedure 540 is performed, the length of a preamble may vary. However, in each of the examples shown in FIGS. 4 and 5, the preamble ends following transmission of the CUBS 445 (see, e.g., FIG. 4) or the CUBS 545 (see, e.g., FIG. 5).

Figure 6:
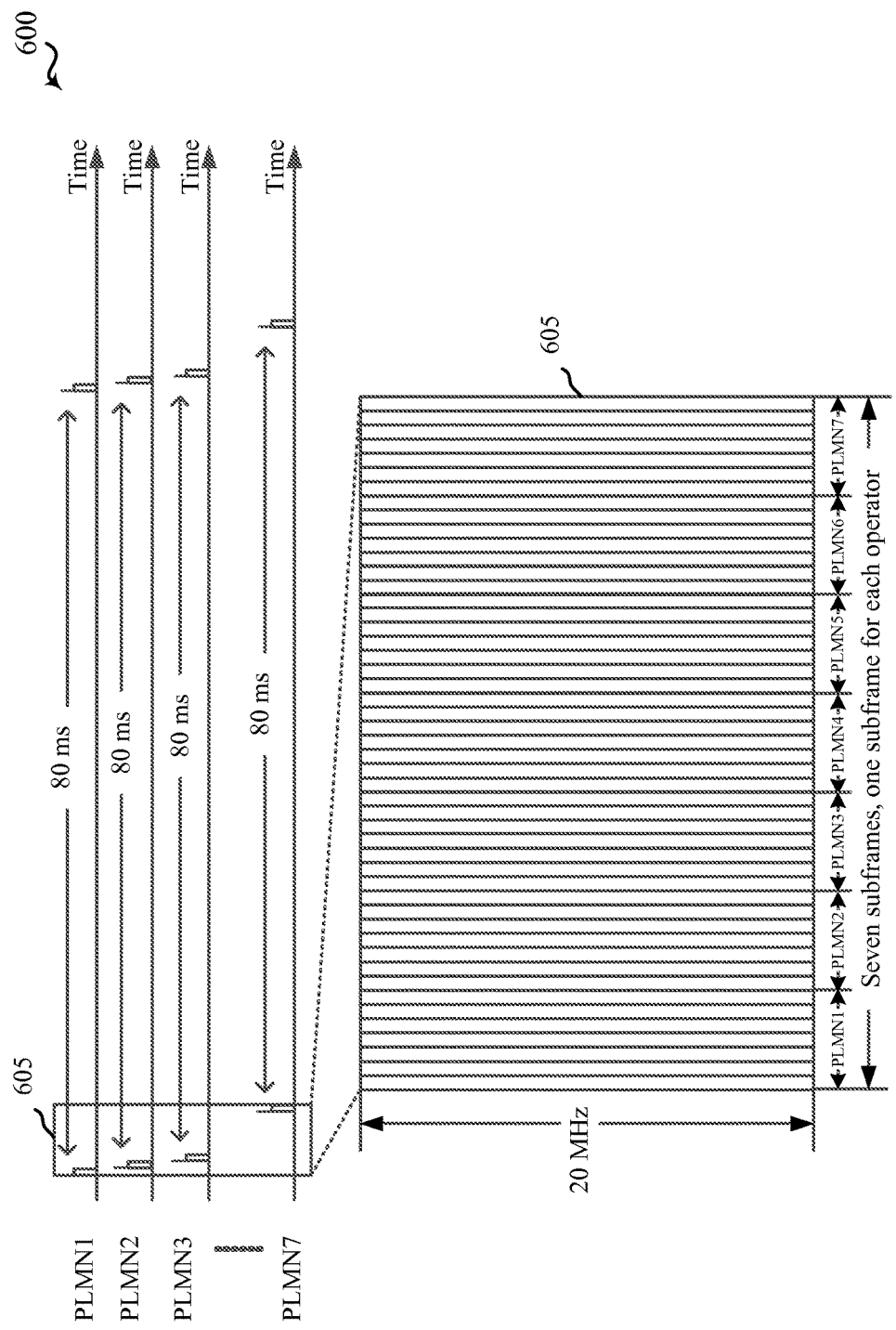
FIG. 6 shows an example of resource allocations for CCA-Exempt Transmissions (CETs) of synchronous operators in a shared radio frequency spectrum band (e.g., an unlicensed radio frequency spectrum band), in accordance with various aspects of the present disclosure.

FIG. 6 shows an example 600 of resource allocations for CCA-Exempt Transmissions (CETs) of synchronous operators in a shared radio frequency spectrum band (e.g., an unlicensed radio frequency spectrum band), in accordance with various aspects of the present disclosure. A CET may be made without a need to perform a CCA (e.g., a DCCA or an uplink CCA (UCCA)) to first gain access to the shared radio frequency spectrum band. Instead, an operator is exempted from performing a CCA for the purpose of transmitting a CET.

As shown, an allocation of resources 605 for CETs may be made, for example, once every eighty milliseconds (80 ms) or once every CET period, where the CET period may have a configurable periodicity. Each of a number of operators in the shared spectrum (e.g., different PLMNs) may be provided a separate subframe (shown) or subframes (not shown) for transmitting CETs. By way of example, FIG. 6 shows adjacent CET subframes for seven different operators (e.g., operators PLMN1, PLMN2, . . . , PLMN7). Such a CET transmission framework may be applicable to a downlink or uplink between a base station and a UE.

Under most conditions, the use of an LBT-FBE protocol by a transmitting apparatus, as described above, provides sufficient access to a shared radio frequency spectrum band (e.g., an unlicensed radio frequency spectrum band). The use of an LBT-FBE protocol can be advantageous as it may enable frequency reuse 1 among base stations or eNBs associated with the same operator. However, under some scenarios, one or more Wi-Fi nodes may prevent an LTE/LTE-A node from accessing a channel of the shared radio frequency spectrum band. In these scenarios, use of an LBT-LBE protocol may be advantageous over an LBT-FBE protocol (despite the fact that use of an LBT-LBE protocol may prevent frequency reuse 1 under some conditions), in that a transmitting apparatus may persistently attempt to access the shared radio frequency spectrum band when employing an LBT-LBE protocol. For example, the transmitting apparatus may attempt to access the medium for a random duration of N CCA procedures, but for a maximum duration controlled by the parameter q. A smaller value of q implies a shorter maximum extended CCA procedure duration and shorter radio frame length.

A transmitting apparatus capable of using an LBT-FBE protocol under most conditions, and an LBT-LBE protocol when necessary, may be useful in some wireless communication systems. Such a transmitting apparatus may use a same or similar LBT radio interval when using either the LBT-FBE protocol or the LBT-LBE protocol, but may use somewhat different CCA procedures for the different protocols.

In some examples of an LBT-LBE protocol, a transmitting apparatus may perform a CCA procedure and, when the CCA procedure is successful, immediately begin transmitting over a channel of a shared radio frequency spectrum band (e.g., an unlicensed radio frequency spectrum band). However, when the CCA procedure is unsuccessful, the transmitting apparatus may perform an extended CCA (ECCA) procedure by selecting a random integer, N, between 1 and q, where q has a value of $4 \leq q \leq 32$ advertised by an operator or vendor. Upon selecting a value for the random integer, N, the transmitting apparatus may wait to access the shared radio frequency spectrum band for N CCA procedures where a channel of the shared radio frequency spectrum band is found to be clear. Upon the channel of the shared radio frequency spectrum band being found clear for the N CCA procedures, the transmitting apparatus may transmit over the shared radio frequency spectrum band for at most $(13/32) \times q$ milliseconds (msec) before needing to perform another extended CCA procedure. The $(13/32) \times q$ msec transmission time is therefore a maximum channel occupancy time (i.e., MaxChannelOccupancyTime).

Figure 7:
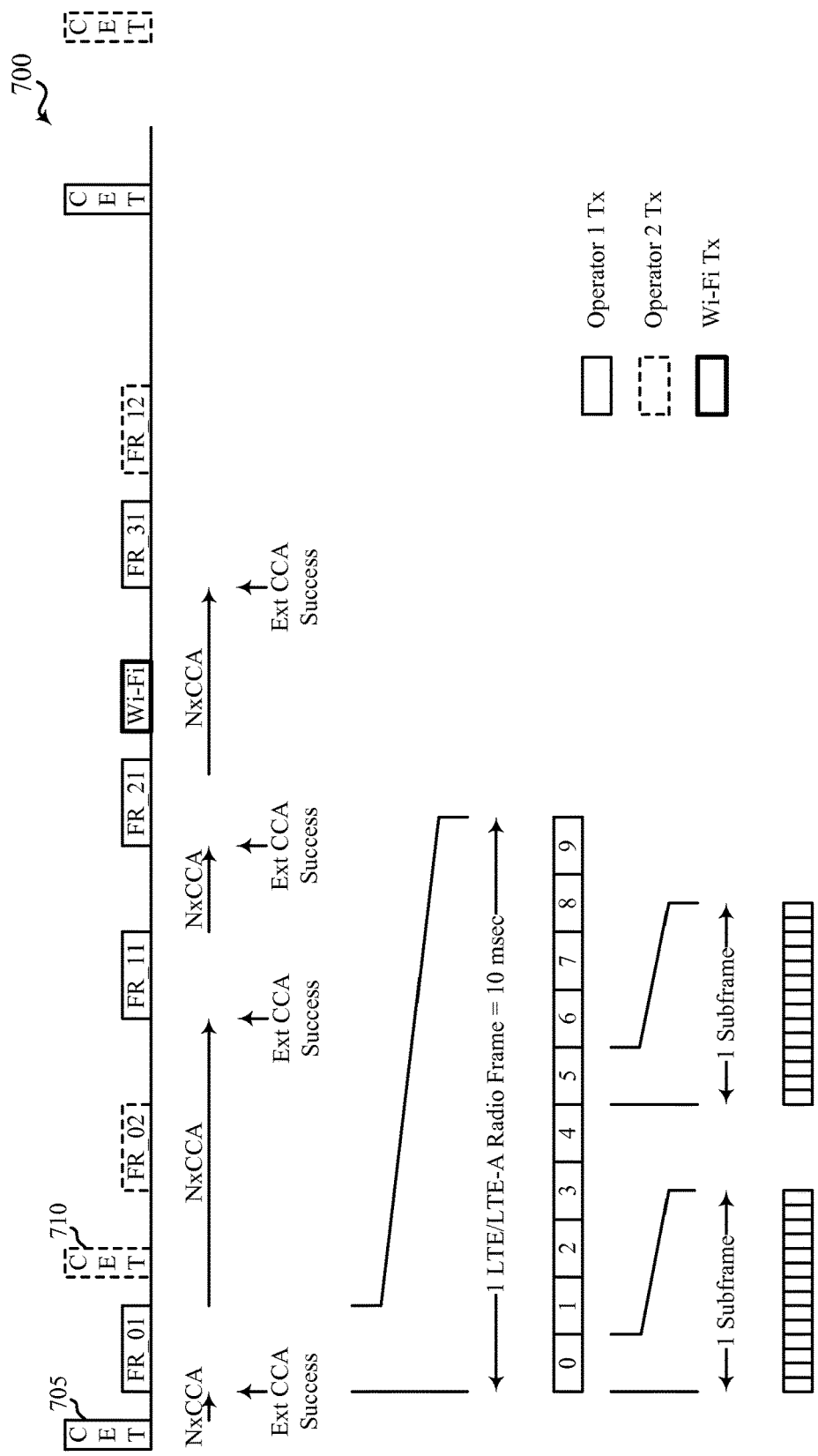
FIG. 7 shows a timing diagram of wireless communications over a shared radio frequency spectrum band (e.g., an unlicensed radio frequency spectrum band), in accordance with various aspects of the present disclosure.

FIG. 7 shows a timing diagram 700 of wireless communications over a shared radio frequency spectrum band (e.g., an unlicensed radio frequency spectrum band), in accordance with various aspects of the present disclosure. In some examples, the shared radio frequency spectrum band may be a radio frequency spectrum band for which apparatuses may need to contend for access because the radio frequency spectrum band is available, at least in part, for unlicensed use (e.g., Wi-Fi use or LTE/LTE-A use in an unlicensed radio frequency spectrum band).

By way of example, the wireless communications shown in FIG. 7 include communications (or transmissions (Tx)) by an Operator 1, an Operator 2, and a Wi-Fi node. By way of further example, transmitters of Operator 1 and Operator 2, as well as the Wi-Fi node, may be within CCA range of each other. Operator 1 may transmit a CCA-Exempt Transmission (CET) 705 over the shared radio frequency spectrum band, followed by a first number of radio frames (e.g., radio frames FR_01, FR_11, FR_21, or FR_31). Operator 2 may transmit a CET 710 over the shared radio frequency spectrum band, followed by a second number of radio frames (e.g., radio frames FR_02 or FR_12). The Wi-Fi node may also transmit over the shared radio frequency spectrum band (e.g., the transmission labeled Wi-Fi). When a transmitter associated with Operator 1 is transmitting over a channel of the shared radio frequency spectrum band, Operator 2 and the Wi-Fi node may be prevented from accessing the channel of the shared radio frequency spectrum band. When a transmitter associated with Operator 2 is transmitting over a channel of the shared radio frequency spectrum band, transmitters of Operator 1 and the Wi-Fi node may be prevented from accessing the channel of the shared radio frequency spectrum band. When the Wi-Fi node is transmitting over a channel of the shared radio frequency spectrum band, transmitters associated with Operator 1 and Operator 2 may be prevented from accessing the channel of the shared radio frequency spectrum band.

In some examples, the transmitters of Operator 1 and Operator 2 may gain access to the shared radio frequency spectrum band (or a channel thereof) by performing an extended CCA procedure labeled NxCCA. Access is only gained when an extended CCA procedure is successful (labeled as Ext CCA Success).

In some examples, each radio frame transmitted by Operator 1 or Operator 2 may be an LTE/LTE-A radio frame having 10 subframes and a duration of 10 msec. Each subframe may include, for example, fourteen OFDM symbols. The subframes may variously include data subframes, uplink subframes, or special subframes (e.g., subframes used to transmit control information, synchronization signals, some data, etc.).

Figure 8:
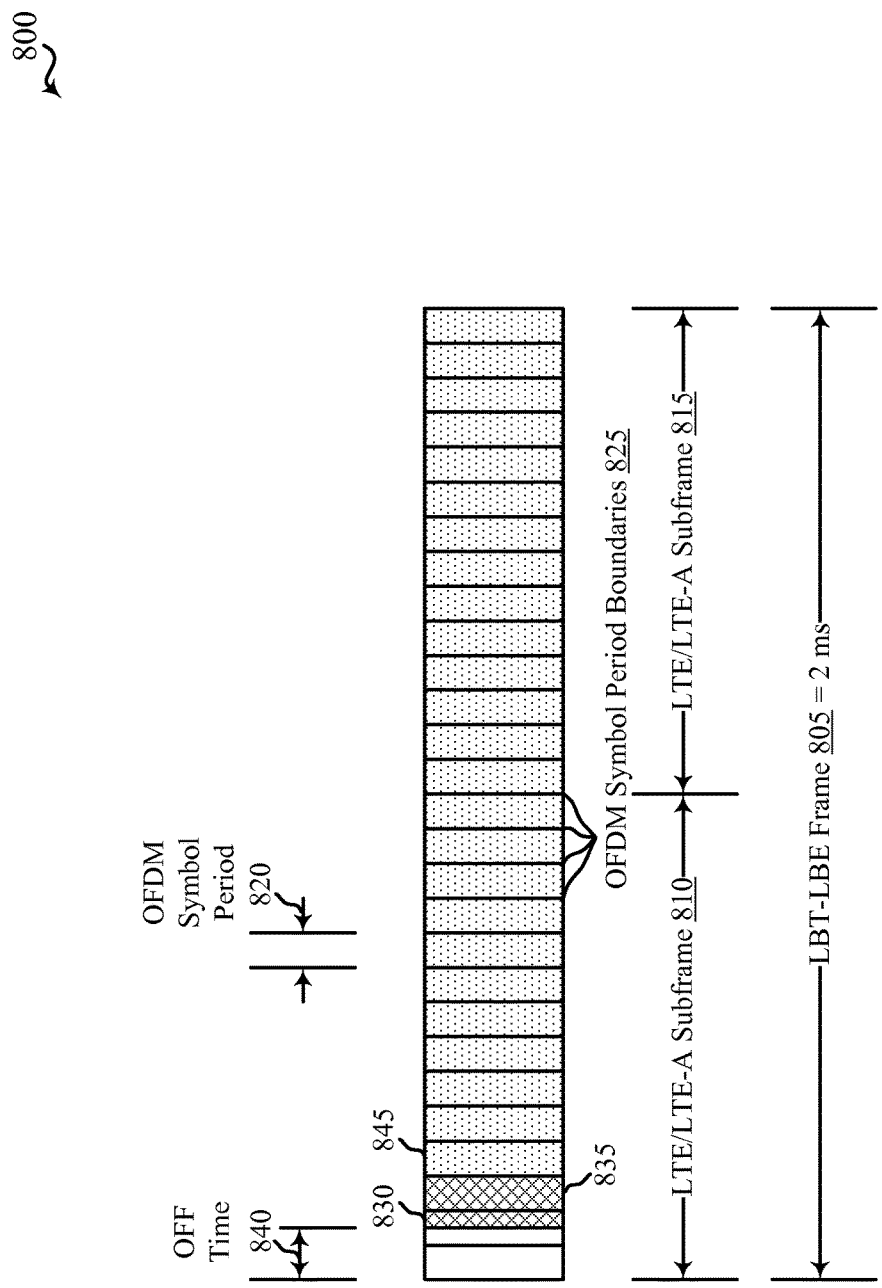
FIG. 8 shows an example of how a first signal may be transmitted while operating in an LBT-LBE mode of operation in a shared radio frequency spectrum band (e.g., an unlicensed radio frequency spectrum band), to align a starting point of a second signal with a reference boundary associated with the shared radio frequency spectrum band, in accordance with various aspects of the present disclosure.

When operating in accordance with an LBT-LBE protocol, frame level alignment among the cells of an operator can be ensured by design. However, different cells may succeed at performing extended CCA procedures at different times, creating a potential for transmission frames having different starting points or ending points. FIG. 8 illustrates one technique for aligning frames of different cells.

FIG. 8 shows an example 800 of how a first signal may be transmitted while operating in an LBT-LBE mode of operation in a shared radio frequency spectrum band (e.g., an unlicensed radio frequency spectrum band), to align a starting point of a second signal with a reference boundary associated with the shared radio frequency spectrum band, in accordance with various aspects of the present disclosure. More particularly, FIG. 8 shows an LBT-LBE radio frame 805 having a duration of 2 ms. The LBT-LBE radio frame 805 may include a first LTE/LTE-A subframe 810 and a second LTE/LTE-A subframe 815, each having a duration of 1 ms. Each of the first LTE/LTE-A subframe 810 and the second LTE/LTE-A subframe 815 may include a plurality of OFDM symbol periods 820 (e.g., 14 OFDM symbol periods) bounded by a plurality of OFDM symbol period boundaries 825.

In some examples, a base station may transmit a synchronization or alignment signal during a first part of the first LBT-LBE radio frame 805 (e.g., at or near the beginning of the first LBT-LBE radio frame 805). The synchronization or alignment signal may be transmitted, for example, because the timing of the start of the LBT-LBE radio frame 805 can vary based on the timing of the conclusion of a successful extended CCA procedure (e.g., the timing of the conclusion of the successful extended CCA procedure can vary with reference to an OFDM symbol boundary, slot boundary, or subframe boundary of an LBT-FBE interval over the shared radio frequency spectrum band, with reference to the timing of a discovery signal (e.g., a CET) transmitted over the shared radio frequency spectrum band, or with reference to an OFDM symbol boundary, slot boundary, or subframe boundary of a transmission over a licensed radio frequency spectrum band (e.g., an OFDM symbol boundary, slot boundary, or subframe boundary of a transmission from a primary serving cell over the licensed radio frequency spectrum band)), or because OFDM symbol level synchronization may be desirable among the downlink transmissions of a base station or eNB.

In some examples, the synchronization or alignment signal may include a variable length training sequence 830 (e.g., a fractional CUBS having a duration less than a duration of an OFDM symbol period 820) but no fixed length training sequence 835. In other examples, the synchronization or alignment signal may include a variable length training sequence 830 and at least one fixed length training sequence 835 (e.g., at least one CUBS, each spanning an OFDM symbol period). In other examples, the synchronization or alignment signal may include a fixed length training sequence 835 but no variable length training sequence 830. The variable length training sequence 830 or fixed length training sequence 835 (which may individually or collectively constitute a first signal) may in some examples be used to align a downlink transmission with an OFDM symbol period boundary 825 of an OFDM symbol period 820.

By way of example, FIG. 8 shows the first LTE/LTE-A subframe 810 starting with an OFF time 840, followed by a variable length training sequence 830, a fixed length training sequence 835, and a downlink transmission 845. In some examples, the OFF time 840 may have a duration of 100 microseconds (μsec), determined, for example, by a minimum OFF time of 100 μsec for LBT-FBE transmissions and a maximum OFF time of 100 μsec (5×20 μsec) for LBT-LBE transmissions.

Figure 9:
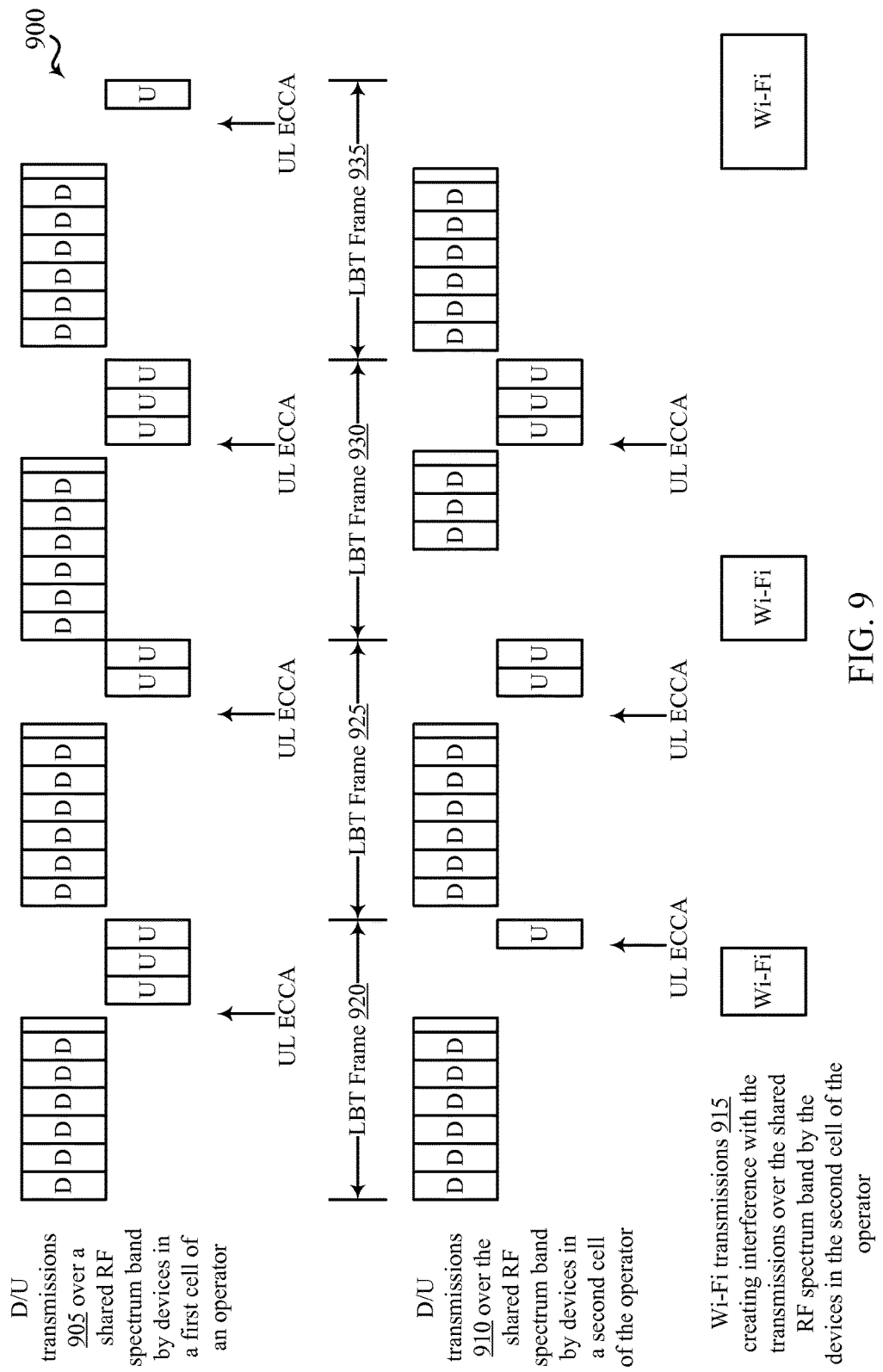
FIG. 9 shows an example of various transmissions over a shared radio frequency spectrum band (e.g., an unlicensed radio frequency spectrum band), in accordance with an LBT-LBE protocol, and in accordance with various aspects of the present disclosure.

FIG. 9 shows an example 900 of various transmissions over a shared radio frequency spectrum band (e.g., an unlicensed radio frequency spectrum band), in accordance with an LBT-LBE protocol, and in accordance with various aspects of the present disclosure. By way of example, the transmissions include downlink (D) transmissions and uplink (U) transmissions (collectively referred to as D/U transmissions) 905 over the shared radio frequency spectrum band by devices in a first cell of an operator, D/U transmissions 910 over the shared radio frequency spectrum band by devices in a second cell of the operator, and Wi-Fi transmissions 915 over the shared radio frequency (RF) spectrum band. Each of the blocks labeled D or U represents a respective downlink (D) subframe transmitted by a base station or an uplink (U) subframe transmitted by a UE.

As shown, the number of uplink subframes transmitted by a device in the first cell of the operator, or a device in the second cell of the operator, may vary from one LBT frame to another depending on the time it takes the devices to perform a successful extended CCA (e.g., a successful UL ECCA). For example, a device in the first cell of the operator may transmit three uplink subframes in each of a first LBT frame 920 and a third LBT frame 930, two subframes in a second LBT frame 925, and one subframe in a fourth LBT frame 935. By way of further example, a device in the second cell of the operator may transmit one uplink subframe in the first LBT frame 920, two uplink subframes in the second LBT frame 925, three uplink subframes in the third LBT frame 930, and no uplink subframes in the fourth LBT frame 935. The time it takes a device to perform a successful UL ECCA may depend, for example, on interference created by Wi-Fi transmissions. As shown in FIG. 9, the Wi-Fi transmissions 915 create interference with the transmissions 910 over the shared radio frequency spectrum band by the devices in the second cell of the operator.

In some examples, power control may be provided for the downlink transmissions or the uplink transmissions of a wireless communication system. In some examples, power control may be provided for transmissions over a shared radio frequency spectrum band. For power control of LTE/LTE-A downlink transmissions, including LTE/LTE-A downlink transmissions over a shared radio frequency spectrum band, the total transmission power of downlink transmissions by a cell may be broadcast in a system information block one (SIB1). This may help a UE perform a path loss measurement. In some examples, a common reference signal (CRS) in a downlink transmission may be power boosted. While power control for control/data downlink transmissions may be largely unspecified and left to implementation, there may be some practical limitations on power control for control/data downlink transmissions. For example, power boosting of control/data downlink transmissions may be limited to no more than a threshold (e.g., 6 dB). In some examples, traffic to pilot power ratio (TPR) may be fixed for high modulation orders (16 quadrature amplitude modulation (16 QAM) and above) of CRS based physical downlink shared channel (PDSCH). TPR may also be fixed for demodulation reference signal (DM-RS) based PDSCH.

For power control of LTE/LTE-A uplink transmissions, including LTE/LTE-A uplink transmissions over a shared radio frequency spectrum band, both open-loop and closed-loop power control may be supported. In some examples, an accumulative power control mode or an absolute power control mode may be supported for physical uplink shared channel (PUSCH) power control or sounding reference signal (SRS) power control. A UE may be configured on higher layers regarding which power control mode (accumulative or absolute) is to be used by the UE for PUSCH power control or SRS power control. In some examples, a configurable power offset may be provided between SRS power control and PUSCH power control. A bandwidth difference between SRS power control and PUSCH power control may also be provided for. In some examples, only an accumulative power mode may be supported for physical uplink control channel (PUCCH) power control.

In an LTE/LTE-A network, power control for downlink transmissions or uplink transmissions may be provided on a per subframe basis.

When transmitting LTE/LTE-A communications over a shared radio frequency spectrum band, maintaining a same total transmission power across the subframes in a frame may help ensure that consistent interference levels are seen in different subframes. For example, for downlink transmissions, a same total transmission power may be maintained across the subframes in a frame regardless of whether downlink CUBS or downlink control/data subframes are being transmitted. Similarly, for uplink transmissions, a same total transmission power may be maintained across the subframes in a frame regardless of whether uplink CUBS or uplink control/data subframes are being transmitted. Maintaining a same total transmission power and providing a consistent interference level to other nodes may help address hidden node issues. A "hidden node" experienced by an LTE/LTE-A cell operating over a shared radio frequency spectrum band may be a node operated by a different LTE/LTE-A operator (which node may operate in a synchronous or asynchronous manner with respect to the cell) or a node operated using a different technology (e.g., a Wi-Fi node). Potential downsides of maintaining a same total transmission power across the subframes in a frame may include scheduling/operation restrictions at a base station or increased power consumption at a UE. In some examples, the total transmission power may differ from a maximum transmission power and may be lower than the maximum transmission power of a node (e.g., a base station or UE), depending on power needs.

Two types of uplink resource allocation schemes are supported in LTE/LTE-A networks: Type 0 and Type 1. Type 0 is a contiguous uplink resource allocation scheme. Uplink resource allocation is provided within each slot of a frame. Slot hopping may be enabled with a one-bit flag. The number of bits provided for uplink resource allocation may be determined by ceiling (log 2(N*(N+1)/2)), where N is the number of physical resource blocks (PRBs) in an uplink transmission (e.g., for N=100 PRBs or in a 20 MHz system, the number of bits provided for uplink resource allocation may be 13).

Type 1 is a dual-cluster uplink resource allocation scheme. Slot hopping is not provided. For downlink control information (DCI) format 0, the number of bits provided for uplink resource allocation may be determined by 1+ceiling (log 2(N*(N+1)/2)). The additional one bit provided by Type 1 over Type 0 is a result of there being no need for a one-bit flag for slot hopping. For DCI format 1, the number of bits provided for uplink resource allocation may be determined by max{ceiling(log 2(N*(N+1)/2)), ceiling(log 2(Nchoosek (ceiling(N/P)+1,4)))}, where P is the resource block (RB) group size (up to 4 RBs, depending on system bandwidth).

Due to a possible need for a node (e.g., a base station or UE) to transmit continuously or because the duration of an uplink transmission in a frame may dynamically change (e.g., as a result of needing to perform an extended CCA), multi-subframe scheduling may be necessary for LTE/LTE-A uplink transmissions in a shared radio frequency spectrum band. For example, a single uplink grant (or multiple uplink grants) transmitted in a downlink subframe may schedule uplink transmissions in one to N uplink subframes, where the number of uplink subframes is dynamically determined. For a joint uplink grant (e.g., an uplink grant that schedules uplink transmissions in more than one uplink subframe), it may be expected that the uplink subframes share the same information for the majority of information fields in the joint uplink grant. However, some information fields may be individually defined for the uplink subframes. For example, a new data indicator (NDI) may be individually defined for the uplink subframes, such that some uplink subframes may have new transmissions and some uplink subframes may have re-transmissions. As another example, a request to transmit an SRS may be enabled for a first uplink subframe corresponding to the joint uplink grant, but not to other uplink subframes corresponding to the joint uplink grant.

When a UE operates under an LBT-FBE protocol in a shared radio frequency spectrum band, access to the shared radio frequency spectrum band is either cleared or not cleared for an entire uplink transmission. For example, a UCCA procedure may be performed prior to or at the commencement of the uplink transmission, and the success or failure of the UCCA procedure determines whether the uplink transmission is made, making uplink resource management fairly predictable. However, when a UE operates under an LBT-LBE protocol in a shared radio frequency spectrum band, the success or failure of an extended UCCA procedure may not be known until part or all of some of the uplink subframes during which the uplink transmission was assigned or intended to be made have passed. As a result, scenarios may arise in which a fraction of the assigned or intended duration of the uplink transmission is available (e.g., cleared) for the uplink transmission. Examples of such scenarios are shown in FIGS. 10 and 11.

Figure 10:
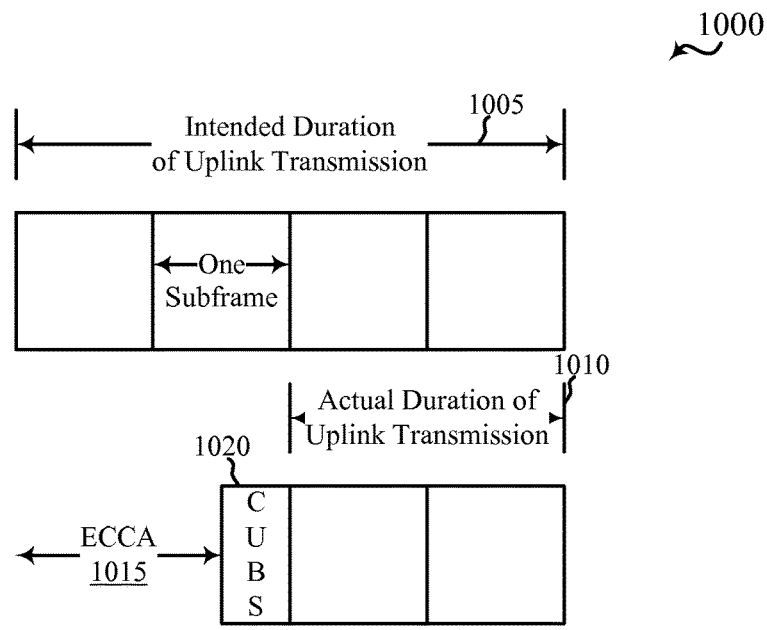
FIG. 10 shows an example of an uplink transmission in a shared radio frequency spectrum band (e.g., an unlicensed radio frequency spectrum band), in accordance with various aspects of the present disclosure.

FIG. 10 shows an example 1000 of an uplink transmission in a shared radio frequency spectrum band (e.g., an unlicensed radio frequency spectrum band), in accordance with various aspects of the present disclosure. As shown, the uplink transmission may have an actual duration 1010 that is shorter than an assigned or intended duration 1005 of the uplink transmission. As also shown, and by way of example, the assigned or intended duration 1005 may be four subframes. In some examples, a base station (e.g., a base station 105, 205, or 205-a described with reference to FIG. 1 or 2) may configure or assign four uplink subframes during a gating interval for an uplink transmission in a shared radio frequency spectrum band. However, because of the time needed by a UE to complete an extended CCA (ECCA) procedure 1015 or because of interference from other network nodes, the UE may be able to access the shared radio frequency spectrum band for a portion or none of the uplink subframes during which the uplink transmission was assigned or intended to be made.

In some examples, the CCA or ECCA procedure 1015 may succeed in the middle of a subframe. In such an example, CUBS 1020 (including fractional CUBS, in some examples) may be transmitted by a UE to reserve the shared radio frequency spectrum band until a next subframe boundary, as shown, for example, in FIG. 8. Various techniques for determining the uplink resources to use for the actual duration 1010 of the uplink transmission are described with reference to FIGS. 12-15 and 18-24.

Figure 11:
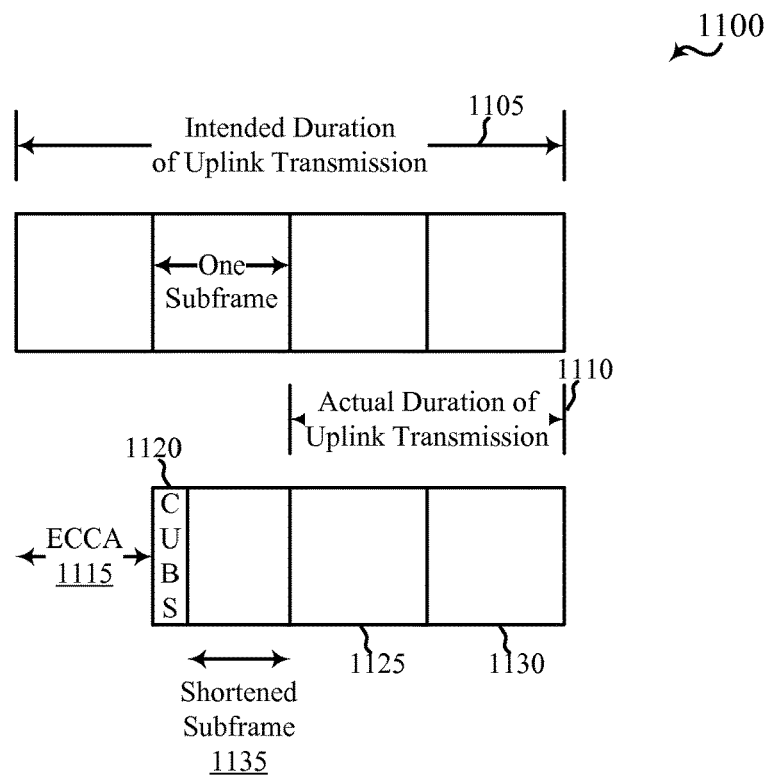
FIG. 11 shows an example of an uplink transmission in a shared radio frequency spectrum band (e.g., an unlicensed radio frequency spectrum band), in accordance with various aspects of the present disclosure.

FIG. 11 shows an example 1100 of an uplink transmission in a shared radio frequency spectrum band (e.g., an unlicensed radio frequency spectrum band), in accordance with various aspects of the present disclosure. As shown, the uplink transmission may have an actual duration 1110 that is shorter than an assigned or intended duration 1105 of the uplink transmission. As also shown, and by way of example, the assigned or intended duration 1105 may be four subframes. In some examples, a base station (e.g., a base station 105, 205, or 205-a described with reference to FIG. 1 or 2) may configure or assign four uplink subframes during a gating interval for an uplink transmission in a shared radio frequency spectrum band. However, because of the time needed by a UE to complete an extended CCA (ECCA) procedure 1115 or because of interference from other network nodes, the UE may be able to access the shared radio frequency spectrum band for a portion or none of the uplink subframes during which the uplink transmission was assigned or intended to be made.

In some examples, the CCA or ECCA procedure 1115 may succeed in the middle of a subframe. In such an example, CUBS 1120 (including fractional CUBS, in some examples) may be transmitted by a UE to reserve the shared radio frequency spectrum band until a next symbol (which may be an SC-FDM symbol, an OFDM symbol, etc.) period boundary, as shown, for example, in FIG. 8. Various techniques for determining the uplink resources to use for the actual duration 1110 of the uplink transmission are described with reference to FIGS. 12-15 and 18-24. In FIG. 11, the actual duration 1110 of the uplink transmission includes two full-length subframes 1125 and 1130 and a shortened subframe 1135.

Figure 12:
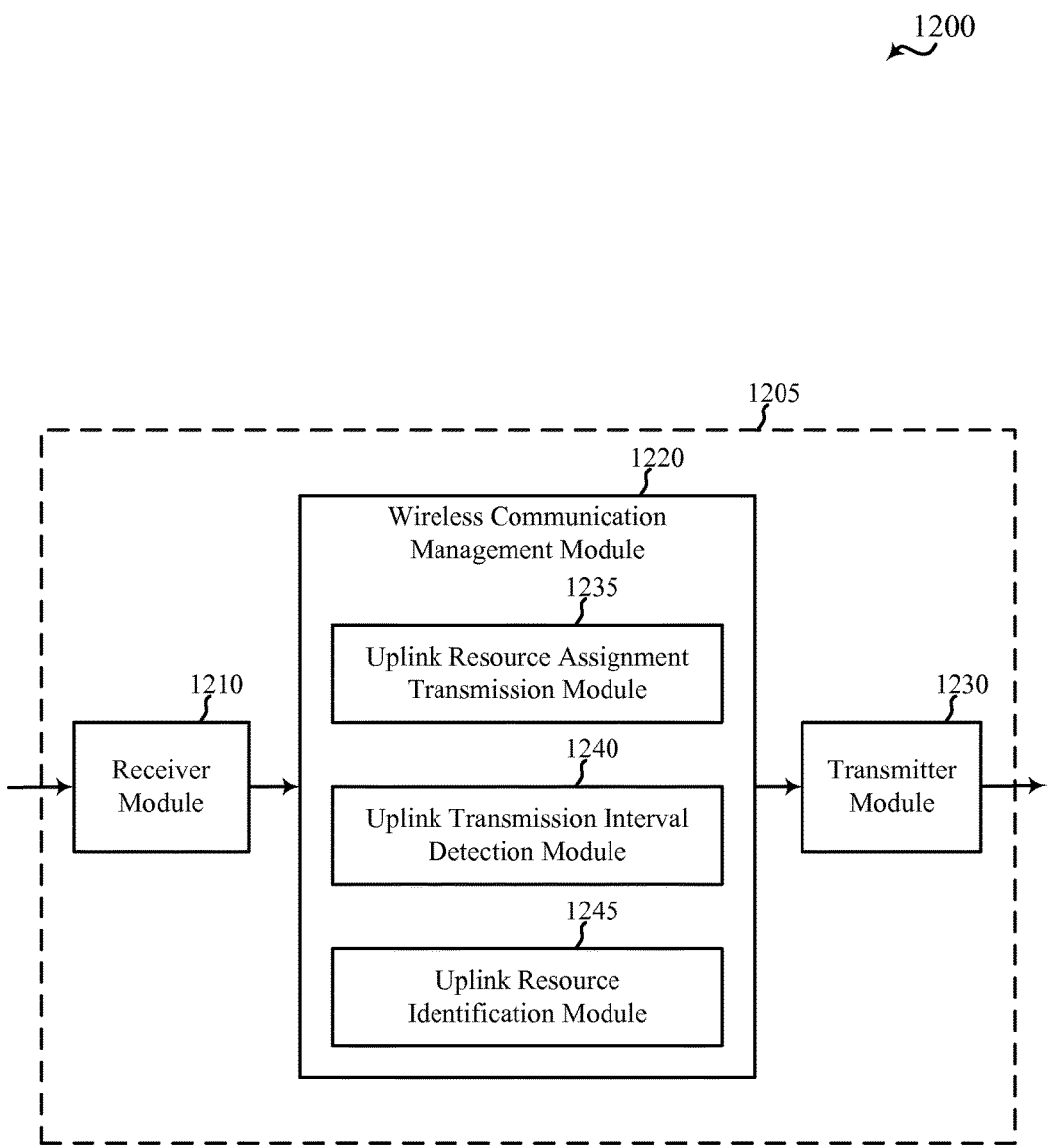
FIG. 12 shows a block diagram of an apparatus for use in wireless communication, in accordance with various aspects of the present disclosure.

FIG. 12 shows a block diagram 1200 of an apparatus 1205 for use in wireless communication, in accordance with various aspects of the present disclosure. In some examples, the apparatus 1205 may be an example of aspects of one or more of the base stations 105, 205, or 205-*a* described with reference to FIG. 1 or 2. The apparatus 1205 may also be a processor. The apparatus 1205 may include a receiver module 1210, a wireless communication management module 1220, or a transmitter module 1230. Each of these components may be in communication with each other.

The components of the apparatus 1205 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1210 may include at least one radio frequency (RF) receiver, such as at least one RF receiver operable to receive transmissions over a first radio frequency spectrum band (e.g., a radio frequency spectrum band for which apparatuses do not contend for access because the radio frequency spectrum band is licensed to certain users for certain uses, such as a licensed radio frequency spectrum band usable for LTE/LTE-A communications) or a second radio frequency spectrum band (e.g., a shared radio frequency spectrum band such as an unlicensed radio frequency spectrum band for which apparatuses may need to contend for access because the radio frequency spectrum band is available for unlicensed use, such as Wi-Fi use, or a licensed radio frequency spectrum band for which apparatuses may need to contend for access because the radio frequency spectrum band is available for use by two or more operators on a contention basis). In some examples, the first radio frequency spectrum band or the second radio frequency spectrum band may be used for LTE/LTE-A communications, as described, for example, with reference to FIG. 1 or 2. The receiver module 1210 may be used to receive various types of data or control signals (i.e., transmissions) over one or more communication links of a wireless communication system, such as one or more communication links of the wireless communication system 100 or 200 described with reference to FIG. 1 or 2. The communication links may be established over the first radio frequency spectrum band or the second radio frequency spectrum band.

In some examples, the transmitter module 1230 may include at least one RF transmitter, such as at least one RF transmitter operable to transmit over the first radio frequency spectrum band or the second radio frequency spectrum band. The transmitter module 1230 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the first radio frequency spectrum band or the second radio frequency spectrum band.

In some examples, the wireless communication management module 1220 may be used to manage one or more aspects of wireless communication for the apparatus 1205. In some examples, the wireless communication management module 1220 may include an uplink resource assignment transmission module 1235, an uplink transmission interval detection module 1240, or an uplink resource identification module 1245. Each of these components may be in communication with each other.

In some examples, the uplink resource assignment transmission module 1235 may be used to transmit one or more assignments of uplink resources to use for an uplink transmission in a shared radio frequency spectrum band. In some examples, transmitting one or more assignments of uplink resources to use for an uplink transmission may include transmitting a first assignment of uplink resources associated with a first interval including a first duration, and transmitting a second assignment of uplink resources associated with a second interval including a second duration. The second duration may be different from the first duration.

In some examples, the uplink transmission interval detection module 1240 may be used to detect a duration of the uplink transmission.

In some examples, the uplink resource identification module 1245 may be used to identify uplink resources used for the uplink transmission based at least in part on the detecting performed by the uplink transmission interval detection module 1240. In some examples, identifying uplink resources used for the uplink transmission may include performing blind detection to identify the uplink resources used for the uplink transmission, or receiving a signal indicating the uplink resources used for the uplink transmission, or mapping the detected duration of the uplink transmission to the uplink resources used for the uplink transmission.

Figure 13:
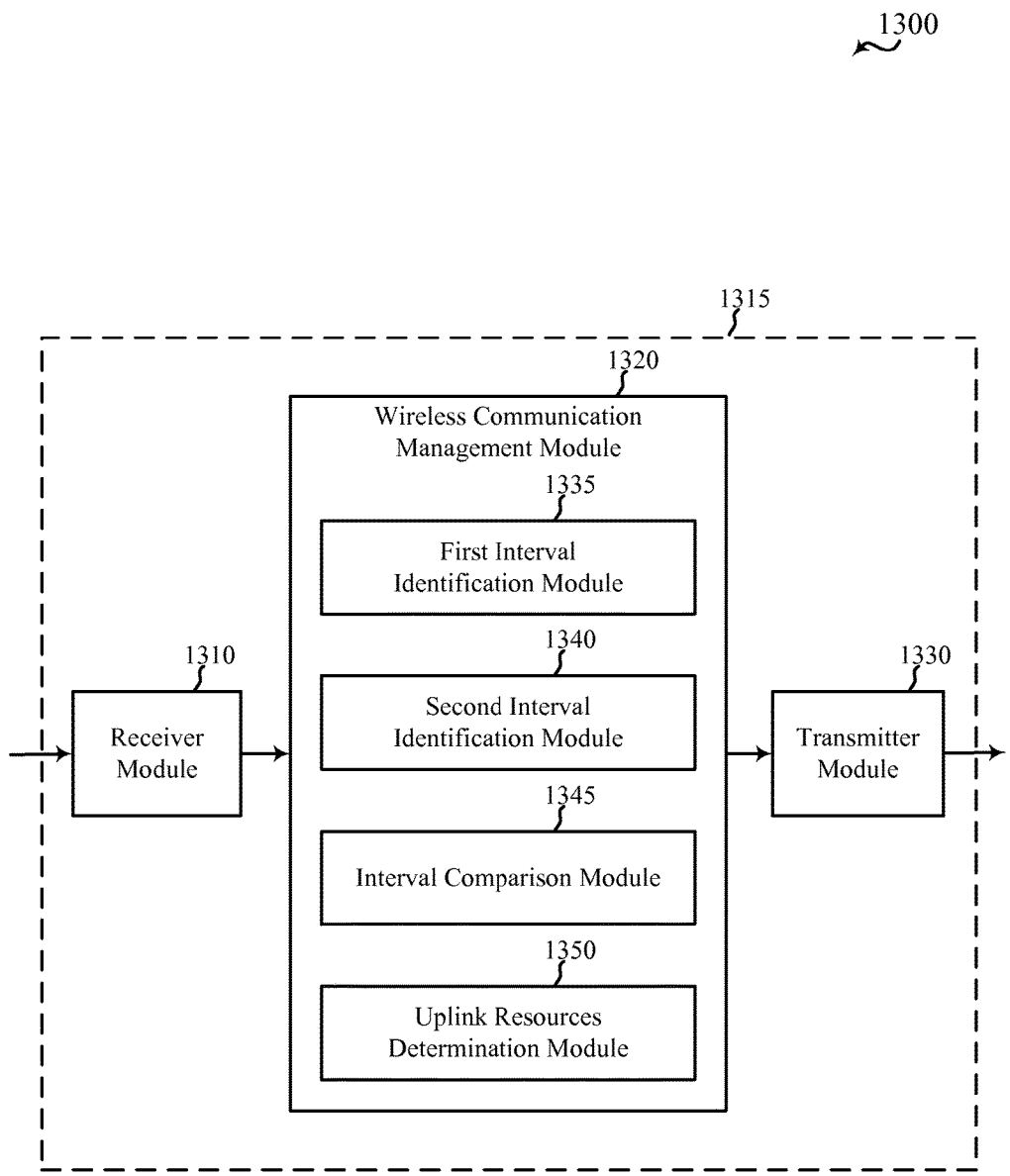
FIG. 13 shows a block diagram of an apparatus for use in wireless communication, in accordance with various aspects of the present disclosure.

FIG. 13 shows a block diagram 1300 of an apparatus 1315 for use in wireless communication, in accordance with various aspects of the present disclosure. In some examples, the apparatus 1315 may be an example of aspects of one or more of the UEs 115, 215, 215-*a*, 215-*b*, or 215-*c* described with reference to FIG. 1 or 2. The apparatus 1315 may also be a processor. The apparatus 1315 may include a receiver module 1310, a wireless communication management module 1320, or a transmitter module 1330. Each of these components may be in communication with each other.

The components of the apparatus 1315 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1310 may include at least one radio frequency (RF) receiver, such as at least one RF receiver operable to receive transmissions over a first radio frequency spectrum band (e.g., a radio frequency spectrum band for which apparatuses do not contend for access because the radio frequency spectrum band is licensed to certain users for certain uses, such as a licensed radio frequency spectrum band usable for LTE/LTE-A communications) or a second radio frequency spectrum band (e.g., a shared radio frequency spectrum band such as an unlicensed radio frequency spectrum band for which apparatuses may need to contend for access because the radio frequency spectrum band is available for unlicensed use, such as Wi-Fi use, or a licensed radio frequency spectrum band for which apparatuses may need to contend for access because the radio frequency spectrum band is available for use by two or more operators on a contention basis). In some examples, the first radio frequency spectrum band or the second radio frequency spectrum band may be used for LTE/LTE-A communications, as described, for example, with reference to FIG. 1 or 2. The receiver module 1310 may be used to receive various types of data or control signals (i.e., transmissions) over one or more communication links of a wireless communication system, such as one or more communication links of the wireless communication system 100 or 200 described with reference to FIG. 1 or 2. The communication links may be established over the first radio frequency spectrum band or the second radio frequency spectrum band.

In some examples, the transmitter module 1330 may include at least one RF transmitter, such as at least one RF transmitter operable to transmit over the first radio frequency spectrum band or the second radio frequency spectrum band. The transmitter module 1330 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the first radio frequency spectrum band or the second radio frequency spectrum band.

In some examples, the wireless communication management module 1320 may be used to manage one or more aspects of wireless communication for the apparatus 1315. In some examples, the wireless communication management module 1320 may be used to contend for access to a shared radio frequency spectrum band. In some examples, contending for access to the shared radio frequency spectrum band may include performing a CCA procedure or an extended CCA procedure. In some examples, the wireless communication management module 1320 may include a first interval identification module 1335, a second interval identification module 1340, an interval comparison module 1345, or an uplink resources determination module 1350. Each of these components may be in communication with each other.

In some examples, the first interval identification module 1335 may be used to identify a first interval for an uplink transmission in a shared radio frequency spectrum band. In some examples, the first interval may be an interval that a base station assigns or intends the apparatus 1315 to use, assuming the apparatus 1315 successfully contends for access to the shared radio frequency spectrum band by an assigned or intended time. Alternatively, the first interval may be another interval for which the base station has provided an assignment of uplink resources (e.g., at least one subframe or frequency subcarrier) to use for the uplink transmission.

In some examples, the second interval identification module 1340 may be used to identify a second interval for the uplink transmission. In some examples, the second interval may be an interval that the apparatus 1315 will actually use, which interval is dependent on when the apparatus 1315 successfully contends for access to the shared radio frequency spectrum band (e.g., successfully performs a CCA procedure or extended CCA procedure).

In some examples, the interval comparison module 1345 may be used to compare the first interval with the second interval.

In some examples, the first interval may include a first duration for the uplink transmission and the second interval may include a second duration for the uplink transmission. The second duration may be different from the first duration. In these examples, the comparison of the first interval with the second interval performed by the interval comparison module 1345 may include comparing the first duration for the uplink transmission to the second duration for the uplink transmission.

In some examples, the uplink resources determination module 1350 may be used to determine uplink resources to use for the uplink transmission based at least in part on the comparison made by the interval comparison module 1345.

Figure 14:
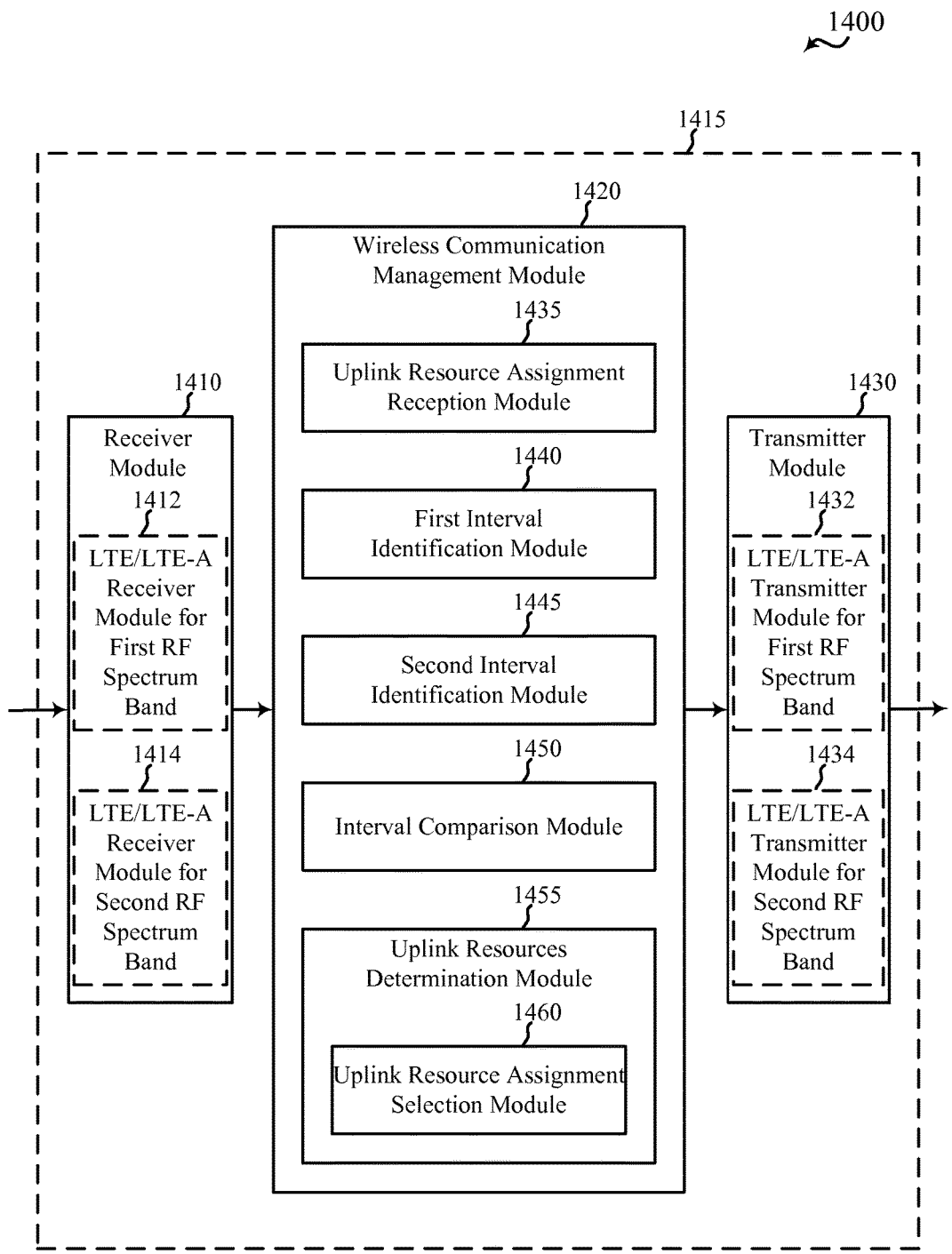
FIG. 14 shows a block diagram of an apparatus for use in wireless communication, in accordance with various aspects of the present disclosure.

FIG. 14 shows a block diagram 1400 of an apparatus 1415 for use in wireless communication, in accordance with various aspects of the present disclosure. In some examples, the apparatus 1415 may be an example of aspects of one or more of the UEs 115, 215, 215-a, 215-b, or 215-c described with reference to FIG. 1 or 2, or aspects of the apparatus 1315 described with reference to FIG. 13. The apparatus 1415 may also be a processor. The apparatus 1415 may include a receiver module 1410, a wireless communication management module 1420, or a transmitter module 1430. Each of these components may be in communication with each other.

The components of the apparatus 1415 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1410 may include at least one radio frequency (RF) receiver, such as at least one RF receiver operable to receive transmissions over a first radio frequency spectrum band (e.g., a radio frequency spectrum band for which apparatuses do not contend for access because the radio frequency spectrum band is licensed to certain users for certain uses, such as a licensed radio frequency spectrum band usable for LTE/LTE-A communications) or a second radio frequency spectrum band (e.g., a shared radio frequency spectrum band such as an unlicensed radio frequency spectrum band for which apparatuses may need to contend for access because the radio frequency spectrum band is available for unlicensed use, such as Wi-Fi use, or a licensed radio frequency spectrum band for which apparatuses may need to contend for access because the radio frequency spectrum band is available for use by two or more operators on a contention basis). In some examples, the first radio frequency spectrum band or the second radio frequency spectrum band may be used for LTE/LTE-A communications, as described, for example, with reference to FIG. 1 or 2. The receiver module 1410 may in some cases include separate receivers for the first radio frequency spectrum band and the second radio frequency spectrum band. The separate receivers may, in some examples, take the form of an LTE/LTE-A receiver module for communicating over the first radio frequency spectrum band (e.g., LTE/LTE-A receiver module for first RF spectrum band 1412), and an LTE/LTE-A receiver module for communicating over the second radio frequency spectrum band (e.g., LTE/LTE-A receiver module for second RF spectrum band 1414). The receiver module 1410, including the LTE/LTE-A receiver module for first RF spectrum band 1412 or the LTE/LTE-A receiver module for second RF spectrum band 1414, may be used to receive various types of data or control signals (i.e., transmissions) over one or more communication links of a wireless communication system, such as one or more communication links of the wireless communication system 100 or 200 described with reference to FIG. 1 or 2. The communication links may be established over the first radio frequency spectrum band or the second radio frequency spectrum band.

In some examples, the transmitter module 1430 may include at least one RF transmitter, such as at least one RF transmitter operable to transmit over the first radio frequency spectrum band or the second radio frequency spectrum band. The transmitter module 1430 may in some cases include separate transmitters for the first radio frequency spectrum band and the second radio frequency spectrum band. The separate transmitters may, in some examples, take the form of an LTE/LTE-A transmitter module for communicating over the first radio frequency spectrum band (e.g., LTE/LTE-A transmitter module for first RF spectrum band 1432), and an LTE/LTE-A transmitter module for communicating over the second radio frequency spectrum band (e.g., LTE/LTE-A transmitter module for second RF spectrum band 1434). The transmitter module 1430, including the LTE/LTE-A transmitter module for first RF spectrum band 1432 or the LTE/LTE-A transmitter module for second RF spectrum band 1434, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the first radio frequency spectrum band or the second radio frequency spectrum band.

In some examples, the wireless communication management module 1420 may be used to manage one or more aspects of wireless communication for the apparatus 1415. In some examples, the wireless communication management module 1420 may be used to contend for access to a shared radio frequency spectrum band. In some examples, contending for access to the shared radio frequency spectrum band may include performing a CCA procedure or an extended CCA procedure. In some examples, the wireless communication management module 1420 may include an uplink resource assignment reception module 1435, a first interval identification module 1440, a second interval identification module 1445, an interval comparison module 1450, or an uplink resources determination module 1455. Each of these components may be in communication with each other.

In some examples, the uplink resource assignment reception module 1435 may be used to receive a plurality of assignments of uplink resources to use for an uplink transmission in a shared radio frequency spectrum band. In some examples, the first interval may be an interval that a base station assigns or intends the apparatus 1415 to use, assuming the apparatus 1415 successfully contends for access to the shared radio frequency spectrum band by an assigned or intended time. Alternatively, the first interval may be another interval for which the base station has provided an assignment of uplink resources to use for the uplink transmission.

In some examples, the one or more assignments of uplink resources may include a multi-transmission time interval (TTI) assignment of uplink resources (e.g., an assignment for a transmission block (TB) spanning multiple TTIs or subframes). In some examples, the one or more assignments of uplink resources may correspond to different possible intervals (e.g., hypotheses) that the apparatus 1415 may use for an uplink transmission. In some examples, the different possible intervals may include different possible durations for the uplink transmission. For example, for a given frame, there may be two possible durations for the uplink transmission (e.g., a one subframe duration or a two subframe duration). A base station may therefore provide explicit assignments of uplink resources for each possible interval or duration for the uplink transmission (e.g., a first assignment of uplink resources for the case of a first interval having a one subframe duration, and a second assignment of uplink resources for the case of a second interval having a two subframe duration). In some examples, the plurality of assignments of uplink resources (e.g., possible durations for the uplink transmission) may be provided as individual uplink grants. In other examples, the plurality of assignments of uplink resources (e.g., possible durations for the uplink transmission) may be provided in a joint uplink grant. In the case of a joint uplink grant, some information fields may be shared among two or more of the assignments of uplink resources, and some information fields may be individually defined for each of the assignments of uplink resources. Alternatively, all of the information fields may be individually defined in a joint uplink grant.

In some examples, the first interval identification module 1440 may be used to identify a first interval for an uplink transmission in a shared radio frequency spectrum band. For example, the first interval identification module 1440 may identify the first interval from one or more assignments received by the uplink resource assignment reception module 1435. In some examples, the first interval may be an interval that a base station assigns or intends the apparatus 1415 to use, assuming the apparatus 1415 successfully contends for access to the shared radio frequency spectrum band by an assigned or intended time. Alternatively, the first interval may be another interval for which the base station has provided an assignment of uplink resources (e.g., at least one subframe or frequency subcarrier) to use for the uplink transmission.

In some examples, the second interval identification module 1445 may be used to identify a second interval for the uplink transmission. In some examples, the second interval may be an interval that the apparatus 1415 will actually use, which interval is dependent on when the apparatus 1415 successfully contends for access to the shared radio frequency spectrum band (e.g., successfully performs a CCA procedure or extended CCA procedure).

In some examples, the interval comparison module 1450 may be used to compare the first interval with the second interval.

In some examples, the first interval may include a first duration for the uplink transmission and the second interval may include a second duration for the uplink transmission. The second duration may be different from the first duration. In these examples, the comparison of the first interval with the second interval performed by the interval comparison module 1450 may include comparing the first duration for the uplink transmission to the second duration for the uplink transmission.

In some examples, the uplink resources determination module 1455 may be used to determine uplink resources to use for the uplink transmission based at least in part on the comparison made by the interval comparison module 1450. In some examples, the uplink resources determination module 1455 may include an uplink resource assignment selection module 1460. The uplink resource assignment selection module 1460 may be used to determine uplink resources to use for the uplink transmission by selecting an assignment of uplink resources (e.g., from the plurality of assignments received by the uplink resource assignment reception module 1435) to use for the uplink transmission. For example, when an interval that a UE will actually use includes a duration of two subframes for the uplink transmission, the uplink resource assignment selection module 1460 may select an assignment of uplink resources corresponding to an uplink transmission having a two subframe duration, or when an interval that a UE will actually use includes a duration of one subframe for the uplink transmission, the uplink resource assignment selection module 1460 may select an assignment of uplink resources corresponding to an uplink transmission having a one subframe duration.

Following a determination of uplink resources to use for the uplink transmission, the wireless communication management module 1420 may initiate transmission of the uplink transmission using the determined uplink resources.

Figure 15:
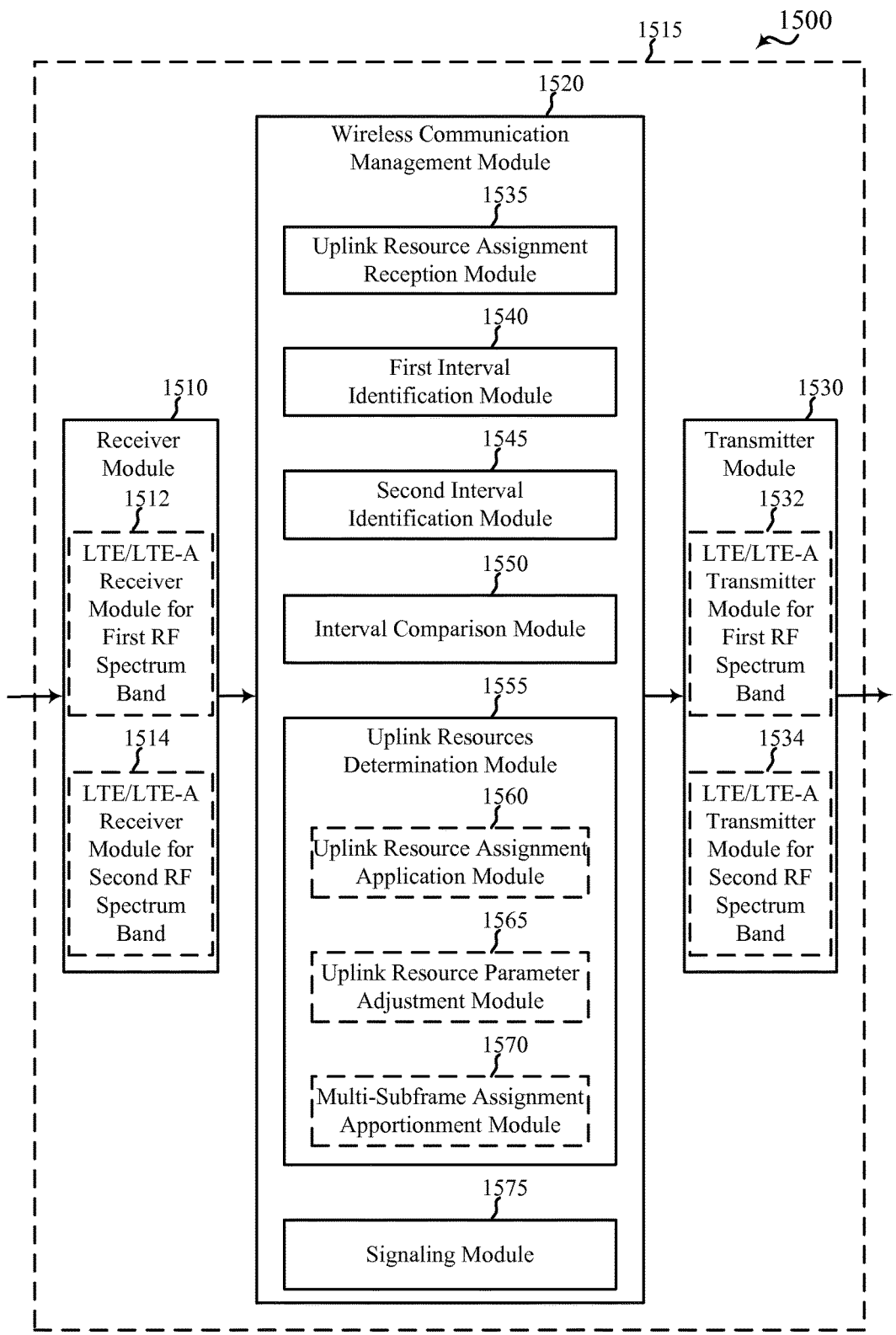
FIG. 15 shows a block diagram of an apparatus for use in wireless communication, in accordance with various aspects of the present disclosure.

FIG. 15 shows a block diagram 1500 of an apparatus 1515 for use in wireless communication, in accordance with various aspects of the present disclosure. In some examples, the apparatus 1515 may be an example of aspects of one or more of the UEs 115, 215, 215-*a*, 215-*b*, or 215-*c* described with reference to FIG. 1 or 2, or aspects of the apparatus 1315 described with reference to FIG. 13. The apparatus 1515 may also be a processor. The apparatus 1515 may include a receiver module 1510, a wireless communication management module 1520, or a transmitter module 1530. Each of these components may be in communication with each other.

The components of the apparatus 1515 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1510 may include at least one radio frequency (RF) receiver, such as at least one RF receiver operable to receive transmissions over a first radio frequency spectrum band (e.g., a radio frequency spectrum band for which apparatuses do not contend for access because the radio frequency spectrum band is licensed to certain users for certain uses, such as a licensed radio frequency spectrum band usable for LTE/LTE-A communications) or a second radio frequency spectrum band (e.g., a shared radio frequency spectrum band such as an unlicensed radio frequency spectrum band for which apparatuses may need to contend for access because the radio frequency spectrum band is available for unlicensed use, such as Wi-Fi use, or a licensed radio frequency spectrum band for which apparatuses may need to contend for access because the radio frequency spectrum band is available for use by two or more operators on a contention basis). In some examples, the first radio frequency spectrum band or the second radio frequency spectrum band may be used for LTE/LTE-A communications, as described, for example, with reference to FIG. 1 or 2. The receiver module 1510 may in some cases include separate receivers for the first radio frequency spectrum band and the second radio frequency spectrum band. The separate receivers may, in some examples, take the form of an LTE/LTE-A receiver module for communicating over the first radio frequency spectrum band (e.g., LTE/LTE-A receiver module for first RF spectrum band 1512), and an LTE/LTE-A receiver module for communicating over the second radio frequency spectrum band (e.g., LTE/LTE-A receiver module for second RF spectrum band 1514). The receiver module 1510, including the LTE/LTE-A receiver module for first RF spectrum band 1512 or the LTE/LTE-A receiver module for second RF spectrum band 1514, may be used to receive various types of data or control signals (i.e., transmissions) over one or more communication links of a wireless communication system, such as one or more communication links of the wireless communication system 100 or 200 described with reference to FIG. 1 or 2. The communication links may be established over the first radio frequency spectrum band or the second radio frequency spectrum band.

In some examples, the transmitter module 1530 may include at least one RF transmitter, such as at least one RF transmitter operable to transmit over the first radio frequency spectrum band or the second radio frequency spectrum band. The transmitter module 1530 may in some cases include separate transmitters for the first radio frequency spectrum band and the second radio frequency spectrum band. The separate transmitters may, in some examples, take the form of an LTE/LTE-A transmitter module for communicating over the first radio frequency spectrum band (e.g., LTE/LTE-A transmitter module for first RF spectrum band 1532), and an LTE/LTE-A transmitter module for communicating over the second radio frequency spectrum band (e.g., LTE/LTE-A transmitter module for second RF spectrum band 1534). The transmitter module 1530, including the LTE/LTE-A transmitter module for first RF spectrum band 1532 or the LTE/LTE-A transmitter module for second RF spectrum band 1534, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the first radio frequency spectrum band or the second radio frequency spectrum band.

In some examples, the wireless communication management module 1520 may be used to manage one or more aspects of wireless communication for the apparatus 1515. In some examples, the wireless communication management module 1520 may be used to contend for access to a shared radio frequency spectrum band. In some examples, contending for access to the shared radio frequency spectrum band may include performing a CCA procedure or an extended CCA procedure. In some examples, the wireless communication management module 1520 may include an uplink resource assignment reception module 1535, a first interval identification module 1540, a second interval identification module 1545, an interval comparison module 1550, an uplink resources determination module 1555, or a signaling module 1575. Each of these components may be in communication with each other.

In some examples, the uplink resource assignment reception module 1535 may be used to receive one or more assignments of uplink resources to use for an uplink transmission in a shared radio frequency spectrum band. In some examples, the first interval may be an interval that a base station assigns or intends the apparatus 1515 to use, assuming the apparatus 1515 successfully contends for access to the shared radio frequency spectrum band by an assigned or intended time. Alternatively, the first interval may be another interval for which the base station has provided an assignment of uplink resources to use for the uplink transmission.

In some examples, the one or more assignments of uplink resources may include a multi-TTI assignment of uplink resources (e.g., an assignment for a TB spanning multiple TTIs or subframes). In some examples, the one or more assignments of uplink resources may include a single assignment of uplink resources based on an interval that a base station assigns or intends a UE performing the method 2100 to use, assuming the UE successfully contends for access to the shared radio frequency spectrum band by an assigned or intended time. In other examples, the one or more assignments of uplink resources may correspond to different possible intervals (e.g., hypotheses) that the apparatus 1515 may use for an uplink transmission. In some examples, the different possible intervals may include different possible durations for the uplink transmission. For example, for a given frame, there may be two possible durations for the uplink transmission (e.g., a one subframe duration or a two subframe duration). A base station may therefore provide explicit assignments of uplink resources for each possible interval or duration for the uplink transmission (e.g., a first assignment of uplink resources for the case of a first interval having a one subframe duration, and a second assignment of uplink resources for the case of a second interval having a two subframe duration). In some examples, the plurality of assignments of uplink resources (e.g., possible durations for the uplink transmission) may be provided as individual uplink grants. In other examples, the plurality of assignments of uplink resources (e.g., possible durations for the uplink transmission) may be provided in a joint uplink grant. In the case of a joint uplink grant, some information fields may be shared among two or more of the assignments of uplink resources, and some information fields may be individually defined for each of the assignments of uplink resources. Alternatively, all of the information fields may be individually defined in a joint uplink grant.

In some examples, the first interval identification module 1540 may be used to identify a first interval for an uplink transmission in a shared radio frequency spectrum band. For example, the first interval identification module 1540 may identify the first interval from one or more assignments received by the uplink resource assignment reception module 1535. In some examples, the first interval may be an interval that a base station assigns or intends the apparatus 1515 to use, assuming the apparatus 1515 successfully contends for access to the shared radio frequency spectrum band by an assigned or intended time. Alternatively, the first interval may be another interval for which the base station has provided an assignment of uplink resources (e.g., at least one subframe or frequency subcarrier) to use for the uplink transmission.

In some examples, the second interval identification module 1545 may be used to identify a second interval for the uplink transmission. In some examples, the second interval may be an interval that the apparatus 1515 will actually use, which interval is dependent on when the apparatus 1515 successfully contends for access to the shared radio frequency spectrum band.

In some examples, the interval comparison module 1550 may be used to compare the first interval with the second interval.

In some examples, the first interval may include a first duration for the uplink transmission and the second interval may include a second duration for the uplink transmission. The second duration may be different from the first duration. In these examples, the comparison of the first interval with the second interval performed by the interval comparison module 1550 may include comparing the first duration for the uplink transmission to the second duration for the uplink transmission.

In some examples, the uplink resources determination module 1555 may be used to determine uplink resources to use for the uplink transmission based at least in part on the comparison made by the interval comparison module 1550. In examples in which one or more than one assignment of uplink resources to use for the uplink transmission is received by the uplink resource assignment reception module, the uplink resources determination module 1555 may also be used to select an assignment of uplink resources to use for the uplink transmission. In some examples, the uplink resources determination module 1555 may include an uplink resource assignment application module 1560, an uplink resource parameter adjustment module 1565, or a multi-subframe assignment apportionment module 1570.

In some examples, the uplink resource assignment application module 1560 may be used to determine uplink resources to use for the uplink transmission by applying, to the uplink transmission, a portion of an assignment of uplink resources associated with an interval or actual duration of the uplink transmission. For example, when the apparatus 1515 receives an assignment of uplink resources based on an assigned or intended duration of the uplink transmission (e.g., a duration of an uplink transmission that a base station assigns or intends the apparatus 1515 to make), but the apparatus 1515 will make an uplink transmission having a shorter duration, the uplink resource assignment application module 1560 may apply, to the uplink transmission the apparatus 1515 makes, a portion of the assignment of uplink resources (e.g., the uplink resource assignment reception module 1535 may receive an assignment of uplink resources corresponding to an uplink transmission having a four subframe duration, but the apparatus 1515 may make an uplink transmission having a two subframe duration, and the uplink resource assignment application module 1560 may therefore apply a portion of the assignment of uplink resources to the uplink transmission the apparatus 1515 makes (e.g., a portion of the assignment corresponding to two subframes of the assignment of uplink resources)). As another example, the uplink resource assignment reception module 1535 may receive an assignment of uplink resources corresponding to an uplink transmission having a four subframe duration, but the apparatus 1515 may make an uplink transmission having a duration of two full-length subframes and one partial-length subframe. In this latter example, the uplink resource assignment application module 1560 may apply a portion of the assignment of uplink resources to the uplink transmission the apparatus 1515 makes (e.g., a portion of the assignment corresponding to the two full-length subframes and the one partial-length subframe).

In some examples, the uplink resource parameter adjustment module 1565 may be used to determine uplink resources to use for the uplink transmission by adjusting one or more parameters of the uplink resources to use for the uplink transmission. In some examples, the adjusting may be performed autonomously by the apparatus 1515. An autonomous adjustment of one or more parameters of the uplink resources may be useful when the apparatus 1515 receives a single assignment of uplink resources for an uplink transmission, which single assignment of uplink resources does not differentiate different possible intervals (e.g., hypotheses) of uplink transmission durations (e.g., a different uplink transmission duration based on fewer uplink subframes or a shortened uplink subframe).

In one example of adjusting a parameter of the uplink resources for the uplink transmission, consider the receipt of a multi-TTI assignment of uplink resources for a transmit block (TB) spanning multiple subframes. When the apparatus 1515 makes an uplink transmission having a duration that is shorter than the assigned or intended duration of the TB, the uplink resource parameter adjustment module 1565 may increase the transmit power of the uplink transmission. For example, if the apparatus 1515 makes an uplink transmission having a duration that is half the assigned or intended duration of the TB, the uplink resource parameter adjustment module 1565 may increase the transmit power for the uplink transmission (e.g., the uplink resource parameter adjustment module 1565 may increase the transmit power by 3 dB). The uplink resource parameter adjustment module 1565 may also or alternatively adjust (e.g., decrease) the size of the TB or adjust a number of symbols (e.g., an SC-FDM or OFDM symbol) to align a reference boundary (e.g., symbol period boundary or subframe boundary).

In another example of adjusting a parameter of the uplink resources for the uplink transmission, when the apparatus 1515 makes an uplink transmission having a duration that is shorter than a duration of an uplink transmission indicated in an assignment of uplink resources, the uplink resource parameter adjustment module 1565 may use a higher modulation and coding scheme (MCS) for the uplink transmission (e.g., compared to an MCS indicated in the assignment of uplink resources).

In some examples, an autonomous adjustment of one or more parameters of the uplink resources to use for the uplink transmission may be based on one or more rules or a table. The one or more rules or table may in some examples be provided to the apparatus 1515 by a base station, such that the base station and the apparatus 1515 have access to a common set of rules or table. In some examples, a rule or table may map a duration of an uplink transmission to a single value for a parameter of the uplink resources (e.g., a one-to-one mapping). In other examples, a rule or table may map a duration of an uplink transmission to a plurality of values for a parameter of the uplink resources (e.g., a one-to-many mapping). In the case of a one-to-one mapping, the uplink resource parameter adjustment module 1565 may adjust a single value of a parameter of the uplink resources based on an actual duration of an uplink transmission provided by the rule or table. The base station may determine the value of an adjusted parameter upon receiving or detecting the actual duration of an uplink transmission. In the case of a one-to-many mapping, the uplink resource parameter adjustment module 1565 may select a value from a plurality of values of a parameter of the uplink resources based on an actual duration of an uplink transmission provided by the rule or table, and may adjust the parameter of the uplink resources based on the selected value. The base station may need to perform a blind detection to determine the value of an adjusted parameter. Alternatively, the apparatus 1515 may indicate the value of an adjusted parameter (e.g., an adjusted MCS) via signaling (e.g., via uplink CUBS or another channel). For example, the signaling module 1575 may be used to signal, to a base station, an indicator that indicates a value of at least one of the adjusted one or more parameters of the uplink resources.

In some examples, the multi-subframe assignment apportionment module 1570 may be used to determine uplink resources to use for the uplink transmission by selecting at least one assignment of uplink resources corresponding to a portion of the first interval. For example, when the apparatus 1515 receives a multi-TTI assignment of uplink resources corresponding to the first interval, which multi-TTI assignment of uplink resources is based on an assigned or intended duration of the uplink transmission (e.g., a duration of an uplink transmission that a base station assigns or intends the apparatus 1515 to make), but the apparatus 1515 will make an uplink transmission having an actual duration that is shorter than the assigned or intended duration (which actual duration corresponds to the second interval), then the multi-subframe assignment apportionment module 1570 may select at least one assignment of uplink resources corresponding to a portion of the first interval. Consider, for example, that the assigned or intended duration of the uplink transmission is four subframes, and the actual duration of the uplink transmission is two subframes. In such an example, the multi-subframe assignment apportionment module 1570 may select at least one assignment of uplink resources corresponding to a first portion of the first interval (e.g., at least one assignment of uplink resources corresponding to the first two of the four subframes of the first interval). For example, the multi-subframe assignment apportionment module 1570 may select a first assignment (e.g., a first subframe assignment) of uplink resources corresponding to the first interval. Such a selection may be advantageous, for example, if the apparatus 1515 was only scheduled to transmit in the first two subframes of the first interval (and thus, the apparatus 1515 may transmit the data it was assigned or intended to transmit, despite transmitting the data later than it was assigned or intended to be transmitted).

Following a determination of uplink resources to use for the uplink transmission, the wireless communication management module 1520 may initiate transmission of the uplink transmission using the determined uplink resources.

In some examples, selecting at least one assignment of uplink resources corresponding to a portion of the first interval may require use or modification of one or more parameters that are not applicable to a different subframe index. For example, it may be undesirable to transmit a sounding reference signal (SRS) triggered for a first subframe of an interval during a later subframe of the interval. In the case of a physical uplink shared channel (PUSCH) transmission, an actual PUSCH transmission may be adjusted based on an actual subframe index (e.g., since some PUSCH parameters (e.g., PUSCH hopping, demodulation reference signal (DM-RS) sequence generation, etc.) may be associated with a subframe index).

In some examples, the multi-subframe assignment apportionment module 1570 may be used to determine uplink resources to use for the uplink transmission by selecting at least one assignment of uplink resources based at least in part on a subframe index associated with the first interval. For example, when the apparatus 1515 receives a multi-TTI assignment of uplink resources corresponding to the first interval, which multi-TTI assignment of uplink resources is based on an assigned or intended duration of the uplink transmission (e.g., a duration of an uplink transmission that a base station assigns or intends the apparatus 1515 to make), but the apparatus 1515 will make an uplink transmission having an actual duration that is shorter than the assigned or intended duration (which actual duration corresponds to the second interval), then the multi-subframe assignment apportionment module 1570 may select at least one assignment of uplink resources based at least in part on a subframe index associated with the first interval. Consider, for example, that the assigned or intended duration of the uplink transmission is four subframes, and the actual duration of the uplink transmission is two subframes. Also consider that the four subframes in the assigned or intended duration of the uplink transmission are respectively associated with subframe indexes SF_5, SF_6, SF_7, and SF_8, and that the uplink transmission to be transmitted by the apparatus 1515 will begin in a subframe having subframe index SF_7. In such an example, the multi-subframe assignment apportionment module 1570 may select the assignments of uplink resources corresponding to subframe indexes SF_7 and SF_8 of the first interval.

Selecting at least one assignment of uplink resources based at least in part on a subframe index associated with the first interval may better align an uplink transmission with an original intention of a base station (e.g., in terms of physical hybrid automatic repeat request (HARQ) indicator channel (PHICH) resource management (e.g., for uplink synchronization HARQ), based on a starting physical resource block (PRB) and cyclic shift used by a DM-RS, or in terms of PUSCH hopping (e.g., if tied with a subframe index)). Such a selection may be advantageous when multi-TTI scheduling for the apparatus 1515 is such that the apparatus 1515 is scheduled to transmit in all uplink subframes of the first interval. When the apparatus 1515 is not scheduled to transmit in all uplink subframes, selection of one or more assignments of uplink resources corresponding to later subframes in the first interval may result in the apparatus 1515 not being able to transmit data.

In any of the apparatus 1315, 1415, or 1515 described with reference to FIG. 13, 14, or 15, it may be desirable to keep uplink transmit power the same across different subframes of an uplink transmission. In some examples, an apparatus may be configured to assume that the uplink power control commands in an assignments of uplink resources corresponding to an interval that a base station assigns or intends the apparatus to use are valid and apply them accordingly, even when an actual duration of an uplink transmission by the apparatus 1515 is shorter than an assigned or intended duration of the uplink transmission. In some examples, an uplink power control adjustment for an uplink transmission may only be made once, at the beginning of an uplink transmission. Thus, it may be expected in these examples that there is one power control command for the duration of the uplink transmission, and the power control command may be applied to the uplink transmission regardless of the actual duration of the uplink transmission.

In any of the apparatus 1315, 1415, or 1515 described with reference to FIG. 13, 14, or 15, the application of one or more assignments of uplink resources to an uplink transmission having an actual duration that is shorter than an assigned or intended duration may result in the uplink transmission not being made. In these examples, and when an uplink transmission falls under a measurement gap, a current transmission number (CURRENT_TX_NB) parameter may be incremented, counting against a maximum number of uplink retransmissions for a TB configured for the apparatus. In other examples, the CURRENT_TX_NB parameter may not be incremented when an uplink transmission is not made.

In any of the apparatus 1315, 1415, or 1515 described with reference to FIG. 13, 14, or 15, PHICH may be used for non-adaptive uplink re-transmissions (e.g., synchronous uplink HARQ). When an actual duration of an uplink transmission is shorter than an assigned or intended duration of the uplink transmission, and consequently, there is a lesser number of uplink TBs, an apparatus may treat the TBs of missed uplink transmissions as if an acknowledgement (ACK) has been received for the TBs of the missed uplink transmissions. When there is a possibility of acknowledgement/non-acknowledgement (ACK/NAK) bundling, an apparatus may assume that the TBs of the missed uplink transmissions are not involved in the ACK/NAK bundling (and equivalently, the ACK/NAK bundling may assume that the TBs of the missed uplink transmissions are ACKed).

Figure 16:
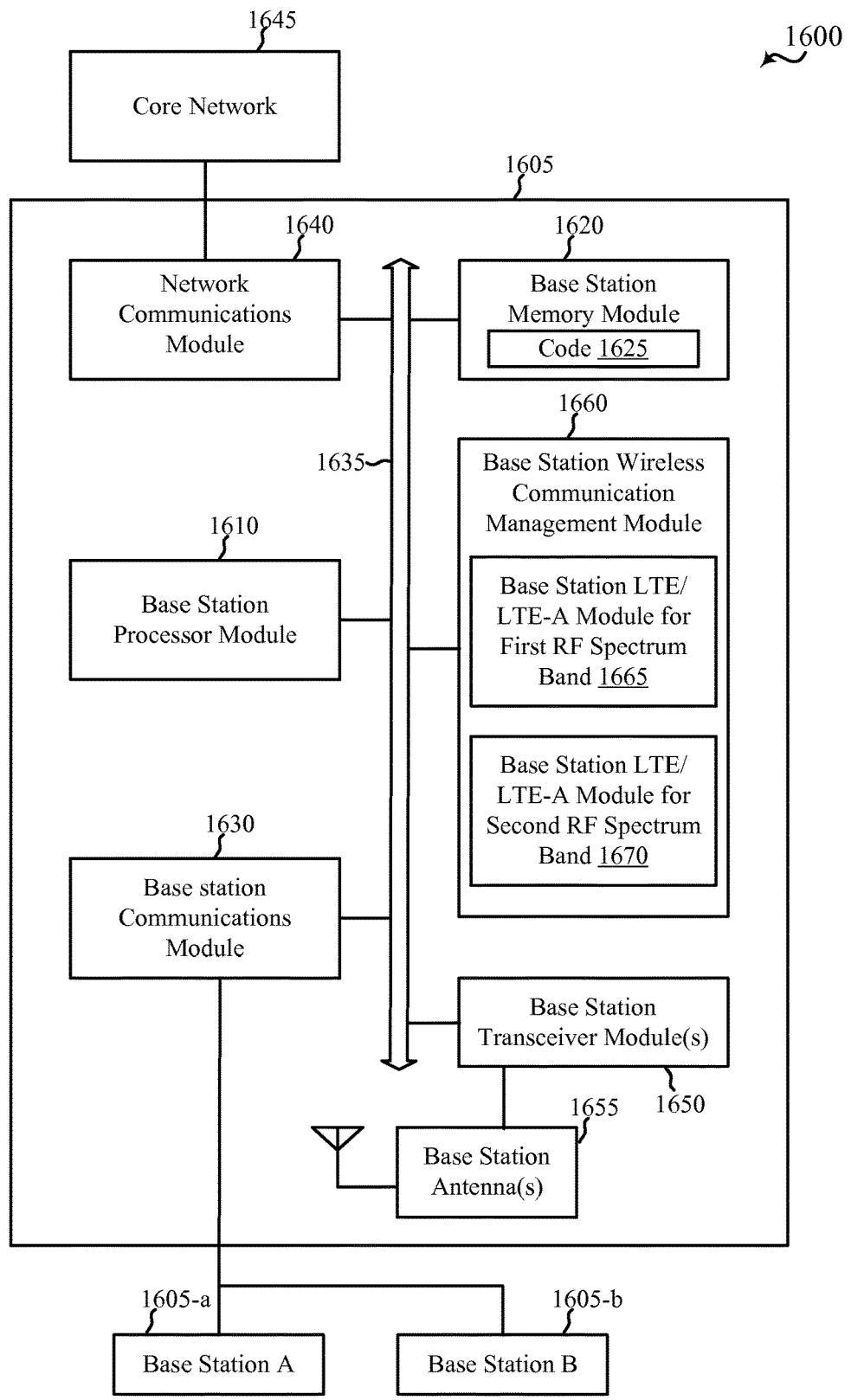
FIG. 16 shows a block diagram of a base station (e.g., a base station forming part or all of an eNB) for use in wireless communication, in accordance with various aspects of the present disclosure.

FIG. 16 shows a block diagram 1600 of a base station 1605 (e.g., a base station forming part or all of an eNB) for use in wireless communication, in accordance with various aspects of the present disclosure. In some examples, the base station 1605 may be an example of one or more aspects of the base station 105, 205, or 205-*a* described with reference to FIG. 1 or 2, or one or more aspects of the apparatus 1205 described with reference to FIG. 12. The base station 1605 may be configured to implement or facilitate at least some of the base station or apparatus features and functions described with reference to FIG. 1, 2, 3, 4, 5, 6, 7, 8, 9, 10, or 11.

The base station 1605 may include a base station processor module 1610, a base station memory module 1620, at least one base station transceiver module (represented by base station transceiver module(s) 1650), at least one base station antenna (represented by base station antenna(s) 1655), or a base station wireless communication management module 1660. The base station 1605 may also include one or more of a base station communications module 1630 or a network communications module 1640. Each of these components may be in communication with each other, directly or indirectly, over one or more buses 1635.

The base station memory module 1620 may include random access memory (RAM) or read-only memory (ROM). The base station memory module 1620 may store computer-readable, computer-executable code 1625 containing instructions that are configured to, when executed, cause the base station processor module 1610 to perform various functions described herein related to wireless communication. Alternatively, the code 1625 may not be directly executable by the base station processor module 1610 but be configured to cause the base station 1605 (e.g., when compiled and executed) to perform various of the functions described herein.

The base station processor module 1610 may include an intelligent hardware device, e.g., a central processing unit (CPU), a microcontroller, an ASIC, etc. The base station processor module 1610 may process information received through the base station transceiver module(s) 1650, the base station communications module 1630, or the network communications module 1640. The base station processor module 1610 may also process information to be sent to the transceiver module(s) 1650 for transmission through the antenna(s) 1655, to the base station communications module 1630, for transmission to one or more other base stations 1605-*a* and 1605-*b*, or to the network communications module 1640 for transmission to a core network 1645, which may be an example of one or more aspects of the core network 130 described with reference to FIG. 1. The base station processor module 1610 may handle, alone or in connection with the base station wireless communication management module 1660, various aspects of communicating over (or managing communications over) a first radio frequency spectrum band (e.g., a radio frequency spectrum band for which apparatuses do not contend for access because the radio frequency spectrum band is licensed to certain users for certain uses, such as a licensed radio frequency spectrum band usable for LTE/LTE-A communications) or a second radio frequency spectrum band (e.g., a shared radio frequency spectrum band such as an unlicensed radio frequency spectrum band for which apparatuses may need to contend for access because the radio frequency spectrum band is available for unlicensed use, such as Wi-Fi use, or a licensed radio frequency spectrum band for which apparatuses may need to contend for access because the radio frequency spectrum band is available for use by two or more operators on a contention basis).

The base station transceiver module(s) 1650 may include a modem configured to modulate packets and provide the modulated packets to the base station antenna(s) 1655 for transmission, and to demodulate packets received from the base station antenna(s) 1655. The base station transceiver module(s) 1650 may, in some examples, be implemented as one or more base station transmitter modules and one or more separate base station receiver modules. The base station transceiver module(s) 1650 may support communications in the first radio frequency spectrum band or the second radio frequency spectrum band. The base station transceiver module(s) 1650 may be configured to communicate bi-directionally, via the antenna(s) 1655, with one or more mobile stations or apparatuses, such as one or more of the UEs 115, 215, 215-*a*, 215-*b*, or 215-*c* described with reference to FIG. 1 or 2, or one or more of the apparatus 1315, 1415, or 1515 described with reference to FIG. 13, 14, or 15. The base station 1605 may, for example, include multiple base station antennas 1655 (e.g., an antenna array). The base station 1605 may communicate with the core network 1645 through the network communications module 1640. The base station 1605 may also communicate with other base stations, such as the base stations 1605-*a* and 1605-*b*, using the base station communications module 1630.

The base station wireless communication management module 1660 may be configured to perform or control some or all of the features or functions described with reference to FIG. 1, 2, 3, 4, 5, 6, 7, 8, 9, 10, or 11 related to wireless communication over the first radio frequency spectrum band or the second radio frequency spectrum band. For example, the base station wireless communication management module 1660 may be configured to support a supplemental downlink mode, a carrier aggregation mode, or a standalone mode using the first radio frequency spectrum band or the second radio frequency spectrum band. The base station wireless communication management module 1660 may include a base station LTE/LTE-A module for licensed spectrum 1665 configured to handle LTE/LTE-A communications in the first radio frequency spectrum band, and a base station LTE/LTE-A module for unlicensed spectrum 1670 configured to handle LTE/LTE-A communications in the second radio frequency spectrum band. The base station wireless communication management module 1660, or portions of it, may include a processor, or some or all of the functions of the base station wireless communication management module 1660 may be performed by the base station processor module 1610 or in connection with the base station processor module 1610. In some examples, the base station wireless communication management module 1660 may be an example of the wireless communication management module 1220 described with reference to FIG. 12.

Figure 17:
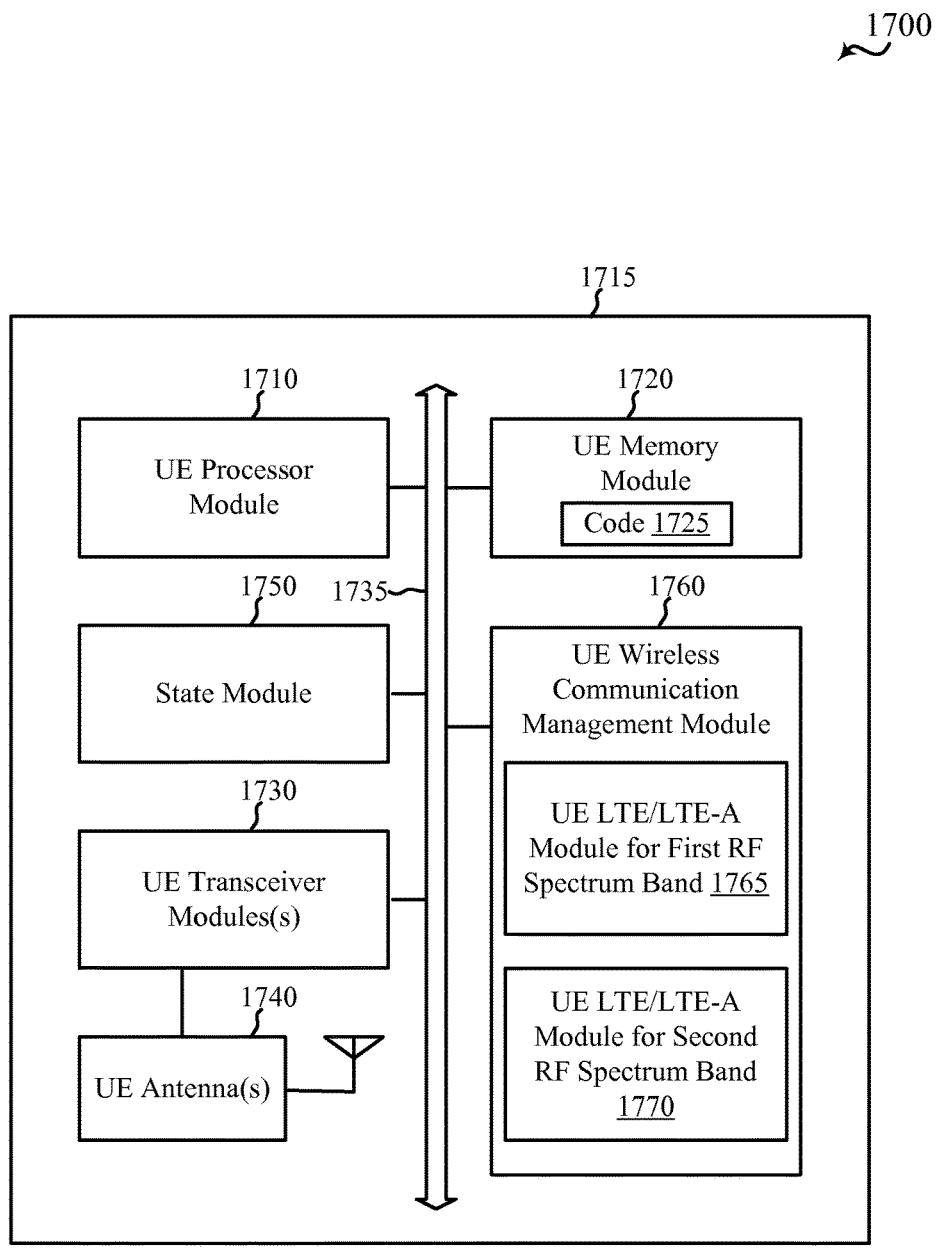
FIG. 17 shows a block diagram of a UE for use in wireless communication, in accordance with various aspects of the present disclosure.

FIG. 17 shows a block diagram 1700 of a UE 1715 for use in wireless communication, in accordance with various aspects of the present disclosure. The UE 1715 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 1715 may, in some examples, have an internal power supply (not shown), such as a small battery, to facilitate mobile operation. In some examples, the UE 1715 may be an example of one or more aspects of the UE 115, 215, 215-*a*, 215-*b*, or 215-*c* described with reference to FIG. 1 or 2, or one or more aspects of the apparatus 1315, 1415, or 1515 described with reference to FIG. 13, 14, or 15. The UE 1715 may be configured to implement at least some of the UE or apparatus features and functions described with reference to FIG. 1, 2, 3, 4, 5, 6, 7, 8, 9, 10, or 11.

The UE 1715 may include a UE processor module 1710, a UE memory module 1720, at least one UE transceiver module (represented by UE transceiver module(s) 1730), at least one UE antenna (represented by UE antenna(s) 1740), or a UE wireless communication management module 1760. Each of these components may be in communication with each other, directly or indirectly, over one or more buses 1735.

The UE memory module 1720 may include RAM or ROM. The UE memory module 1720 may store computer-readable, computer-executable code 1725 containing instructions that are configured to, when executed, cause the UE processor module 1710 to perform various functions described herein related to wireless communication. Alternatively, the code 1725 may not be directly executable by the UE processor module 1710 but be configured to cause the UE 1715 (e.g., when compiled and executed) to perform various of the functions described herein.

The UE processor module 1710 may include an intelligent hardware device, e.g., a CPU, a microcontroller, an ASIC, etc. The UE processor module 1710 may process information received through the UE transceiver module(s) 1730 or information to be sent to the UE transceiver module(s) 1730 for transmission through the UE antenna(s) 1740. The UE processor module 1710 may handle, alone or in connection with the UE wireless communication management module 1760, various aspects of communicating over (or managing communications over) a first radio frequency spectrum band (e.g., a radio frequency spectrum band for which apparatuses do not contend for access because the radio frequency spectrum band is licensed to certain users for certain uses, such as a licensed radio frequency spectrum band usable for LTE/LTE-A communications) or a second radio frequency spectrum band (e.g., a shared radio frequency spectrum band such as an unlicensed radio frequency spectrum band for which apparatuses may need to contend for access because the radio frequency spectrum band is available for unlicensed use, such as Wi-Fi use, or a licensed radio frequency spectrum band for which apparatuses may need to contend for access because the radio frequency spectrum band is available for use by two or more operators on a contention basis).

The UE transceiver module(s) 1730 may include a modem configured to modulate packets and provide the modulated packets to the UE antenna(s) 1740 for transmission, and to demodulate packets received from the UE antenna(s) 1740. The UE transceiver module(s) 1730 may, in some examples, be implemented as one or more UE transmitter modules and one or more separate UE receiver modules. The UE transceiver module(s) 1730 may support communications in the first radio frequency spectrum band or the second radio frequency spectrum band. The UE transceiver module(s) 1730 may be configured to communicate bi-directionally, via the UE antenna(s) 1740, with one or more of the base stations 105, 205, 205-a, or 1605 described with reference to FIG. 1, 2, or 16, or one or more of the apparatus 1205 described with reference to FIG. 12. While the UE 1715 may include a single UE antenna, there may be examples in which the UE 1715 may include multiple UE antennas 1740.

The UE state module 1750 may be used, for example, to manage transitions of the UE 1715 between a radio resource control (RRC) idle state and an RRC connected state, and may be in communication with other components of the UE 1715, directly or indirectly, over the one or more buses 1735. The UE state module 1750, or portions of it, may include a processor, or some or all of the functions of the UE state module 1750 may be performed by the UE processor module 1710 or in connection with the UE processor module 1710.

The UE wireless communication management module 1760 may be configured to perform or control some or all of the features or functions described with reference to FIG. 1, 2, 3, 4, 5, 6, 7, 8, 9, 10, or 11 related to wireless communication over the first radio frequency spectrum band or the second radio frequency spectrum band. For example, the UE wireless communication management module 1760 may be configured to support a supplemental downlink mode, carrier aggregation mode, or standalone mode using the first radio frequency spectrum band or the second radio frequency spectrum band. The UE wireless communication management module 1760 may include a UE LTE/LTE-A module for licensed spectrum 1765 configured to handle LTE/LTE-A communications in the first radio frequency spectrum band, and a UE LTE/LTE-A module for unlicensed spectrum 1770 configured to handle LTE/LTE-A communications in the second radio frequency spectrum. The UE wireless communication management module 1760, or portions of it, may include a processor, or some or all of the functions of the UE wireless communication management module 1760 may be performed by the UE processor module 1710 or in connection with the UE processor module 1710. In some examples, the UE wireless communication management module 1760 may be an example of the wireless communication management module 1320, 1420, or 1520 described with reference to FIG. 13, 14, or 15.

Figure 18:
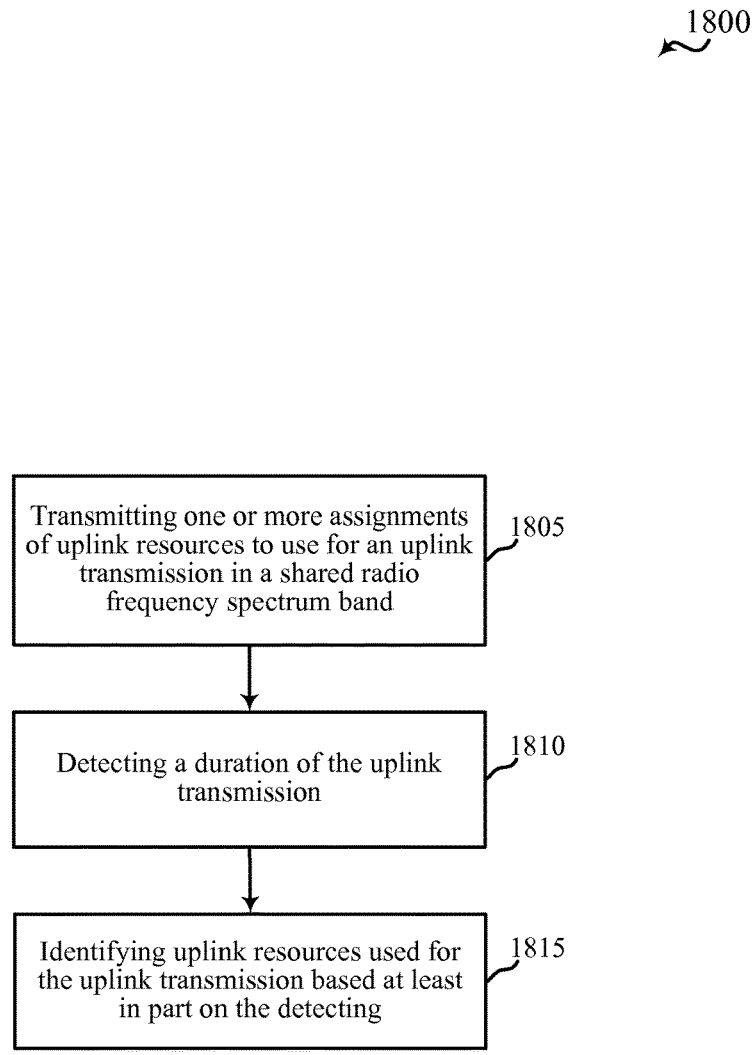
FIG. 18 is a flow chart illustrating an example of a method for wireless communication, in accordance with various aspects of the present disclosure.

FIG. 18 is a flow chart illustrating an example of a method 1800 for wireless communication, in accordance with various aspects of the present disclosure. For clarity, the method 1800 is described below with reference to aspects of one or more of the base stations 105, 205, 205-a, or 1605 described with reference to FIG. 1, 2, or 16, or aspects of the apparatus 1205 described with reference to FIG. 12. In some examples a base station or apparatus may execute one or more sets of codes to control the functional elements of the base station or apparatus to perform the functions described below.

At block 1805, the method 1800 may include transmitting one or more assignments of uplink resources to use for an uplink transmission in a shared radio frequency spectrum band. In some examples, the shared radio frequency spectrum band may include an unlicensed radio frequency spectrum band. In some examples, the shared radio frequency spectrum band may include a licensed radio frequency spectrum band shared by two or more operators. The unlicensed radio frequency spectrum band may be a radio frequency spectrum band for which apparatuses may need to contend for access because the radio frequency spectrum band is available for unlicensed use, such as Wi-Fi use. The licensed radio frequency spectrum band may be a radio frequency spectrum band for which apparatuses may need to contend for access because the radio frequency spectrum band is available for use by the two or more operators on a contention basis. The operation(s) at block 1805 may be performed using the wireless communication management module 1220 or 1660 described with reference to FIG. 12 or 16, or the uplink resource assignment transmission module 1235 described with reference to FIG. 12.

In some examples of the method 1800, the transmitting one or more assignments of uplink resources to use for an uplink transmission may include transmitting a first assignment of uplink resources associated with a first interval including a first duration, and transmitting a second assignment of uplink resources associated with a second interval including a second duration. The second duration may be different from the first duration.

At block 1810, the method 1800 may include detecting a duration of the uplink transmission. The operation(s) at block 1810 may be performed using the wireless communication management module 1220 or 1660 described with reference to FIG. 12 or 16, or the uplink transmission interval detection module 1240 described with reference to FIG. 12.

At block 1815, the method 1800 may include identifying uplink resources used for the uplink transmission based at least in part on the detecting. The operation(s) at block 1815 may be performed using the wireless communication management module 1220 or 1660 described with reference to FIG. 12 or 16, or the uplink resource identification module 1245 described with reference to FIG. 12.

In some examples of the method 1800, the identifying uplink resources used for the uplink transmission may include performing blind detection to identify the uplink resources used for the uplink transmission, or receiving a signal indicating the uplink resources used for the uplink transmission, or mapping the detected duration of the uplink transmission to the uplink resources used for the uplink transmission.

Thus, the method 1800 may provide for wireless communication. It should be noted that the method 1800 is just one implementation and that the operations of the method 1800 may be rearranged or otherwise modified such that other implementations are possible.

Figure 19:
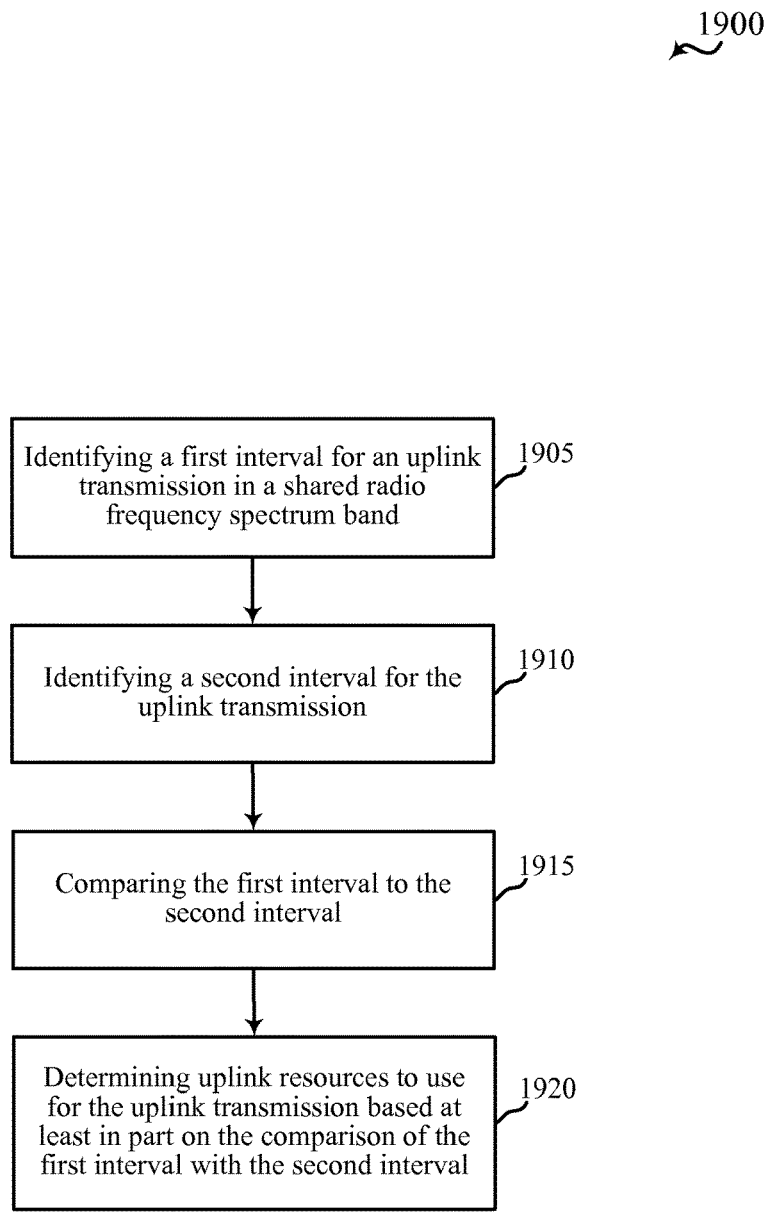
FIG. 19 is a flow chart illustrating an example of a method for wireless communication, in accordance with various aspects of the present disclosure.

FIG. 19 is a flow chart illustrating an example of a method 1900 for wireless communication, in accordance with various aspects of the present disclosure. For clarity, the method 1900 is described below with reference to aspects of one or more of the UEs 115, 215, 215-a, 215-b, 215-c, or 1715 described with reference to FIG. 1, 2, or 17, or aspects of one or more of the apparatus 1315, 1415, or 1515 described with reference to FIG. 13, 14, or 15. In some examples, a UE or apparatus may execute one or more sets of codes to control the functional elements of the UE or apparatus to perform the functions described below.

At block 1905, the method 1900 may include identifying a first interval for an uplink transmission in a shared radio frequency spectrum band. In some examples, the shared radio frequency spectrum band may include an unlicensed radio frequency spectrum band. In some examples, the shared radio frequency spectrum band may include a licensed radio frequency spectrum band shared by two or more operators. The unlicensed radio frequency spectrum band may be a radio frequency spectrum band for which apparatuses may need to contend for access because the radio frequency spectrum band is available for unlicensed use, such as Wi-Fi use. The licensed radio frequency spectrum band may be a radio frequency spectrum band for which apparatuses may need to contend for access because the radio frequency spectrum band is available for use by the two or more operators on a contention basis.

In some examples, the first interval may be an interval that a base station assigns or intends a UE performing the method 1900 to use, assuming the UE successfully contends for access to the shared radio frequency spectrum band by an assigned or intended time. Alternatively, the first interval may be another interval for which the base station has provided an assignment of uplink resources (e.g., at least one subframe or frequency subcarrier) to use for the uplink transmission.

The operation(s) at block 1905 may be performed using the wireless communication management module 1320, 1420, 1520, or 1760 described with reference to FIG. 13, 14, 15, or 17, or the first interval identification module 1335, 1440, or 1540 described with reference to FIG. 13, 14, or 15.

At block 1910, the method 1900 may include identifying a second interval for the uplink transmission. In some examples, the second interval may be an interval that a UE performing the method 1900 will actually use, which interval is dependent on when the UE successfully contends for access to the shared radio frequency spectrum band (e.g., successfully performs a CCA procedure or extended CCA procedure). The operation(s) at block 1910 may be performed using the wireless communication management module 1320, 1420, 1520, or 1760 described with reference to FIG. 13, 14, 15, or 17, or the second interval identification module 1340, 1445, or 1545 described with reference to FIG. 13, 14, or 15.

At block 1915, the method 1900 may include comparing the first interval with the second interval. The operation(s) at block 1915 may be performed using the wireless communication management module 1320, 1420, 1520, or 1760 described with reference to FIG. 13, 14, 15, or 17, or the interval comparison module 1345, 1450, or 1550 described with reference to FIG. 13, 14, or 15.

In some examples of the method 1900, the first interval may include a first duration for the uplink transmission and the second interval may include a second duration for the uplink transmission. The second duration may be different from the first duration. In these examples, the comparing the first interval with the second interval may include comparing the first duration for the uplink transmission to the second duration for the uplink transmission.

At block 1920, the method 1900 may include determining uplink resources to use for the uplink transmission based at least in part on the comparison of the first interval with the second interval. The operation(s) at block 1920 may be performed using the wireless communication management module 1320, 1420, 1520, or 1760 described with reference to FIG. 13, 14, 15, or 17, or the uplink resources determination module 1350, 1455, or 1555 described with reference to FIG. 13, 14, or 15.

After determining uplink resources to use for the uplink transmission, the method 1900 may proceed with transmitting the uplink transmission using the determined uplink resources.

Thus, the method 1900 may provide for wireless communication. It should be noted that the method 1900 is just one implementation and that the operations of the method 1900 may be rearranged or otherwise modified such that other implementations are possible.

Figure 20:
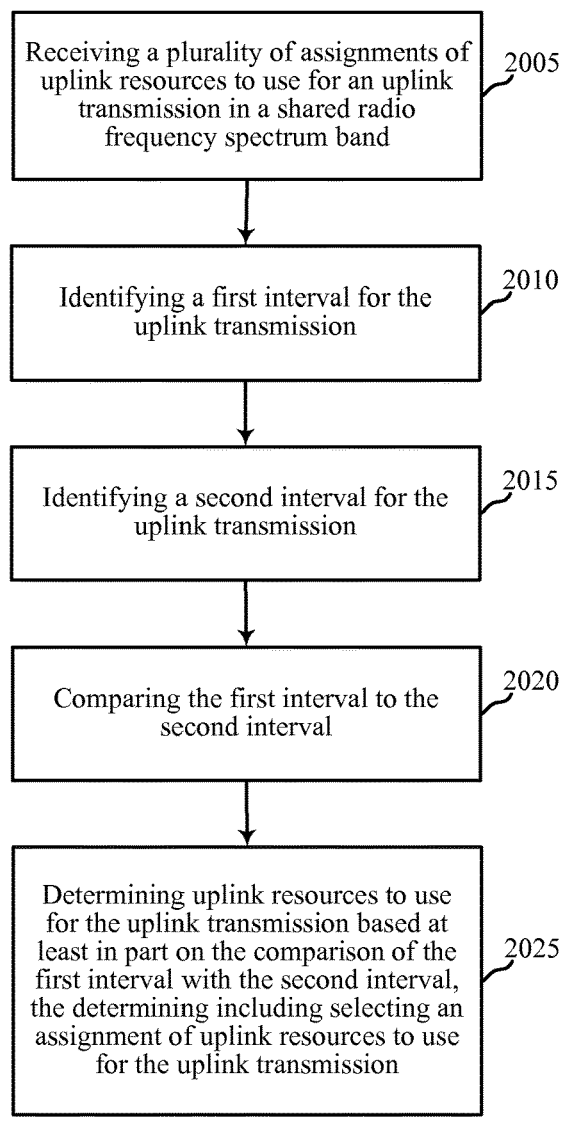
FIG. 20 is a flow chart illustrating an example of a method for wireless communication, in accordance with various aspects of the present disclosure.

FIG. 20 is a flow chart illustrating an example of a method 2000 for wireless communication, in accordance with various aspects of the present disclosure. For clarity, the method 2000 is described below with reference to aspects of one or more of the UEs 115, 215, 215-*a*, 215-*b*, 215-*c*, or 1715 described with reference to FIG. 1, 2, or 17, or aspects of one or more of the apparatus 1315, 1415, or 1515 described with reference to FIG. 13, 14, or 15. In some examples, a UE or apparatus may execute one or more sets of codes to control the functional elements of the UE or apparatus to perform the functions described below.

At block 2005, the method 2000 may include receiving a plurality of assignments of uplink resources to use for an uplink transmission in a shared radio frequency spectrum band. In some examples, the shared radio frequency spectrum band may include an unlicensed radio frequency spectrum band. In some examples, the shared radio frequency spectrum band may include a licensed radio frequency spectrum band shared by two or more operators. The unlicensed radio frequency spectrum band may be a radio frequency spectrum band for which apparatuses may need to contend for access because the radio frequency spectrum band is available for unlicensed use, such as Wi-Fi use. The licensed radio frequency spectrum band may be a radio frequency spectrum band for which apparatuses may need to contend for access because the radio frequency spectrum band is available for use by the two or more operators on a contention basis.

In some examples, the one or more assignments of uplink resources may include a multi-TTI assignment of uplink resources (e.g., an assignment for a TB spanning multiple TTIs or subframes). In some examples, the one or more assignments of uplink resources may correspond to different possible intervals (e.g., hypotheses) that a UE may use for an uplink transmission. In some examples, the different possible intervals may include different possible durations for the uplink transmission. For example, for a given frame, there may be two possible durations for the uplink transmission (e.g., a one subframe duration or a two subframe duration). A base station may therefore provide explicit assignments of uplink resources for each possible interval or duration for the uplink transmission (e.g., a first assignment of uplink resources for the case of a first interval having a one subframe duration, and a second assignment of uplink resources for the case of a second interval having a two subframe duration). In some examples, the plurality of assignments of uplink resources (e.g., possible durations for the uplink transmission) may be provided as individual uplink grants. In other examples, the plurality of assignments of uplink resources (e.g., possible durations for the uplink transmission) may be provided in a joint uplink grant. In the case of a joint uplink grant, some information fields may be shared among two or more of the assignments of uplink resources, and some information fields may be individually defined for each of the assignments of uplink resources. Alternatively, all of the information fields may be individually defined in a joint uplink grant.

The operation(s) at block 2005 may be performed using the wireless communication management module 1320, 1420, 1520, or 1760 described with reference to FIG. 13, 14, 15, or 17, or the uplink resource assignment reception module 1435 described with reference to FIG. 14.

At block 2010, the method 2000 may include identifying a first interval for the uplink transmission. In some examples, the first interval may be identified from one or more assignments received at block 2005. In some examples, the first interval may be an interval that a base station assigns or intends a UE performing the method 2000 to use, assuming the UE successfully contends for access to the shared radio frequency spectrum band by an assigned or intended time. Alternatively, the first interval may be another interval for which the base station has provided an assignment of uplink resources (e.g., at least one subframe or frequency subcarrier) to use for the uplink transmission. The operation(s) at block 2010 may be performed using the wireless communication management module 1320, 1420, 1520, or 1760 described with reference to FIG. 13, 14, 15, or 17, or the first interval identification module 1335 or 1440 described with reference to FIG. 13 or 14.

At block 2015, the method 2000 may include identifying a second interval for the uplink transmission. In some examples, the second interval may be an interval that a UE performing the method 2000 will actually use, which interval is dependent on when the UE successfully contends for access to the shared radio frequency spectrum band (e.g., successfully performs a CCA procedure or extended CCA procedure). The operation(s) at block 2015 may be performed using the wireless communication management module 1320, 1420, 1520, or 1760 described with reference to FIG. 13, 14, 15, or 17, or the second interval identification module 1340 or 1445 described with reference to FIG. 13 or 14.

At block 2020, the method 2000 may include comparing the first interval with the second interval. The operation(s) at block 2020 may be performed using the wireless communication management module 1320, 1420, 1520, or 1760 described with reference to FIG. 13, 14, 15, or 17, or the interval comparison module 1345 or 1450 described with reference to FIG. 13 or 14.

In some examples of the method 2000, the first interval may include a first duration for the uplink transmission and the second interval may include a second duration for the uplink transmission. The second duration may be different from the first duration. In these examples, the comparing the first interval with the second interval may include comparing the first duration for the uplink transmission to the second duration for the uplink transmission.

At block 2025, the method 2000 may include determining uplink resources to use for the uplink transmission based at least in part on the comparison of the first interval with the second interval. The determining uplink resources to use for the uplink transmission may include selecting an assignment of uplink resources (e.g., from the plurality of assignments received at block 2005) to use for the uplink transmission. For example, when an interval that a UE will actually use includes a duration of two subframes for the uplink transmission, an assignment of uplink resources corresponding to an uplink transmission having a two subframe duration may be selected, or when an interval that a UE will actually use includes a duration of one subframe for the uplink transmission, an assignment of uplink resources corresponding to an uplink transmission having a one subframe duration may be selected. The operation(s) at block 2025 may be performed using the wireless communication management module 1320, 1420, 1520, or 1760 described with reference to FIG. 13, 14, 15, or 17, the uplink resources determination module 1350 or 1455 described with reference to FIG. 13 or 14, or the uplink resource assignment selection module 1460 described with reference to FIG. 14.

After determining uplink resources to use for the uplink transmission, the method 2000 may proceed with transmitting the uplink transmission using the determined uplink resources.

Thus, the method 2000 may provide for wireless communication. It should be noted that the method 2000 is just one implementation and that the operations of the method 2000 may be rearranged or otherwise modified such that other implementations are possible.

Figure 21:
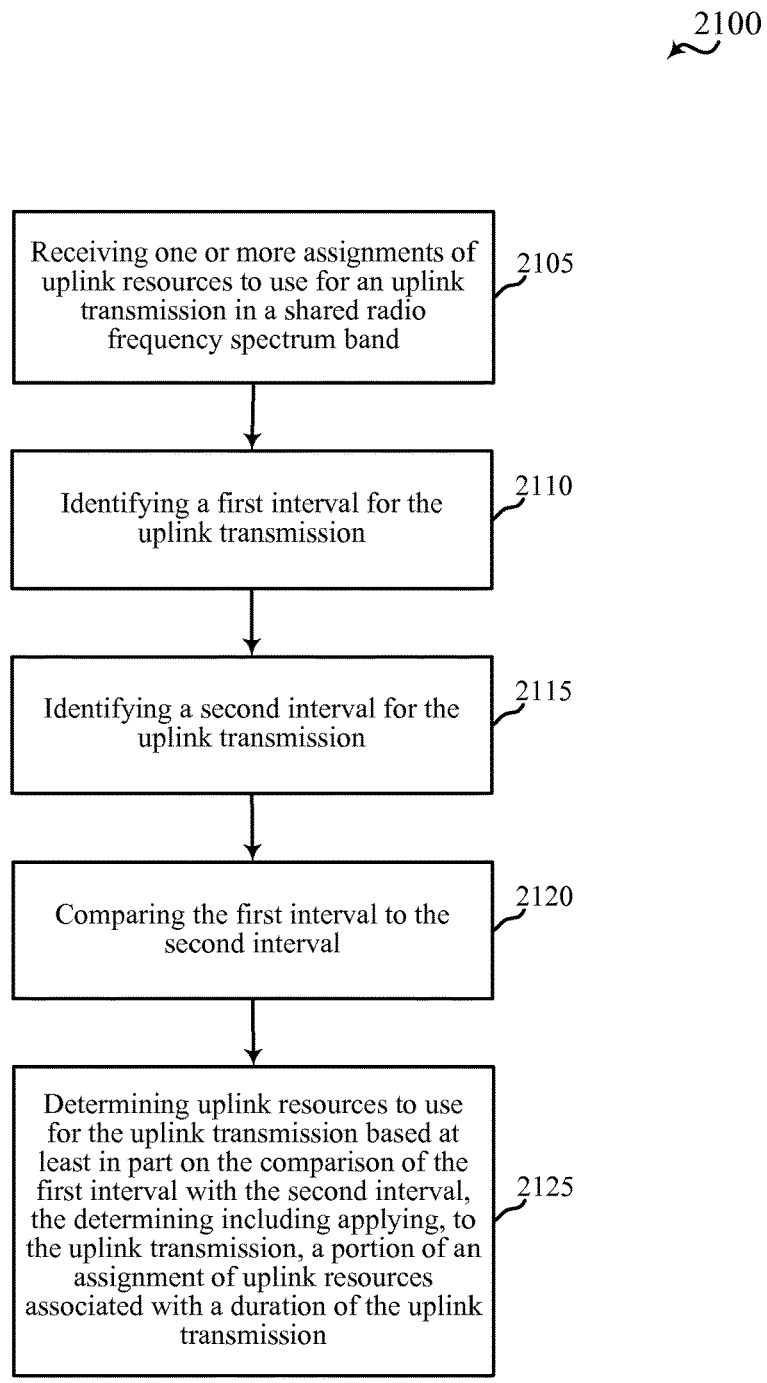
FIG. 21 is a flow chart illustrating an example of a method for wireless communication, in accordance with various aspects of the present disclosure.

FIG. 21 is a flow chart illustrating an example of a method 2100 for wireless communication, in accordance with various aspects of the present disclosure. For clarity, the method 2100 is described below with reference to aspects of one or more of the UEs 115, 215, 215-a, 215-b, 215-c, or 1715 described with reference to FIG. 1, 2, or 17, or aspects of one or more of the apparatus 1315, 1415, or 1515 described with reference to FIG. 13, 14, or 15. In some examples, a UE or apparatus may execute one or more sets of codes to control the functional elements of the UE or apparatus to perform the functions described below.

At block 2105, the method 2100 may include receiving one or more assignments of uplink resources to use for an uplink transmission in a shared radio frequency spectrum band. In some examples, the shared radio frequency spectrum band may include an unlicensed radio frequency spectrum band. In some examples, the shared radio frequency spectrum band may include a licensed radio frequency spectrum band shared by two or more operators. The unlicensed radio frequency spectrum band may be a radio frequency spectrum band for which apparatuses may need to contend for access because the radio frequency spectrum band is available for unlicensed use, such as Wi-Fi use. The licensed radio frequency spectrum band may be a radio frequency spectrum band for which apparatuses may need to contend for access because the radio frequency spectrum band is available for use by the two or more operators on a contention basis.

In some examples, the one or more assignments of uplink resources may include a multi-TTI assignment of uplink resources (e.g., an assignment for a TB spanning multiple TTIs or subframes). In some examples, the one or more assignments of uplink resources may include a single assignment of uplink resources based on an interval that a base station assigns or intends a UE performing the method 2100 to use, assuming the UE successfully contends for access to the shared radio frequency spectrum band by an assigned or intended time. In other examples, the one or more assignments of uplink resources may correspond to different possible intervals (e.g., hypotheses) that a UE may use for an uplink transmission. In some examples, the different possible intervals may include different possible durations for the uplink transmission. For example, for a given frame, there may be two possible durations for the uplink transmission (e.g., a one subframe duration or a two subframe duration). A base station may therefore provide explicit assignments of uplink resources for each possible interval or duration for the uplink transmission (e.g., a first assignment of uplink resources for the case of a first interval having a one subframe duration, and a second assignment of uplink resources for the case of a second interval having a two subframe duration). In some examples, a plurality of assignments of uplink resources (e.g., possible durations for the uplink transmission) may be provided as individual uplink grants. In other examples, a plurality of assignments of uplink resources (e.g., possible durations for the uplink transmission) may be provided in a joint uplink grant. In the case of a joint uplink grant, some information fields may be shared among two or more of the assignments of uplink resources, and some information fields may be individually defined for each of the assignments of uplink resources. Alternatively, all of the information fields may be individually defined in a joint uplink grant.

The operation(s) at block 2105 may be performed using the wireless communication management module 1320, 1420, 1520, or 1760 described with reference to FIG. 13, 14, 15, or 17, or the uplink resource assignment reception module 1535 described with reference to FIG. 14.

At block 2110, the method 2100 may include identifying a first interval for the uplink transmission. In some examples, the first interval may be identified from one or more assignments received at block 2105. In some examples, the first interval may be an interval that a base station assigns or intends a UE performing the method 2100 to use, assuming the UE successfully contends for access to the shared radio frequency spectrum band by an assigned or intended time. Alternatively, the first interval may be another interval for which the base station has provided an assignment of uplink resources (e.g., at least one subframe or frequency subcarrier) to use for the uplink transmission. The operation(s) at block 2110 may be performed using the wireless communication management module 1320, 1420, 1520, or 1760 described with reference to FIG. 13, 14, 15, or 17, or the first interval identification module 1335 or 1540 described with reference to FIG. 13 or 15.

At block 2115, the method 2100 may include identifying a second interval for the uplink transmission. In some examples, the second interval may be an interval that a UE performing the method 2100 will actually use, which interval is dependent on when the UE successfully contends for access to the shared radio frequency spectrum band. The operation(s) at block 2115 may be performed using the wireless communication management module 1320, 1420, 1520, or 1760 described with reference to FIG. 13, 14, 15, or 17, or the second interval identification module 1340 or 1545 described with reference to FIG. 13 or 15.

At block 2120, the method 2100 may include comparing the first interval with the second interval. The operation(s) at block 2120 may be performed using the wireless communication management module 1320, 1420, 1520, or 1760 described with reference to FIG. 13, 14, 15, or 17, or the interval comparison module 1345 or 1550 described with reference to FIG. 13 or 15.

In some examples of the method 2100, the first interval may include a first duration for the uplink transmission and the second interval may include a second duration for the uplink transmission. The second duration may be different from the first duration. In these examples, the comparing the first interval with the second interval may include comparing the first duration for the uplink transmission to the second duration for the uplink transmission.

At block 2125, the method 2100 may include determining uplink resources to use for the uplink transmission based at least in part on the comparison of the first interval with the second interval. The determining uplink resources to use for the uplink transmission may include applying, to the uplink transmission, a portion of an assignment of uplink resources associated with an interval or actual duration of the uplink transmission. For example, when a UE receives an assignment of uplink resources based on an assigned or intended duration of the uplink transmission (e.g., a duration of an uplink transmission that a base station assigns or intends the UE to make), but the UE will make an uplink transmission having a shorter duration, the UE may apply, to the uplink transmission it makes, a portion of the assignment of uplink resources (e.g., a UE may receive an assignment of uplink resources corresponding to an uplink transmission having a four subframe duration, but the UE may make an uplink transmission having a two subframe duration, and may therefore apply a portion of the assignment of uplink resources to the uplink transmission it makes (e.g., a portion of the assignment corresponding to two subframes of the assignment of uplink resources)). As another example, a UE may receive an assignment of uplink resources corresponding to an uplink transmission having a four subframe duration, but the UE may make an uplink transmission having a duration of two full-length subframes and one partial-length subframe. In this latter example, the UE may apply a portion of the assignment of uplink resources to the uplink transmission it makes (e.g., a portion of the assignment corresponding to the two full-length subframes and the one partial-length subframe).

The operation(s) at block 2125 may be performed using the wireless communication management module 1320, 1420, 1520, or 1760 described with reference to FIG. 13, 14, 15, or 17, the uplink resources determination module 1350 or 1555 described with reference to FIG. 13 or 15, or the uplink resource assignment application module 1560 described with reference to FIG. 15.

In examples of the method 2100 in which more than one assignment of uplink resources to use for the uplink transmission is received, the operation(s) at block 2125 may also include selecting an assignment of uplink resources to use for the uplink transmission.

After determining uplink resources to use for the uplink transmission, the method 2100 may proceed with transmitting the uplink transmission using the determined uplink resources.

Thus, the method 2100 may provide for wireless communication. It should be noted that the method 2100 is just one implementation and that the operations of the method 2100 may be rearranged or otherwise modified such that other implementations are possible.

Figure 22:
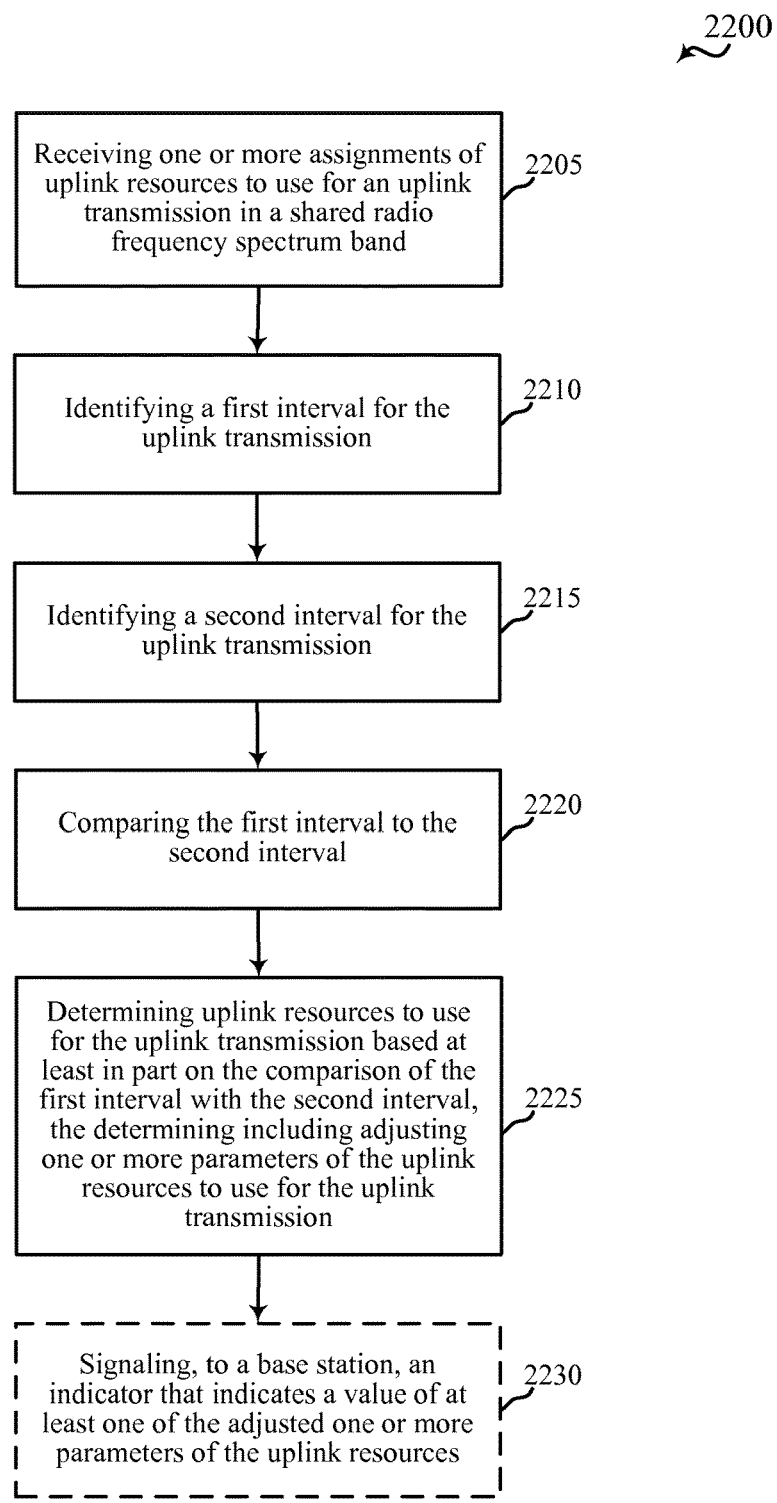
FIG. 22 is a flow chart illustrating an example of a method for wireless communication, in accordance with various aspects of the present disclosure.

FIG. 22 is a flow chart illustrating an example of a method 2200 for wireless communication, in accordance with various aspects of the present disclosure. For clarity, the method 2200 is described below with reference to aspects of one or more of the UEs 115, 215, 215-*a*, 215-*b*, 215-*c*, or 1715 described with reference to FIG. 1, 2, or 17, or aspects of one or more of the apparatus 1315, 1415, or 1515 described with reference to FIG. 13, 14, or 15. In some examples, a UE or apparatus may execute one or more sets of codes to control the functional elements of the UE or apparatus to perform the functions described below.

At block 2205, the method 2200 may include receiving one or more assignments of uplink resources to use for an uplink transmission in a shared radio frequency spectrum band. In some examples, the shared radio frequency spectrum band may include an unlicensed radio frequency spectrum band. In some examples, the shared radio frequency spectrum band may include a licensed radio frequency spectrum band shared by two or more operators. The unlicensed radio frequency spectrum band may be a radio frequency spectrum band for which apparatuses may need to contend for access because the radio frequency spectrum band is available for unlicensed use, such as Wi-Fi use. The licensed radio frequency spectrum band may be a radio frequency spectrum band for which apparatuses may need to contend for access because the radio frequency spectrum band is available for use by the two or more operators on a contention basis.

In some examples, the one or more assignments of uplink resources may include a multi-TTI assignment of uplink resources (e.g., an assignment for a TB spanning multiple TTIs or subframes). In some examples, the one or more assignments of uplink resources may include a single assignment of uplink resources based on an interval that a base station assigns or intends a UE performing the method 2200 to use, assuming the UE successfully contends for access to the shared radio frequency spectrum band by an assigned or intended time. In other examples, the one or more assignments of uplink resources may correspond to different possible intervals (e.g., hypotheses) that a UE may use for an uplink transmission. In some examples, the different possible intervals may include different possible durations for the uplink transmission. For example, for a given frame, there may be two possible durations for the uplink transmission (e.g., a one subframe duration or a two subframe duration). A base station may therefore provide explicit assignments of uplink resources for each possible interval or duration for the uplink transmission (e.g., a first assignment of uplink resources for the case of a first interval having a one subframe duration, and a second assignment of uplink resources for the case of a second interval having a two subframe duration). In some examples, a plurality of assignments of uplink resources (e.g., possible durations for the uplink transmission) may be provided as individual uplink grants. In other examples, a plurality of assignments of uplink resources (e.g., possible durations for the uplink transmission) may be provided in a joint uplink grant. In the case of a joint uplink grant, some information fields may be shared among two or more of the assignments of uplink resources, and some information fields may be individually defined for each of the assignments of uplink resources. Alternatively, all of the information fields may be individually defined in a joint uplink grant.

The operation(s) at block 2205 may be performed using the wireless communication management module 1320, 1420, 1520, or 1760 described with reference to FIG. 13, 14, 15, or 17, or the uplink resource assignment reception module 1535 described with reference to FIG. 14.

At block 2210, the method 2200 may include identifying a first interval for the uplink transmission. In some examples, the first interval may be identified from one or more assignments received at block 2205. In some examples, the first interval may be an interval that a base station assigns or intends a UE performing the method 2200 to use, assuming the UE successfully contends for access to the shared radio frequency spectrum band by an assigned or intended time. Alternatively, the first interval may be another interval for which the base station has provided an assignment of uplink resources (e.g., at least one subframe or frequency subcarrier) to use for the uplink transmission. The operation(s) at block 2210 may be performed using the wireless communication management module 1320, 1420, 1520, or 1760 described with reference to FIG. 13, 14, 15, or 17, or the first interval identification module 1335 or 1540 described with reference to FIG. 13 or 15.

At block 2215, the method 2200 may include identifying a second interval for the uplink transmission. In some examples, the second interval may be an interval that a UE performing the method 2200 will actually use, which interval is dependent on when the UE successfully contends for access to the shared radio frequency spectrum band (e.g., successfully performs a CCA procedure or extended CCA procedure). The operation(s) at block 2215 may be performed using the wireless communication management module 1320, 1420, 1520, or 1760 described with reference to FIG. 13, 14, 15, or 17, or the second interval identification module 1340 or 1545 described with reference to FIG. 13 or 15.

At block 2220, the method 2200 may include comparing the first interval with the second interval. The operation(s) at block 2220 may be performed using the wireless communication management module 1320, 1420, 1520, or 1760 described with reference to FIG. 13, 14, 15, or 17, or the interval comparison module 1345 or 1550 described with reference to FIG. 13 or 15.

In some examples of the method 2200, the first interval may include a first duration for the uplink transmission and the second interval may include a second duration for the uplink transmission. The second duration may be different from the first duration. In these examples, the comparing the first interval with the second interval may include comparing the first duration for the uplink transmission to the second duration for the uplink transmission.

At block 2225, the method 2200 may include determining uplink resources to use for the uplink transmission based at least in part on the comparison of the first interval with the second interval. The determining uplink resources to use for the uplink transmission may include adjusting one or more parameters of the uplink resources to use for the uplink transmission based at least in part on the comparison of the first interval with the second interval. In some examples, the adjusting may be performed autonomously by a UE. An autonomous adjustment of one or more parameters of the uplink resources may be useful when a UE receives a single assignment of uplink resources for an uplink transmission, which single assignment of uplink resources does not differentiate different possible intervals (e.g., hypotheses) of uplink transmission durations (e.g., a different uplink transmission duration based on fewer uplink subframes or a shortened uplink subframe).

In one example of adjusting a parameter of the uplink resources for the uplink transmission, consider the receipt of a multi-TTI assignment of uplink resources for a TB spanning multiple subframes. When a UE makes an uplink transmission having a duration that is shorter than the assigned or intended duration of the TB, the UE may increase its transmit power. For example, if the UE makes an uplink transmission having a duration that is half the assigned or intended duration of the TB, the UE may increase its transmit power (e.g., the transmit power may be increased by 3 dB). The UE may also or alternatively adjust (e.g., decrease) the size of the TB or adjust a number of symbols (e.g., an SC-FDM or OFDM symbol) to align to a reference boundary (e.g., symbol period boundary or subframe boundary).

In another example of adjusting a parameter of the uplink resources for the uplink transmission, when a UE makes an uplink transmission having a duration that is shorter than a duration of an uplink transmission indicated in an assignment of uplink resources, a UE may use a higher MCS than an MCS indicated in the assignment of uplink resources.

In some examples, an autonomous adjustment of one or more parameters of the uplink resources to use for the uplink transmission may be based on one or more rules or a table. The one or more rules or table may in some examples be provided to a UE by a base station, such that the base station and the UE have access to a common set of rules or table. In some examples, a rule or table may map a duration of an uplink transmission to a single value for a parameter of the uplink resources (e.g., a one-to-one mapping). In other examples, a rule or table may map a duration of an uplink transmission to a plurality of values for a parameter of the uplink resources (e.g., a one-to-many mapping). In the case of a one-to-one mapping, the UE may adjust a single value of a parameter of the uplink resources based on an actual duration of an uplink transmission provided by the rule or table. The base station may determine the value of an adjusted parameter upon receiving or detecting the actual duration of an uplink transmission. In the case of a one-to-many mapping, the UE may select a value from a plurality of values of a parameter of the uplink resources based on an actual duration of an uplink transmission provided by the rule or table, and may adjust the parameter of the uplink resources based on the selected value. The base station may need to perform a blind detection to determine the value of an adjusted parameter. Alternatively, a UE may indicate the value of an adjusted parameter (e.g., an adjusted MCS) via signaling (e.g., via uplink CUBS or another channel), as described with reference to block 2230.

The operation(s) at block 2225 may be performed using the wireless communication management module 1320, 1420, 1520, or 1760 described with reference to FIG. 13, 14, 15, or 17, the uplink resources determination module 1350 or 1555 described with reference to FIG. 13 or 15, or the uplink resource parameter adjustment module 1565 described with reference to FIG. 15.

In examples of the method 2200 in which more than one assignment of uplink resources to use for the uplink transmission is received, the operation(s) at block 2225 may also include selecting an assignment of uplink resources to use for the uplink transmission.

At block 2230, the method 2200 may optionally include signaling, to a base station, an indicator that indicates a value of at least one of the adjusted one or more parameters of the uplink resources. The operation(s) at block 2230 may be performed using the wireless communication management module 1320, 1420, 1520, or 1760 described with reference to FIG. 13, 14, 15, or 17, or the signaling module 1575 described with reference to FIG. 15.

After determining uplink resources to use for the uplink transmission, the method 2200 may proceed with transmitting the uplink transmission using the determined uplink resources.

Thus, the method 2200 may provide for wireless communication. It should be noted that the method 2200 is just one implementation and that the operations of the method 2200 may be rearranged or otherwise modified such that other implementations are possible.

Figure 23:
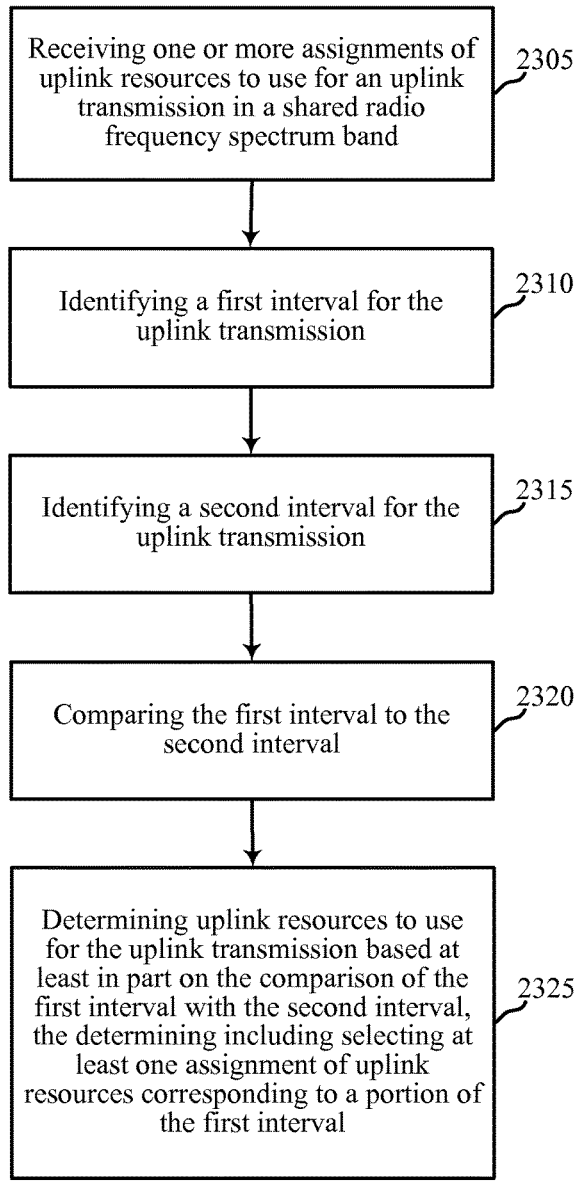
FIG. 23 is a flow chart illustrating an example of a method for wireless communication, in accordance with various aspects of the present disclosure.

FIG. 23 is a flow chart illustrating an example of a method 2300 for wireless communication, in accordance with various aspects of the present disclosure. For clarity, the method 2300 is described below with reference to aspects of one or more of the UEs 115, 215, 215-a, 215-b, 215-c, or 1715 described with reference to FIG. 1, 2, or 17, or aspects of one or more of the apparatus 1315, 1415, or 1515 described with reference to FIG. 13, 14, or 15. In some examples, a UE or apparatus may execute one or more sets of codes to control the functional elements of the UE or apparatus to perform the functions described below.

At block 2305, the method 2300 may include receiving one or more assignments of uplink resources to use for an uplink transmission in a shared radio frequency spectrum band. In some examples, the shared radio frequency spectrum band may include an unlicensed radio frequency spectrum band. In some examples, the shared radio frequency spectrum band may include a licensed radio frequency spectrum band shared by two or more operators. The unlicensed radio frequency spectrum band may be a radio frequency spectrum band for which apparatuses may need to contend for access because the radio frequency spectrum band is available for unlicensed use, such as Wi-Fi use. The licensed radio frequency spectrum band may be a radio frequency spectrum band for which apparatuses may need to contend for access because the radio frequency spectrum band is available for use by the two or more operators on a contention basis.

In some examples, the one or more assignments of uplink resources may include a multi-TTI assignment of uplink resources (e.g., an assignment for a TB spanning multiple TTIs or subframes). In some examples, the one or more assignments of uplink resources may include a single assignment of uplink resources based on an interval that a base station assigns or intends a UE performing the method 2300 to use, assuming the UE successfully contends for access to the shared radio frequency spectrum band by an assigned or intended time. In other examples, the one or more assignments of uplink resources may correspond to different possible intervals (e.g., hypotheses) that a UE may use for an uplink transmission. In some examples, the different possible intervals may include different possible durations for the uplink transmission. For example, for a given frame, there may be two possible durations for the uplink transmission (e.g., a one subframe duration or a two subframe duration). A base station may therefore provide explicit assignments of uplink resources for each possible interval or duration for the uplink transmission (e.g., a first assignment of uplink resources for the case of a first interval having a one subframe duration, and a second assignment of uplink resources for the case of a second interval having a two subframe duration). In some examples, a plurality of assignments of uplink resources (e.g., possible durations for the uplink transmission) may be provided as individual uplink grants. In other examples, a plurality of assignments of uplink resources (e.g., possible durations for the uplink transmission) may be provided in a joint uplink grant. In the case of a joint uplink grant, some information fields may be shared among two or more of the assignments of uplink resources, and some information fields may be individually defined for each of the assignments of uplink resources. Alternatively, all of the information fields may be individually defined in a joint uplink grant.

The operation(s) at block 2305 may be performed using the wireless communication management module 1320, 1420, 1520, or 1760 described with reference to FIG. 13, 14, 15, or 17, or the uplink resource assignment reception module 1535 described with reference to FIG. 14.

At block 2310, the method 2300 may include identifying a first interval for the uplink transmission. In some examples, the first interval may be identified from one or more assignments received at block 2305. In some examples, the first interval may be an interval that a base station assigns or intends a UE performing the method 2300 to use, assuming the UE successfully contends for access to the shared radio frequency spectrum band by an assigned or intended time. Alternatively, the first interval may be another interval for which the base station has provided an assignment of uplink resources (e.g., at least one subframe or frequency subcarrier) to use for the uplink transmission. The operation(s) at block 2310 may be performed using the wireless communication management module 1320, 1420, 1520, or 1760 described with reference to FIG. 13, 14, 15, or 17, or the first interval identification module 1335 or 1540 described with reference to FIG. 13 or 15.

At block 2315, the method 2300 may include identifying a second interval for the uplink transmission. In some examples, the second interval may be an interval that a UE performing the method 2300 will actually use, which interval is dependent on when the UE successfully contends for access to the shared radio frequency spectrum band (e.g., successfully performs a CCA procedure or extended CCA procedure). The operation(s) at block 2315 may be performed using the wireless communication management module 1320, 1420, 1520, or 1760 described with reference to FIG. 13, 14, 15, or 17, or the second interval identification module 1340 or 1545 described with reference to FIG. 13 or 15.

At block 2320, the method 2300 may include comparing the first interval with the second interval. The operation(s) at block 2320 may be performed using the wireless communication management module 1320, 1420, 1520, or 1760 described with reference to FIG. 13, 14, 15, or 17, or the interval comparison module 1345 or 1550 described with reference to FIG. 13 or 15.

In some examples of the method 2300, the first interval may include a first duration for the uplink transmission and the second interval may include a second duration for the uplink transmission. The second duration may be different from the first duration. In these examples, the comparing the first interval with the second interval may include comparing the first duration for the uplink transmission to the second duration for the uplink transmission.

At block 2325, the method 2300 may include determining uplink resources to use for the uplink transmission based at least in part on the comparison of the first interval with the second interval. The determining uplink resources to use for the uplink transmission may include selecting at least one assignment of uplink resources corresponding to a portion of the first interval. For example, when a UE receives a multi-TTI assignment of uplink resources corresponding to the first interval, which multi-TTI assignment of uplink resources is based on an assigned or intended duration of the uplink transmission (e.g., a duration of an uplink transmission that a base station assigns or intends the UE to make), but the UE will make an uplink transmission having an actual duration that is shorter than the assigned or intended duration (which actual duration corresponds to the second interval), then the UE may select at least one assignment of uplink resources corresponding to a portion of the first interval. Consider, for example, that the assigned or intended duration of the uplink transmission is four subframes, and the actual duration of the uplink transmission is two subframes. In such an example, the UE may select at least one assignment of uplink resources corresponding to a first portion of the first interval (e.g., at least one assignment of uplink resources corresponding to the first two of the four subframes of the first interval). For example, the multi-subframe assignment apportionment module 1570 may select a first assignment (e.g., a first subframe assignment) of uplink resources corresponding to the first interval. Such a selection may be advantageous, for example, if the UE was only scheduled to transmit in the first two subframes of the first interval (and thus, the UE may transmit the data it was assigned or intended to transmit, despite transmitting the data later than it was assigned or intended to be transmitted).

In some examples, the selecting at least one assignment of uplink resources corresponding to a portion of the first interval may require use or modification of one or more parameters that are not applicable to a different subframe index. For example, it may be undesirable to transmit an SRS triggered for a first subframe of an interval during a later subframe of the interval. In the case of a PUSCH transmission, an actual PUSCH transmission may be adjusted based on an actual subframe index (e.g., since some PUSCH parameters (e.g., PUSCH hopping, DM-RS sequence generation, etc.) may be associated with a subframe index).

The operation(s) at block 2325 may be performed using the wireless communication management module 1320, 1420, 1520, or 1760 described with reference to FIG. 13, 14, 15, or 17, the uplink resources determination module 1350 or 1555 described with reference to FIG. 13 or 15, or the multi-subframe assignment apportionment module 1570 described with reference to FIG. 15.

In examples of the method 2300 in which more than one assignment of uplink resources to use for the uplink transmission is received, the operation(s) at block 2325 may also include selecting an assignment of uplink resources to use for the uplink transmission.

After determining uplink resources to use for the uplink transmission, the method 2300 may proceed with transmitting the uplink transmission using the determined uplink resources.

Thus, the method 2300 may provide for wireless communication. It should be noted that the method 2300 is just one implementation and that the operations of the method 2300 may be rearranged or otherwise modified such that other implementations are possible.

Figure 24:
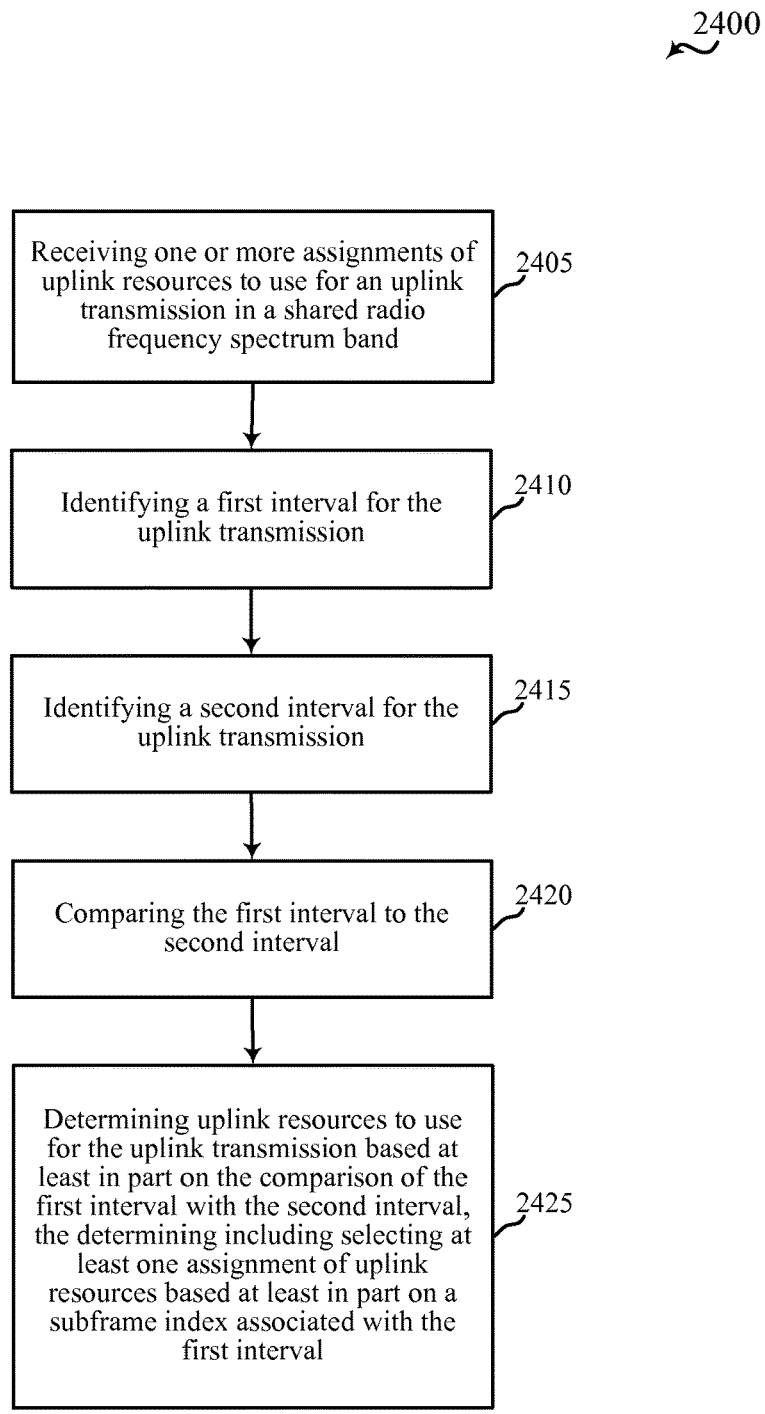
FIG. 24 is a flow chart illustrating an example of a method for wireless communication, in accordance with various aspects of the present disclosure.

FIG. 24 is a flow chart illustrating an example of a method 2400 for wireless communication, in accordance with various aspects of the present disclosure. For clarity, the method 2400 is described below with reference to aspects of one or more of the UEs 115, 215, 215-a, 215-b, 215-c, or 1715 described with reference to FIG. 1, 2, or 17, or aspects of one or more of the apparatus 1315, 1415, or 1515 described with reference to FIG. 13, 14, or 15. In some examples, a UE or apparatus may execute one or more sets of codes to control the functional elements of the UE or apparatus to perform the functions described below.

At block 2405, the method 2400 may include receiving one or more assignments of uplink resources to use for an uplink transmission in a shared radio frequency spectrum band. In some examples, the shared radio frequency spectrum band may include an unlicensed radio frequency spectrum band. In some examples, the shared radio frequency spectrum band may include a licensed radio frequency spectrum band shared by two or more operators. The unlicensed radio frequency spectrum band may be a radio frequency spectrum band for which apparatuses may need to contend for access because the radio frequency spectrum band is available for unlicensed use, such as Wi-Fi use. The licensed radio frequency spectrum band may be a radio frequency spectrum band for which apparatuses may need to contend for access because the radio frequency spectrum band is available for use by the two or more operators on a contention basis.

In some examples, the one or more assignments of uplink resources may include a multi-TTI assignment of uplink resources (e.g., an assignment for a TB spanning multiple TTIs or subframes). In some examples, the one or more assignments of uplink resources may include a single assignment of uplink resources based on an interval that a base station assigns or intends a UE performing the method 2300 to use, assuming the UE successfully contends for access to the shared radio frequency spectrum band by an assigned or intended time. In other examples, the one or more assignments of uplink resources may correspond to different possible intervals (e.g., hypotheses) that a UE may use for an uplink transmission. In some examples, the different possible intervals may include different possible durations for the uplink transmission. For example, for a given frame, there may be two possible durations for the uplink transmission (e.g., a one subframe duration or a two subframe duration). A base station may therefore provide explicit assignments of uplink resources for each possible interval or duration for the uplink transmission (e.g., a first assignment of uplink resources for the case of a first interval having a one subframe duration, and a second assignment of uplink resources for the case of a second interval having a two subframe duration). In some examples, a plurality of assignments of uplink resources (e.g., possible durations for the uplink transmission) may be provided as individual uplink grants. In other examples, a plurality of assignments of uplink resources (e.g., possible durations for the uplink transmission) may be provided in a joint uplink grant. In the case of a joint uplink grant, some information fields may be shared among two or more of the assignments of uplink resources, and some information fields may be individually defined for each of the assignments of uplink resources. Alternatively, all of the information fields may be individually defined in a joint uplink grant.

The operation(s) at block 2405 may be performed using the wireless communication management module 1320, 1420, 1520, or 1760 described with reference to FIG. 13, 14, 15, or 17, or the uplink resource assignment reception module 1535 described with reference to FIG. 15.

At block 2410, the method 2400 may include identifying a first interval for the uplink transmission. In some examples, the first interval may be identified from one or more assignments received at block 2405. In some examples, the first interval may be an interval that a base station assigns or intends a UE performing the method 2400 to use, assuming the UE successfully contends for access to the shared radio frequency spectrum band by an assigned or intended time. Alternatively, the first interval may be another interval for which the base station has provided an assignment of uplink resources (e.g., at least one subframe or frequency subcarrier) to use for the uplink transmission. The operation(s) at block 2410 may be performed using the wireless communication management module 1320, 1420, 1520, or 1760 described with reference to FIG. 13, 14, 15, or 17, or the first interval identification module 1335 or 1540 described with reference to FIG. 13 or 15.

At block 2415, the method 2400 may include identifying a second interval for the uplink transmission. In some examples, the second interval may be an interval that a UE performing the method 2400 will actually use, which interval is dependent on when the UE successfully contends for access to the shared radio frequency spectrum band (e.g., successfully performs a CCA procedure or extended CCA procedure). The operation(s) at block 2415 may be performed using the wireless communication management module 1320, 1420, 1520, or 1760 described with reference to FIG. 13, 14, 15, or 17, or the second interval identification module 1340 or 1545 described with reference to FIG. 13 or 15.

At block 2420, the method 2400 may include comparing the first interval with the second interval. The operation(s) at block 2420 may be performed using the wireless communication management module 1320, 1420, 1520, or 1760 described with reference to FIG. 13, 14, 15, or 17, or the interval comparison module 1345 or 1550 described with reference to FIG. 13 or 15.

In some examples of the method 2400, the first interval may include a first duration for the uplink transmission and the second interval may include a second duration for the uplink transmission. The second duration may be different from the first duration. In these examples, the comparing the first interval with the second interval may include comparing the first duration for the uplink transmission to the second duration for the uplink transmission.

At block 2425, the method 2400 may include determining uplink resources to use for the uplink transmission based at least in part on the comparison of the first interval with the second interval. The determining uplink resources to use for the uplink transmission may include selecting at least one assignment of uplink resources based at least in part on a subframe index associated with the first interval. For example, when a UE receives a multi-TTI assignment of uplink resources corresponding to the first interval, which multi-TTI assignment of uplink resources is based on an assigned or intended duration of the uplink transmission (e.g., a duration of an uplink transmission that a base station assigns or intends the UE to make), but the UE will make an uplink transmission having an actual duration that is shorter than the assigned or intended duration (which actual duration corresponds to the second interval), then the UE may select at least one assignment of uplink resources based at least in part on a subframe index associated with the first interval. Consider, for example, that the assigned or intended duration of the uplink transmission is four subframes, and the actual duration of the uplink transmission is two subframes. Also consider that the four subframes in the assigned or intended duration of the uplink transmission are respectively associated with subframe indexes SF_5, SF_6, SF_7, and SF_8, and that the uplink transmission to be transmitted by a UE will begin in a subframe having subframe index SF_7. In such an example, the UE may select the assignments of uplink resources corresponding to subframe indexes SF_7 and SF_8 of the first interval.

Selecting at least one assignment of uplink resources based at least in part on a subframe index associated with the first interval may better align an uplink transmission with an original intention of a base station (e.g., in terms of PHICH resource management (e.g., for uplink synchronization HARQ), based on a starting PRB and cyclic shift used by a DM-RS, or in terms of PUSCH hopping (e.g., if tied with a subframe index)). Such a selection may be advantageous when multi-TTI scheduling for a UE is such that the UE is scheduled to transmit in all uplink subframes of the first interval. When the UE is not scheduled to transmit in all uplink subframes, selection of one or more assignments of uplink resources corresponding to later subframes in the first interval may result in the UE not being able to transmit data.

The operation(s) at block 2425 may be performed using the wireless communication management module 1320, 1420, 1520, or 1760 described with reference to FIG. 13, 14, 15, or 17, the uplink resources determination module 1350 or 1555 described with reference to FIG. 13 or 15, or the multi-subframe assignment apportionment module 1570 described with reference to FIG. 15.

In examples of the method 2400 in which more than one assignment of uplink resources to use for the uplink transmission is received, the operation(s) at block 2425 may also include selecting an assignment of uplink resources to use for the uplink transmission.

After determining uplink resources to use for the uplink transmission, the method 2400 may proceed with transmitting the uplink transmission using the determined uplink resources.

Thus, the method 2400 may provide for wireless communication. It should be noted that the method 2400 is just one implementation and that the operations of the method 2400 may be rearranged or otherwise modified such that other implementations are possible.

In some examples, aspects of one or more of the methods 1900, 2000, 2100, 2200, 2300, or 2400 described with reference to FIG. 19, 20, 21, 22, 23, or 24 may be combined. For example, the method 2300 described with reference to FIG. 23 and the method 2400 described with reference to FIG. 24 may be combined such that a selection of at least one assignment of uplink resources may be made in accordance with the operation(s) described with reference to block 2325 or the operation(s) described with reference to block 2425. The selection of at least one assignment of uplink resources may be based at least in part on whether a UE is scheduled to transmit in all subframes of a first interval (e.g., in all subframes of an assigned or intended interval). When the UE is scheduled to transmit in all subframes of the first interval, the selection of at least one assignment of uplink resources may be made in accordance with the operation(s) described with reference to block 2425. When the UE is not scheduled to transmit in all subframes of the first interval, the selection of at least one assignment of uplink resources may be made in accordance with the operation(s) described with reference to block 2325. Alternatively, a base station may indicate to the UE whether the UE should make a selection of at least one assignment of uplink resources in accordance with the operation(s) described with reference to block 2325 or the operation(s) described with reference to block 2425.

In any of the methods 1900, 2000, 2100, 2200, 2300, or 2400 described with reference to FIG. 19, 20, 21, 22, 23, or 24, it may be desirable to keep uplink transmit power the same across different subframes of an uplink transmission. In some examples, a UE may be configured to assume that the uplink power control commands in an assignments of uplink resources corresponding to an interval that a base station assigns or intends the UE to use are valid and apply them accordingly, even when an actual duration of an uplink transmission by the UE is shorter than an assigned or intended duration of the uplink transmission. In some examples, an uplink power control adjustment for an uplink transmission may only be made once, at the beginning of an uplink transmission. Thus, it may be expected in these examples that there is one power control command for the duration of the uplink transmission, and the power control command may be applied to the uplink transmission regardless of the actual duration of the uplink transmission.

In any of the methods 1900, 2000, 2100, 2200, 2300, or 2400 described with reference to FIG. 19, 20, 21, 22, 23, or 24, the application of one or more assignments of uplink resources to an uplink transmission having an actual duration that is shorter than an assigned or intended duration may result in the uplink transmission not being made. In these examples, and when an uplink transmission falls under a measurement gap, a current transmission number (CURRENT_TX_NB) parameter may be incremented, counting against a maximum number of uplink retransmissions for a TB configured for a UE. In other examples, the CURRENT_TX_NB parameter may not be incremented when an uplink transmission is not made.

In any of the methods 1900, 2000, 2100, 2200, 2300, or 2400 described with reference to FIG. 19, 20, 21, 22, 23, or 24, PHICH may be used for non-adaptive uplink re-transmissions (e.g., synchronous uplink HARQ). When an actual duration of an uplink transmission is shorter than an assigned or intended duration of the uplink transmission, and consequently, there is a lesser number of uplink TBs, a UE may treat the TBs of missed uplink transmissions as if an ACK has been received for the TBs of the missed uplink transmissions. When there is a possibility of ACK/NAK bundling, a UE may assume that the TBs of the missed uplink transmissions are not involved in the ACK/NAK bundling (and equivalently, the ACK/NAK bundling may assume that the TBs of the missed uplink transmissions are ACKed).

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, comprising:
   identifying, by a user equipment (UE), a first interval for an uplink transmission in a shared radio frequency spectrum band;
   identifying, by the UE, a second interval for the uplink transmission;
   comparing, by the UE, the first interval with the second interval;
   determining, by the UE, uplink resources to use for the uplink transmission based at least in part on the comparison of the first interval with the second interval; and
   transmitting, by the UE, the uplink transmission using the determined uplink resources.

2. The method of claim 1, wherein the shared radio frequency spectrum band comprises an unlicensed radio frequency spectrum band.

3. The method of claim 1, wherein the shared radio frequency spectrum band comprises a licensed radio frequency spectrum band shared by two or more operators.

4. The method of claim 1, further comprising:
   receiving at least one assignment of uplink resources to use for the uplink transmission.

5. The method of claim 4, further comprising:
   performing a clear channel assessment (CCA) to identify the second interval.

6. The method of claim 5, wherein the CCA comprises an extended CCA.

7. The method of claim 4, wherein the determining uplink resources comprises:
   applying, to the uplink transmission, a subset of an assignment of uplink resources associated with a duration of the uplink transmission.

8. The method of claim 4, wherein the determining uplink resources comprises:
   adjusting one or more parameters of the uplink resources to use for the uplink transmission based at least in part on the comparison of the first interval with the second interval.

9. The method of claim 8, further comprising:
   signaling, to a base station, an indicator that indicates a value of at least one of the adjusted one or more parameters of the uplink resources.

10. The method of claim 4, wherein the determining uplink resources comprises:
    applying at least one assignment of uplink resources corresponding to a portion of the first interval.

11. The method of claim 4, wherein the determining uplink resources comprises:
    applying at least one assignment of uplink resources based at least in part on a subframe index associated with the first interval.

12. The method of claim 1, further comprises:
    receiving a plurality of assignments of uplink resources to use for the uplink transmission; and
    wherein the determining uplink resources comprises selecting an assignment from the plurality of assignments of uplink resources to use for the uplink transmission.

13. The method of claim 1, wherein the first interval comprises a first duration for the uplink transmission and the second interval comprises a second duration for the uplink transmission, the second duration being different from the first duration.

14. The method of claim 1, wherein the first interval comprises a plurality of subframes.

15. An apparatus for wireless communication, comprising:
    a processor;
    memory in electronic communication with the processor; and
    instructions stored in the memory, the instructions being executable by the processor to:
      identify, by the apparatus, a first interval for an uplink transmission in a shared radio frequency spectrum band;
      identify, by the apparatus, a second interval for the uplink transmission;
      compare, by the apparatus, the first interval with the second interval;
      determine, by the apparatus, uplink resources to use for the uplink transmission based at least in part on the comparison of the first interval with the second interval; and
      transmit, by the apparatus, the uplink transmission using the determined uplink resources.

16. The apparatus of claim 15, wherein the shared radio frequency spectrum band comprises an unlicensed radio frequency spectrum band.

17. The apparatus of claim 15, wherein the shared radio frequency spectrum band comprises a licensed radio frequency spectrum band shared by two or more operators.

18. The apparatus of claim 15, wherein the instructions are executable by the processor to:
 receive at least one assignment of uplink resources to use for the uplink transmission.

19. The apparatus of claim 18, wherein the instructions executable by the processor to determine uplink resources comprise instructions executable by the processor to:
 apply, to the uplink transmission, a subset of an assignment of uplink resources associated with a duration of the uplink transmission.

20. The apparatus of claim 18, wherein the instructions executable by the processor to determine uplink resources comprise instructions executable by the processor to:
 adjust one or more parameters of the uplink resources to use for the uplink transmission based at least in part on the comparison of the first interval with the second interval.

21. The apparatus of claim 18, wherein the instructions executable by the processor to determine uplink resources comprise instructions executable by the processor to:
 apply at least one assignment of uplink resources corresponding to a portion of the first interval.

22. The apparatus of claim 15, wherein the instructions executable by the processor to:
 receive a plurality of assignments of uplink resources to use for the uplink transmission; and
 wherein the instructions executable by the processor to determine uplink resources comprise instructions executable by the processor to select an assignment from the plurality of assignments of uplink resources to use for the uplink transmission.

\* \* \* \* \*